(12) United States Patent
Lambert

(10) Patent No.: US 10,326,798 B2
(45) Date of Patent: Jun. 18, 2019

(54) SYSTEM AND METHOD FOR SECURE DATA TRANSMISSION AND STORAGE

(71) Applicant: Grid7 LLC, Boulder, CO (US)

(72) Inventor: Francis Lambert, Boulder, CO (US)

(73) Assignees: Grid7, LLC, Boulder, CO (US); Francis Lambert, Boulder, CO (US)

(*) Notice: Subject to any disclaimer, the term of this patent is extended or adjusted under 35 U.S.C. 154(b) by 71 days.

(21) Appl. No.: 14/689,483

(22) Filed: Apr. 17, 2015

(65) Prior Publication Data

US 2017/0061138 A1    Mar. 2, 2017

Related U.S. Application Data

(60) Provisional application No. 61/981,482, filed on Apr. 18, 2014.

(51) Int. Cl.
    *H04L 29/06*    (2006.01)
    *G06F 21/60*    (2013.01)
    *H04L 9/00*    (2006.01)

(52) U.S. Cl.
    CPC ............ *H04L 63/18* (2013.01); *G06F 21/606* (2013.01); *H04L 9/00* (2013.01)

(58) Field of Classification Search
    CPC ..................................................... H04L 63/18
    See application file for complete search history.

(56) References Cited

U.S. PATENT DOCUMENTS

| 2010/0299313 | A1* | 11/2010 | Orsini ...................... H04L 9/085 707/652 |
| 2011/0185193 | A1* | 7/2011 | Grube ...................... G06F 21/72 713/194 |
| 2014/0056068 | A1 | 2/2014 | Strasser et al. |
| 2014/0101376 | A1 | 4/2014 | Flynn et al. |
| 2014/0223170 | A1* | 8/2014 | Reynolds ............ H04L 63/0471 713/153 |

FOREIGN PATENT DOCUMENTS

WO    0004681 A1    1/2000

OTHER PUBLICATIONS

Young, Lee W., "International Search Report and Written Opinion for PCT/US15/26378", dated Dec. 29, 2015, p. 8.

* cited by examiner

*Primary Examiner* — Hee K Song
(74) *Attorney, Agent, or Firm* — Sanderson IP Law, Ltd.; Scott Sanderson

(57) ABSTRACT

A method for securely storing a data object comprises identifying the data object to be stored securely, segmenting the data object into a plurality of data packets, including at least a first data packet and a second data packet, specifying a secure storage location for the first data packet, specifying a secure storage location for the second data packet that is different from the storage location specified for the first data packet, securely transmitting the first data packet to the data storage location specified for it and storing it in the secure storage location specified for it, securely transmitting the second data packet to the data storage location specified for it and storing it in the secure storage location specified for it. A method for securely transmitting data comprises identifying the data packets to be transmitted securely, segmenting the packets into a plurality of data packets, transmitting the plurality of data packets with unpredictable addressing patterns, receiving, reassembling, and re-transmitting the data packets in their original format.

20 Claims, 29 Drawing Sheets

Initialization and Main Loop  Fig. 10

The Pattern Processor  Fig. 11

The Object Processor     Fig. 12

The Data Object Segment Processor    Fig. 13

The Transmission Package Processor   Fig. 14

Autonomous Transmission Pathway Preparation  Fig. 15

The Retrieval Processor    Fig. 16

The Reassembly Processor     Fig. 17

The Invalid Data Processor   Fig. 18

File & ODO Synchronization & Communication Method

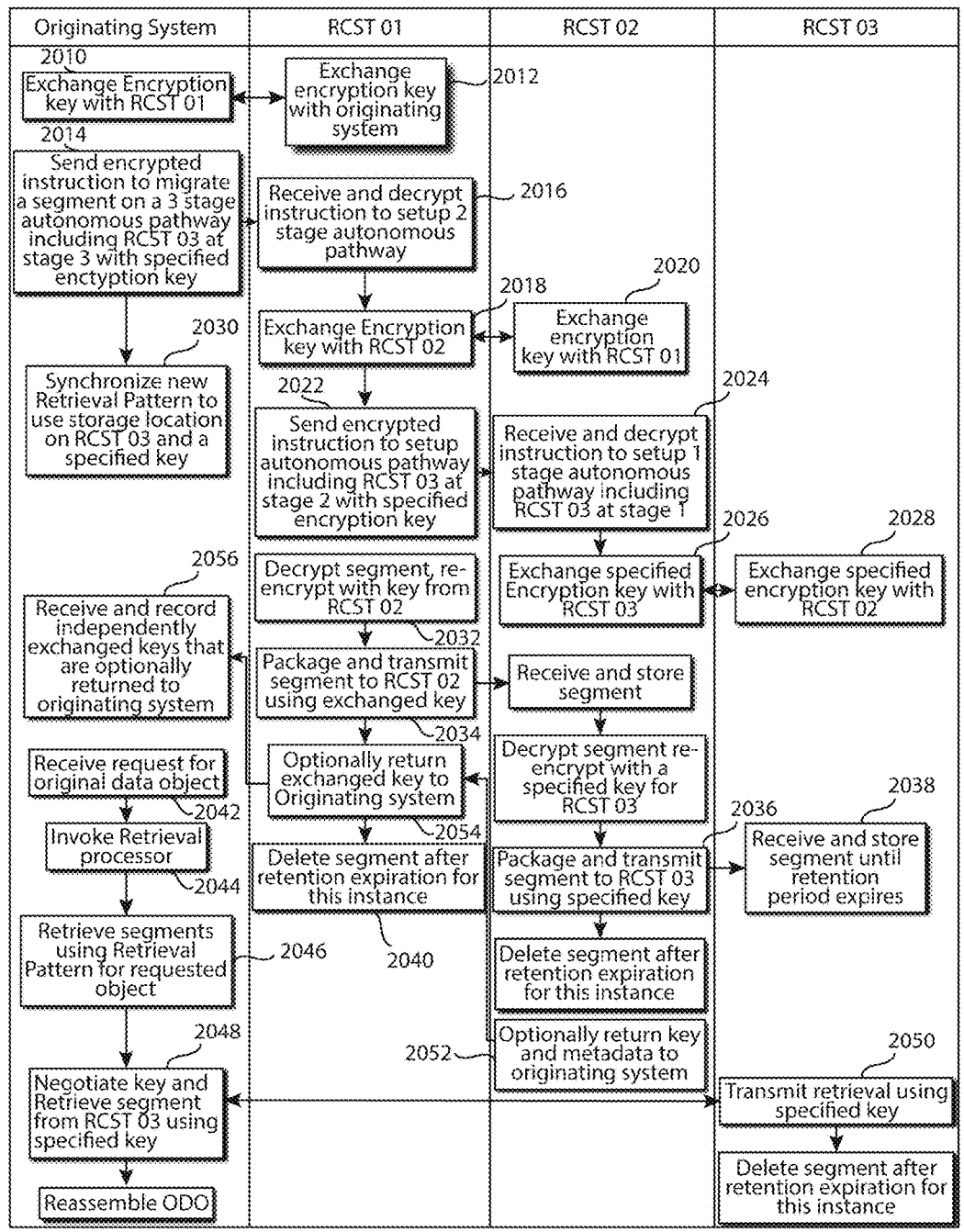
The Data Object Segment Migration Method  Fig. 20

2110 Original Data Object
4F3864D64C6F464B654A65798E2376519C897951F64654CFE654654A65C46D64F654E54A6B466A465D4
834776958D496A1655B46D5EF6D54A6D65AB65EDA65FF654A6S654DC5D654F65EE615A651D66A65

2112 Data Object Compressed
7D7D78F97E98B987A461651953D615F651C651A64D18796F8651D66E851F651D6B581A6581F685C61

2114 Data Object Compressed, Encrypted
A8F060C09D70678E96B79E6A6148CB60C09D70678E96B79E6A614D460C05870678E96B 2116 Data Object Compressed, Encrypted, Segmented
| A8F060 | C09D7C | 0678E4 | 96B79E | 6A6148CB60 | C09D70 | 678E9 | 6B79E6A6 | 14D460 | C0587 | 0678E96B |
| 01 | 02 | 03 | 04 | 05 | 06 | 07 | 08 | 09 | 10 | 11 |

2118 Data Object Compressed, Encrypted, Segmented, Reordered
| C09D70 | 14D460 | C09D7C | C0587 | 6A6148CB60 | A8F060 | 6B79E6A6 | 0678E4 | 0678E96B | 96B79E | 678E9 |
| 06 | 09 | 02 | 10 | 05 | 01 | 08 | 03 | 11 | 04 | 07 |

2120 Generate Invalid Data according to Invalid Data Pattern Permutation
| 5E6B | 49DA | 6AC8 | 488A | FF31 |
| 80 | 81 | 82 | 83 | 84 |

2122 Data Object Compressed, Encrypted, Segmented, Reordered, with Invalid Data inserted
| C09D70 | 14D460 | 5E6B | C09D7C | C0587 | 49DA | 6A6148CB60 | A8F060 | 6AC8 | 6B79E6A6 | 0678E4 |
| 06 | 09 | 80 | 02 | 10 | 81 | 05 | 01 | 82 | 08 | 03 |
| 488A | 0678E96B | 96B79E | FF31 | 678E9 |
| 83 | 11 | 04 | 84 | 07 |

2126 Data Object Compressed, Encrypted, Segmented, Reordered, with Invalid Data inserted, Grouped
2124 | C09D70 06 | 14D460 09 | 5E6B 80 | C09D7C 02 | Segment Group 01 | C0587 10 | 49DA 81 | 6A6148CB60 05 | A8F060 01 | Segment Group 02 |
2128 | 6AC8 82 | 6B79E6A6 08 | 0678E4 03 | 488A 83 | Segment Group 03 | 0678E96B 11 | 96B79E 04 | FF31 84 | 678E9 07 | Segment Group 04 |

2130
| C09D7C 14D460 5E6B C09D7C | A8F060 14D460 | 96B79E C09D70 | 5E6B C0587 | 0678E4 - 03 FF31 |
| RCST 2001 | RCST 0265 | RCST 0901 | RCST 0943 | RCST 5902 |

Hexadecimal Simulation of Data Object Obfuscation, Segmentation, and Storage    Fig. 21

| Segment Tracking Object Field | Description |
|---|---|
| Segment Pointer | Location of segment in pointed to object |
| Segment Length | Length of segment |
| Original Ordination | Order of segment in original object |
| Output Ordination | Order of segment in post processing object |
| Grouping value | Group in which the pointed to segment is placed; NULL=no grouping |
| Object Pointed to | The ID of the object containing the pointed to segment |

Fig. 22   Embodiment of Segment Tracking Object Record

| Compress Type | False nybble | False Bytes | 1st Encryption | 2nd Encryption | 3rd Encryption | 4th Encryption | XOR Mask | Logical NOT | Segment Number | Segments Ordering |
|---|---|---|---|---|---|---|---|---|---|---|
| 001-TAR | 000-10->F8A0 | 009-17->2C9B | 004-AES-00256 | 005-RSA-01024 | 006-AES-00128 | 007-NULL | 010-6AD9 | 011-1 | 002-000F | 003-0004-0000 |
| 001-TAR | 000-10->F8A0 | 009-17->2C9B | 004-AES-00256 | 005-RSA-01024 | 006-AES-00128 | 007-NULL | 010-6AD9 | 011-1 | 002-000F | 003-0004-0001 |
| 001-TAR | 000-10->F8A0 | 009-17->2C9B | 004-AES-00256 | 005-RSA-01024 | 006-AES-00128 | 007-NULL | 010-6AD9 | 011-1 | 002-000F | 003-0004-0002 |
| 001-TAR | 000-10->F8A0 | 009-17->2C9B | 004-AES-00256 | 005-RSA-01024 | 006-AES-00128 | 007-NULL | 010-6AD9 | 011-1 | 002-000F | 003-0004-0003 |
| 001-TAR | 000-10->F8A0 | 009-17->2C9B | 004-AES-00256 | 005-RSA-01024 | 006-AES-00128 | 007-NULL | 010-6AD9 | 011-1 | 002-000F | 003-0004-0004 |
| 001-TAR | 000-10->F8A0 | 009-17->2C9B | 004-AES-00256 | 005-RSA-01024 | 006-AES-00128 | 007-NULL | 010-6AD9 | 011-1 | 002-000F | 003-0004-0005 |

Fig. 23   First Permutation: Functions and Value Ranges Obfuscation Permutation Table

| Compress Type | False nybble | False Bytes | 1st Encryption | 2nd Encryption | 3rd Encryption | 4th Encryption | XOR Mask | Logical NOT | Segment Number | Segments Ordering |
|---|---|---|---|---|---|---|---|---|---|---|
| TAR | 000>0000 | 31 | NULL | RSA-QA49FF34 | AES-00115 | NULL | 6AD7 | NULL | 14 | 0003-0005 |
| TAR | 000>0000 | 31 | NULL | RSA-QA49FF34 | AES-00115 | NULL | 6AD7 | NULL | 14 | 0003-0006 |
| TAR | 000>0000 | 31 | NULL | RSA-QA49FF34 | AES-00115 | NULL | 6AD7 | NULL | 14 | 0003-0007 |

Fig. 24   Obfuscation Pattern Permutation Embodiment

| Pattern | Function01 | Function02 | Function03 | Function04 | Functioin05 | Function06 | Function-x |
|---|---|---|---|---|---|---|---|
| Transmit | *Rotate transmit media | *Time delay/mil sec | *Number of relay RCSTs | *Send to FTP adrs xxx.xx.xxx | *Send to http URL example.com | *Send SMTP to m@m.com | *transmit invalid segment |
| Retrieve |  | *Time delay/mlsec | *Number of rtrv RCSTs | *Rtrv at FTP adrs xxx.xx.xxx | *Rtrv at http URL onsite.com | *Rtrv SMTP at y@y.com | *retrieve invalid segment |
| Invalid | *Insert bits in x>y pattern | *Insert nybbles in x>y pattern | *Insert bytes in x>y pattern | *Insert words in x>y pattern | *Transmit invalid sgmt every 5 | ... ... | *Rtrv invalid pattern evry 3 |

Fig. 25   Example of Functions in Various Pattern Functions Tables

| Field Num | Object Management Record Field Name | Description |
|---|---|---|
| OMR001 | Object Id | Identifier for this particular processed original data object (ODO) |
| OMR002 | Object Hash Clear | ODO verification digest of the content before processing |
| OMR003 | Object Hash Obfuscated | ODO verification digest after processing and before segmenting |
| OMR004 | Obfuscation Pattern Permutatioin pointer | Offset value for permutation of obfuscation functions. This allows multiple variations on the permutation values |
| OMR005 | Obfuscation Function Values permutation pointer | Offset value for obfuscation function permutation values. These specify input parameters for ODO obfuscation functions |
| OMR006 | Transmit Pattern permutation pointer | Offset value for transmission functions. This allows multiple variations on the permutation values |
| OMR007 | Transmit Function Values permutation pointer | Offset value for transmission function permutation values. These specify parameters for ODO transmission processing |
| OMR008 | Retrieval Pattern permutation pointer | Offset value for permutation of Retrieval functions. This allows multiple variations on the permutation values |
| OMR009 | Recall Functions Values permutation pointer | Offset value for Retrieval function permutation values. These specify parameters for ODO Retrieval processing |
| OMR010 | Invalid Data Functions permutation pointer | Offset value for permutations of invalid data insertion functions. This allows multiple variations on the permutation values |
| OMR011 | Invalid Data Functions Values permutation pointer | Offset value for invalid data function permutation values. These specify parameters for ODO invalid data processing |
| OMR012 | Min Retention period | Minimum period segments to be kept on storage devices |
| OMR013 | Max Retention period | Maximum period segments to be kept on storage devices |
| OMR014 | Encryption Method 01 | Pointer to Optional encryption method for layer 01 |
| OMR015 | Encryption key 01 | Optional encryption key for layer01 |
| OMR016 | Encryption Method 02 | Pointer to Optional encryption method for layer 02 |
| OMR017 | Encryption key 02 | Optional encryption key for layer 02 |
| OMR018 | Encryption Method 03 | Pointer to Optional encryption method for layer 03 |
| OMR019 | Encryption key 03 | Optional encryption key for layer 03 |
| OMR020 | Compression Method 01 | Pointer to Method used for compressing this Object |
| OMR021 | Application Hash | Pointer to process for authenticity verification of object |
| OMR022 | Obfuscation Functions & Values List *OPTIONAL* | Pointer to Obfuscation Permutation Functions and Values Records (as backup to Permutation algorithm value) |
| OMR023 | Transmission Functions & Values List *OPTIONAL* | Pointer to Transmission Permutation Functions and Values Records (as backup to Permutation algorithm value) |
| OMR024 | Invalid Data Functions & Values List *OPTIONAL* | Pointer to Invalid Data Permutation Functions and Values Records (as backup to Permutation algorithm value) |

Fig. 26  Embodiment of Data Dictionary for an Obect Management Record

| Permutation Function and Values Record | Description |
|---|---|
| Object ID | Can be Data Obect, Segment, or Segment Grouping |
| Function Type | Type of Function performed |
| Function parameter | Value or range used in Function processing |
| Pattern type | Obfuscation, Transmission, Retrieval, Invalid Data |
| Function Ordination | The order in which this function executes |

Fig. 27  Partial Permutation Function and Values Record

| Field Num | Segment Management Record | Description |
|---|---|---|
| SMR001 | Object ID | ID for Original Data Object (ODO) |
| | Transmitted Object ID | |
| SMR002 | Segment ID | Identifier for this segment |
| SMR003 | Segment Position | Original position of segment |
| SMR004 | Segment Length | Original length of segment |
| SMR005 | Transmitted Segment ID | Obfuscating, changeable ID for segment in transit |
| SMR006 | Segment Group ID | Segment Group into which segment was placed |
| SMR007 | Segment Hash Clear | A verification digest of the Segment before processing |
| SMR008 | Segment Hash Obfuscated | A verification digest of the Segment after processing |
| SMR009 | Retention Period | Period of time segment will be kept on storage device |
| SMR010 | Obfuscation Permutation Value | Offsets to Obfuscation Functions and Values permutations |
| SMR011 | Transmit Permutation Value | Offsets to Obfuscation Functions and Values permutations |
| SMR012 | Retrieval Permutation Value | Offsets to Obfuscation Functions and Values permutations |
| SMR013 | Invalid Data Permutation Value | Offsets to Obfuscation Functions and Values permutations |
| SMR014 | Obfuscation Tracked | 1=make list of obfuscation functions in Functions and Values DB |
| SMR015 | Transmission Tracked | 1=make list of obfuscation functions in Functions and Values DB |
| SMR016 | Retrieval Tracked | 1=make list of obfuscation functions in Functions and Values DB |
| SMR017 | Invalid Data Tracked | 1=make list of obfuscation functions in Functions and Values DB |
| SMR018 | Compression Algorithm 01 | Method used for compressing the Segment. None used if null |
| SMR019 | Encryption Method 01 | Optional encryption method for layer 01 |
| SMR020 | Encryption key 01 | Optional encryption key for layer 01 |
| SMR021 | Encryption Method 02 | Optional encryption method for layer 02 |
| SMR022 | Encryption key 02 | Optional encryption key for layer 02 |
| SMR023 | Encryption Method 03 | Optional encryption method for layer 03 |
| SMR024 | Encryption key 03 | Optional encryption key for layer 03 |
| SMR025 | Destination RCST $n$ | |
| SMR026 | Instruction $n$ | a code that specifies to the RCST what action to take with the segment |
| SMR027 | Reservation $n$ | The intended indexed storage location for a segment on Destination RCST $n$. This is prearranged with Destination RCST $n$ during the key exchange |
| SMR028 | Lag $n$ | the amount of time in seconds that a RCST will delay the transmission of a segment to the next RCST specified in Instruction $n$ |
| SMR029 | Pipe $n$ | a value that specifies over which transmission medium the transmitting system will transmit the sgmnt. These values can be determined depending on which transmission media are available at the time of transmission. |
| SMR030 | Encryption key $n$ | the encryption key with which the invention will encrypt a segment for decryption by a specific RCST |
| SMR031 | Obfuscation Functions & Values List *OPTIONAL* | Pointer to Obfuscation Permutation Functions and Values Records (as backup to Permutation algorithm value) |
| SMR032 | Transmission Functions & Values List *OPTIONAL* | Pointer to Transmission Permutation Functions and Values Records (as backup to Permutation algorithm value) |
| SMR033 | Retrieval Functions & Values List *OPTIONAL* | Pointer Retrieval Permutation Functions and Values Records (as backup to Permutation algorithm value) |
| SMR034 | Invalid Data Functions & Values List *OPTIONAL* | Pointer to Invalid Data Permutation Functions and Values Records (as backup to Permutation algorithm value) |

Fig. 28    Embodiment of Data Dictionary for an Obect Management Record

Fig. 29  Addressing Synchronization Table

| Local Device | Device Net | Remote Device | AddressID | Routing Address | MAC Address |
|---|---|---|---|---|---|
| RCST1 | 10.10.10.49 | RCST2 | R1 | 117.42.35.61:350 | |
| RCST1 | 10.10.10.49 | RCST2 | R2 | 117.42.35.61:6253 | |
| RCST1 | 10.10.10.49 | RCST2 | R3 | 117.42.35.61:7498 | |
| RCST1 | 10.10.10.49 | RCST2 | R4 | 117.42.35.61:4479 | |
| RCST1 | 10.10.10.49 | RCST2 | L1 | 192.168.2.34 | |
| RCST1 | 10.10.10.49 | RCST2 | L2 | 192.168.2.124 | |
| RCST1 | 10.10.10.49 | RCST2 | L3 | 192.168.2.54 | |
| RCST1 | 10.10.10.49 | RCST2 | L4 | 192.168.2.76 | |
| RCST1 | 10.10.10.49 | RCST2 | L5 | 192.168.2.135 | |
| Sensor02 | 10.10.10.24 | RCST3 | R1 | 54.98.124.12:3665 | |
| Sensor02 | 10.10.10.24 | RCST3 | R2 | 54.98.124.12:758 | |
| Sensor02 | 10.10.10.24 | RCST3 | R3 | 54.98.124.12:1445 | |
| Sensor02 | 10.10.10.24 | RCST3 | R4 | 54.98.124.12:6333 | |
| Sensor02 | 10.10.10.24 | RCST3 | R5 | 54.98.124.12:894 | |
| Sensor02 | 10.10.10.24 | RCST3 | L1 | 192.168.2.37 | |
| Sensor02 | 10.10.10.24 | RCST3 | L2 | 192.168.2.38 | |
| Sensor02 | 10.10.10.24 | RCST3 | L3 | 192.168.2.41 | |
| Sensor02 | 10.10.10.24 | RCST3 | L4 | 192.168.2.42 | |

Rows 2910, 2912, 2914, 2916

Fig. 30  Transmission Addressing Pattern Permutation Table
(Local Source and Remote Destination Addresses)

| P1Src | P1Dest | P2Src | P2Dest | P3Src | P3Dest | P4Src | P4Dest |
|---|---|---|---|---|---|---|---|
| L3 | R2 | L2 | R4 | L3 | R2 | L5 | R4 |
| L3 | R2 | L2 | R4 | L3 | R3 | L1 | R1 |
| L3 | R2 | L2 | R4 | L3 | R3 | L1 | R2 |
| L3 | R2 | L2 | R4 | L3 | R3 | L1 | R3 |
| L3 | R2 | L2 | R4 | L3 | R3 | L1 | R4 |
| L3 | R2 | L2 | R4 | L3 | R3 | L2 | R1 |
| L3 | R2 | L2 | R4 | L3 | R3 | L2 | R2 |
| L3 | R2 | L2 | R4 | L3 | R3 | L2 | R3 |
| L3 | R2 | L2 | R4 | L3 | R3 | L2 | R4 |
| L3 | R2 | L2 | R4 | L3 | R3 | L3 | R1 |
| L3 | R2 | L2 | R4 | L3 | R3 | L3 | R2 |

| LAN ID | Node ID | Federated Address | Routing Ordination | Routing Address | MAC Address | |
|---|---|---|---|---|---|---|
| VL01 | RCST01 | 10.10.10.121 | L1 | 192.168.2.84 | F6:38:EC:7B:98:98:48:22 | } 3110 |
| VL01 | RCST01 | 10.10.10.121 | L2 | 192.168.2.76 | | |
| VL01 | RCST01 | 10.10.10.121 | L3 | 192.168.2.135 | | |
| VL02 | RCST02 | 10.10.10.122 | R1 | 118.42.35.61:889 | | |
| VL02 | RCST02 | 10.10.10.122 | R2 | 118.42.35.61:7466 | | |
| VL02 | RCST02 | 10.10.10.122 | R3 | 118.42.35.61:321 | | } 3112 |
| VL03 | RCST03 | 10.10.10.123 | R1 | 45.114.57.33:58 | | |
| VL03 | RCST03 | 10.10.10.123 | R2 | 45.114.57.33:115 | | |
| VL03 | RCST03 | 10.10.10.123 | R3 | 45.114.57.33:6864 | | |
| VL04 | RCST04 | 10.10.10.124 | R1 | 63.78.124.76:5397 | | |
| VL04 | RCST04 | 10.10.10.124 | R2 | 63.78.124.76:8383 | | |
| VL04 | RCST04 | 10.10.10.124 | R3 | 63.78.124.76:4557 | | |
| VL01 | SENSOR01 | 10.10.10.24 | L1 | 192.168.2.34 | | |
| VL01 | SENSOR01 | 10.10.10.24 | L2 | 192.168.2.98 | | |
| VL01 | SENSOR01 | 10.10.10.24 | L3 | 192.168.2.128 | | } 3114 |
| VL02 | SENSOR02 | 10.10.10.44 | R1 | 118.42.35.61:4657 | | |
| VL02 | SENSOR02 | 10.10.10.44 | R2 | 118.42.35.61:8977 | | |
| VL02 | SENSOR02 | 10.10.10.44 | R3 | 118.42.35.61:2376 | | |
| VL03 | SENSOR03 | 10.10.10.54 | R1 | 45.114.57.33:3728 | | |
| VL03 | SENSOR03 | 10.10.10.54 | R2 | 45.114.57.33:445 | | |
| VL03 | SENSOR03 | 10.10.10.54 | R3 | 45.114.57.33:3772 | | |
| VL04 | SENSOR04 | 10.10.10.28 | R1 | 63.78.124.76:2624 | | |
| VL04 | SENSOR04 | 10.10.10.28 | R2 | 63.78.124.76:334 | | |
| VL04 | SENSOR04 | 10.10.10.28 | R3 | 63.78.124.76:7483 | | |
| VL01 | COMPUTER01 | 10.10.10.20 | L1 | 192.168.2.34 | | |
| VL01 | COMPUTER01 | 10.10.10.20 | L2 | 192.168.2.98 | | |
| VL01 | COMPUTER01 | 10.10.10.20 | L3 | 192.168.2.125 | | |
| VL02 | COMPUTER02 | 10.10.10.32 | R1 | 118.42.35.61:4657 | | |
| VL02 | COMPUTER02 | 10.10.10.32 | R2 | 118.42.35.61:8977 | | |
| VL02 | COMPUTER02 | 10.10.10.32 | R3 | 118.42.35.61:2376 | | |
| VL03 | COMPUTER03 | 10.10.10.36 | R1 | 45.114.57.33:3728 | | |
| VL03 | COMPUTER03 | 10.10.10.36 | R2 | 45.114.57.33:445 | | |
| VL03 | COMPUTER03 | 10.10.10.36 | R3 | 45.114.57.33:3772 | | } 3116 |
| VL04 | COMPUTER04 | 10.10.10.26 | R1 | 63.78.124.76:2624 | | |
| VL04 | COMPUTER04 | 10.10.10.26 | R2 | 63.78.124.76:334 | | |
| VL04 | COMPUTER04 | 10.10.10.26 | R3 | 63.78.124.76:7483 | | |

Federated DHCP Table

Fig. 31

SYSTEM AND METHOD FOR SECURE DATA TRANSMISSION AND STORAGE

PRIORITY AND CROSS-REFERENCES TO RELATED APPLICATIONS

This application claims priority to U.S. Provisional Application No. 61/981,482 filed Apr. 18, 2014 and entitled "System and Method for Secure Data Transmission and Storage," the entire disclosure of which is incorporated by reference for all proper purposes, as if fully set forth herein.

This application is also related to U.S. Provisional Patent Application No. 60/093,106 filed Jul. 16, 1998, entitled "Method for Secure Data Transmission," U.S. patent application Ser. No. 09/602,888 filed Jun. 23, 2000 with Earliest Priority Date of Jul. 16, 1999, entitled Method for "Secure Data Transmission and Storage," and Foreign Application to the EPO/PCT No. PCT/US99/16087-07/16/1999, entitled "Method for Secure Data Transmission and Storage." These applications were all filed by the inventor, Francis Lambert of Boulder, Colo., and are hereby incorporated by reference for all purposes.

FIELD OF THE INVENTION

This invention relates to systems and methods of securely transmitting and storing data. More specifically, the invention relates to methods for data obfuscation, transmission, storage, retrieval, reassembly, and recovery of data objects whereby an original data object is compressed, encrypted, obfuscated by using differing permutations of functions described herein, and segmented, and whereby the data object segments are reordered as discrete and separate encrypted data object segment groupings or left as individual segments of the original data object, none of which contain a complete representation of the original data object, and whereby these data object segment groupings or individual segments are further obfuscated by using differing permutations of processing functions, and whereby these data object segment groupings are transmitted via separate data carriers, or via different network infrastructure elements, or via different transmission media, or using different transmission protocols, or at different time delayed time intervals, or are transmitted with invalid data object segments that are not from the original data object, and each segment, or a number of segments insufficient to recover the original data object, from the same original data object are stored in different storage locations, storage resources, or secure access areas, and periodically moved from location to location or access area to access area so as to limit access, acquisition and decryption of the original data object, and each segment, or group of segments, is retrieved according to a predetermined retrieval pattern permutation, from a different location or access area via different transmission media, or using different transmission protocols, or at different time delayed time intervals, or are retrieved with invalid data object segments that are not from the original data object.

BACKGROUND OF THE INVENTION

The advent of digital data transmission and storage has prompted more and more organizations and individuals to employ digital systems to convey, receive, and retain digital information. Digital information may include, for example, business records, electronic documents, pictures, video data, audio data, real time measurements, electronic commerce transactions, personal and work related email, messaging such as texts, advertisements, and the like.

For sensitive digital data, security is becoming an important consideration when being transmitted across public computer networks. Types of sensitive digital data may include personal data, financial data, health data, data that is sensitive in nature, data which a user wants to prevent from being exposed, and the like. Because unauthorized individuals, i.e., "hackers", are constantly developing new methods and systems for eavesdropping, "sniff", "hack", "exploit", or otherwise gain access to and acquire sensitive digital data, higher security of such digital data is needed.

Many innovations have emerged to protect the privacy and security of digital information. For example, some conventional forms of security systems include firewalls, data encryption, data encoding, digital signatures, hashing, password, biometric identification, and the like. These systems and methods generally include capabilities that either restrict access to data or transform the data into values which are difficult to transform back into their original data values. Thus, the data transmitted or stored by these innovations can be protected from the facile discovery by unauthorized access. Unfortunately, innovation has also occurred on the part of hackers, thus systems and methods for secure transmission and storage of data must also evolve.

The level of security of the transmitted and stored data is often dependent upon the ability of the hacker to decrypt the data, thus, it is often desirable to prevent hackers and other unauthorized entities from accessing, acquiring, or decrypting the data. Most current data security systems are eventually defeated by inventive, persistent, yet unauthorized hackers by brute force attacks or other exploitations. Further, hacking techniques are often widely published on the Internet. Digital data is exposed to hacking and exploitation either while in transit or "at rest" in a storage location. As a result, digital data is vulnerable while being transmitted across public networks, or while being stored, even in an encrypted state on a file server whether it is in a local system or in a remote system, such as the "cloud".

Thus, what are needed are security methods that overcome the foregoing drawbacks, and renders more difficult the unauthorized access to digital data during both transmission and storage.

BRIEF DESCRIPTION OF DRAWINGS

FIG. 1: A high level overview flowchart of the major functional areas of the invention FIG. 2: A high level overview flowchart of the Segment transmission configuration method.

FIG. 3: A high level overview flowchart of the Segment transmission method.

FIG. 4: A high level overview flowchart of the Segment retrieval method.

FIG. 5: A high level overview flowchart of the Segment storage method.

FIG. 6: A high level overview flowchart of an embodiment of the Segment retrieval method.

FIG. 7: A high level overview flowchart of the Segment reassembly method.

FIG. 8: A diagram illustrating multiple different diverse transmission media over which different Segments, Segment Groupings, and Invalid Data are securely and separately transmitted.

FIG. 9: A diagram illustrating multiple different diverse storage locations, resources, systems, and secure access areas onto which different Segments, Segment Groupings, and Invalid Data are securely and separately stored.

FIG. 20: A flowchart of the method by which an Originating System migrates segments to different separate and secure storage locations and secure access areas.

FIG. 21: An illustration of the transformation of the digital data in an Original Data Object as it is processed by some of the methods of the invention.

FIG. 22: An illustration of an embodiment of a Segment Tracking Object structure used to segment an ODO, insert Invalid Data into an ODO or its segments, group the segments of an ODO, and specify the origin of the data contained in a processed Segment or Segment Grouping.

FIG. 23: A representation of one embodiment of permutations of obfuscation functions and their ranges of input values FIG. 24: A representation of one embodiment of permutations of specific input values that are applied to the obfuscation function permutation shown in FIG. 23.

FIG. 25: An example of Pattern Functions Tables showing example functions for other types of pattern permutations. These are shown, without input value ranges, to simplify functional descriptions.

FIG. 26: An embodiment of an Object Management Record that records the obfuscation processing and processing metadata of an Original Data Object.

FIG. 27: An embodiment of a Function and Values Record that records the processing executed on an Original Data Object or its segments according to a Pattern Permutation.

FIG. 28: An embodiment of a Segment Management Record that records the segmenting of an Original Data Object, and the obfuscation and transmission preparation processing of its segments.

FIG. 29: An embodiment of an Addressing Synchronization Table that records the sets of routable packet addressing established between two nodes across which the two nodes can distribute the contents of an original packet. The set of routable packets are used to transmit multiple packets over changing patterns of destination and source addresses that obfuscate and authenticate transmissions in transit.

FIG. 30: An embodiment of a table of source and destination address permutations into which a table offset is applied to determine the permutation that will be used to pattern the addressing for four packets.

FIG. 31: An embodiment of a Private VLAN DHCP Synchronization table that records three types of addressing for nodes on a Private Virtual LAN that is federated and synchronized with other LANs to form a single address space that can communicate OSI Level 2 and Level 3 packets across separate but federated LANs in an obfuscated and self authenticating manner over a public network.

SUMMARY OF THE INVENTION

Figure 1:
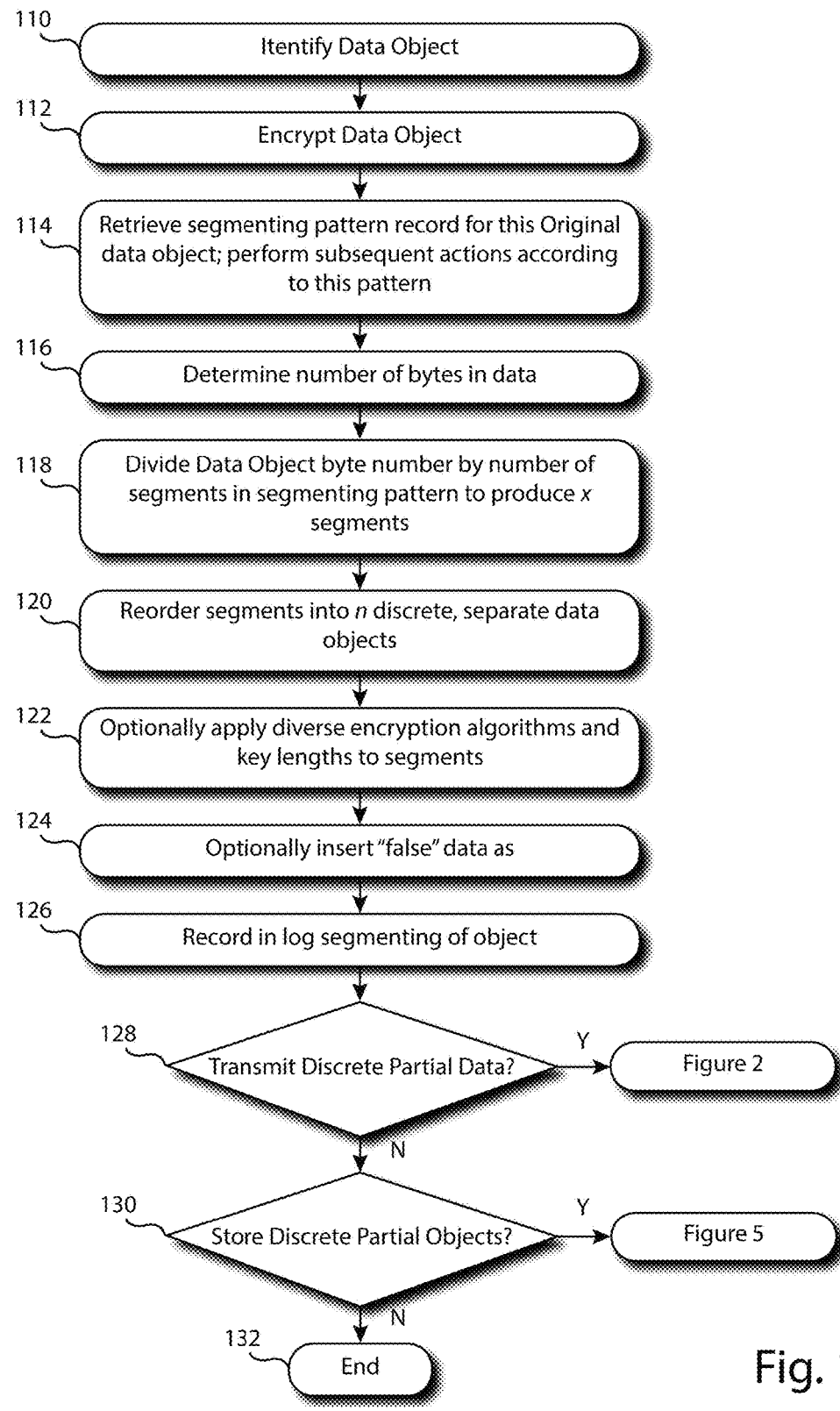
FIGS. 1 through 9 are disclosed in the previous U.S. patent application Ser. No. 09/602,888 for which this Utility Application is a continuation, and are included herein for convenience.

The present invention processes, transmits, and stores data objects according to a set of reversible patterns in order to make the data objects secure and private during transmission and storage. The invention provides for the manipulation, processing, obfuscation, transmission, storage, retrieval, and recovery of data objects that allows users of the data to more securely transmit and store the data objects. The security is partially provided through a process providing beneficial utilization of the phenomenon of the degradation of the ability to decrypt encrypted data objects as an increasing number of the bits of the encrypted data object are not present or not known to be valid information from the encrypted object. Missing pieces of information from an encrypted data object interfere with or prevent "brute force" decryption of encrypted objects to the degree that the information is missing. Falsified information in an encrypted object also deters brute force decryption attacks to the degree that it is not known which data in the encrypted object or its segments is a valid part of the object's content, and which is invalid.

The invention also provides for secure and private data transmission, data storage, file synchronization, file streaming, and information communications on storage and computing resources. These storage and computing resources can be local or remote, including those resources sometimes referred to as, "the cloud."

The invention includes processing software and computing and telecommunications hardware ("the system") used to obfuscate, segment, reorder segments, group segments, transmit, store, retrieve, reassemble, and reconstitute a specified original data object intended for private and secure transmission and storage by using changing permutations of processing and transmission functions. The methods provided for include, without limitation: recording a hash value that verifies the content of the data object, calculating unique permutations of patterns according to which the data object and its segments will be obfuscated, segmented, reordered, grouped, transmitted, seeded with invalid data, stored, and retrieved for reassembly. Methods further include obfuscating the data object by compression and/or encryption using differing sequences of functions determined by permutations of a set of functions, executing other functions for obfuscation of the whole, not segmented data object, segmenting that obfuscated data object into varying numbers of segments or groupings of segments with varying lengths, reversibly reordering the segments, grouping the reordered segments, further obfuscating those segments, and recording the manner of segmentation and further obfuscation of the segments.

The transmission methods of the invention provide for transmitting the segments over diverse transmission media that follow separate physical or logical routing, transmitting segments from the same original data object using differing and diverse transmission protocols determined by the permutations of a set of protocols in order to obfuscate the association of a group of obfuscated segments. The invention also provides for transmitting the segments over differing timing periods to obfuscate the association of a group of obfuscated segments, causing the resources receiving the transmission to re-transmit the object segments with additional layers of encryption, obfuscation, and diverse segment identifiers that make the segments anonymous as to their origin and obfuscate the association of data object segments to each other, to the original data object, and to the originating system.

The system includes having multiple, logically, commercially, politically, or physically separated storage resources and secure data storage access areas to store each obfuscated segment separately, or in groups insufficient in number to reassemble the original data object in separate access areas in a manner that increases the difficulty of accessing and acquiring all of the segments.

The invention provides a system to receive the transmitted data object segments, such that a receiving system can further process the transmitted object segments for anonymity and obfuscation, and provides that a receiving system can store the obfuscated segments separately from other segments of the same data object for a specified retention period and then delete and destroy their copy of the stored segment according to a specified retention period. The system can further have a storage and receiving system store, and transmit invalid data that appears to be part of the original data object but does not come from that object.

The invention further provides a retrieving system that retrieves the transmitted data object segments according to a differing and changing retrieval pattern determined by calculating a permutation of a set of retrieval patterns that is different from the transmission and storage patterns used for the same data object segments. The invention provides for retrieval of the data object segments from their diverse and separate storage locations via multiple layers of encryption across multiple receiving and transmitting systems that autonomously process the segments and set independent transmission pathways to preserve anonymity of the segments. The invention provides for deleting the obfuscated segments stored in the storage resources once they are retrieved, or after a predetermined retention period.

The invention provides for a method that reassembles the retrieved segments according to the reversal of a recordation of obfuscation and transmission function processing results, reversing segment reordering, reassembling the object segments, removing any invalid data that was inserted into the object or its segments, decrypting and decompressing the reassembled data object, and verifying the integrity of the restored data object and its segments using hash values calculated from the data object and its segments prior to obfuscation processing.

Interchangeable Terms

The invention provides for data that are not from the original data object, to be processed, inserted, intermingled, and transmitted with the data from the original data object. The data not from the original data object are intended to obfuscate the data from the original data object during transmission or in storage. The data that are not from the original data object can be referred to herein, or in prior applications, as "invalid data", "dummy data", or "false data." These terms are interchangeable for purposes of the specification of the invention. The invention provides that the invalid data can be interpretable content that is not related to the content of the original data object.

The data object segments can be portions of a divided original data object, or false, invalid data, produced by the methods that produce invalid data. They are processed, transmitted, stored, and retrieved as discrete data objects in their own right, and can be referred to herein, or in prior applications, as "segments", "data object segments", "segment groupings", "groups of data object segments", "discrete data object segments", "discrete data objects", "discrete partial data segments", "discrete segments", "data segments", and the like. These, separately and together, represent diverse ways of naming the pieces of data resulting from segmenting an original data object and subsequently combining or not combining the segments into another data object comprised of segments from the original data object, and into which invalid data may or may not be inserted. For purposes of functionality with the invention, the terms referred to in this paragraph, describing segment portions of an original data object and their groupings, are interchangeable.

Also, for purposes of this specification, the "Original Data Object" is also referred to as the "ODO", and can be any type of digital file, stream, or object, including word processing files, spreadsheet files, database files, encryption keys, credit card records, obfuscation patterns, retrieval patterns, videos, audio files, image files, email files, and the like. This application provides a glossary of terms for the convenience of the reader.

Aspects of the Invention

The invention provides for compressing, encrypting, verification hashing, segmenting, reordering and grouping segments of an original data object into discrete data object segments. These discrete separate data object segments can have invalid data bytes inserted into them, have the encrypted data object's segments reordered into non-contiguous groupings, or have certain segments encrypted with another layer of varying encryption methods and/or key lengths. The pattern by which the invention's data object obfuscation process compresses, encrypts, segments, reorders, inserts invalid data, performs obfuscating logical operations, or otherwise obfuscates the segments of the original data object is able to be reversed by the reassembly method of the invention in such a manner as to restore the original data object from the various discrete, partial, reordered, and obfuscated data object segments to its original "cleartext" format.

In another aspect of the invention, a segmenting method is provided that inserts invalid data unrelated to the original data object according to a pattern that is structured so as to allow the reassembly method to discard the unrelated data during the process of reassembling the original data object.

In another aspect of the invention, a segmenting method is provided that re-encrypts the various segments into which the original encrypted data object is divided, using various encryption key lengths and encryption methods according to a pattern that is structured so as to allow the re-assembly method to reverse the encryption of the data object segments using the same diverse encryption key lengths and encryption methods.

In an aspect of the invention, the computing instance originating the data object processing ("the originating system") optionally obfuscates the original data object ("ODO") by compression and encryption and then by segmenting the obfuscated ODO into smaller pieces. The invention obfuscates the ODO and each of these segments with obfuscating functions specified in an "obfuscation pattern" derived from permutations of patterns of obfuscation functions and function input values. The Obfuscation Function Pattern Permutation is calculated by a permutation calculation algorithm, or acquired from a predetermined list of obfuscation function patterns. The invention may or may not combine non-sequential segments into larger groups ("segment groupings") made up of an arrangement of encrypted segments that are not in their order as found in the ODO. The system then transmits the resulting obfuscated, reordered, and grouped object segments according to a "transmission and storage pattern" over diverse physical and logical transmission media, protocols, and pathways to diverse physical and logical computing and storage resources located in diverse geopolitical, commercial, and legal domains. Storage resources for one or more segments can also be local secure access areas. The "transmission and storage pattern" is also a permutation of related functions and function input values. The segment storage locations are prepared by the originating system negotiating an encryption key exchange, a transmission pattern, and a storage location reservation with a sequence of available storage location systems, or by the systems that receive segment transmissions exchanging encryption keys between themselves to securely transmit the segments. Segments, or groupings of segments, insufficient in number to reassemble the ODO, are stored separately from each other on separate storage systems or in separate access areas.

In another aspect of the invention, the system can obfuscate, transmit, retrieve and reassemble an encryption key, just as it would any other data object, and does not distinguish between the intended purposes of an Original Data Object. A segmenting method is provided that reorders the segments of the segmented original encrypted data object into groups of non-contiguous segments according to a pattern that is structured so as to be reversed by the reassembly process that reconstructs the original data object.

The invention provides that the number, length, validity, cardinality, ordination, type of methodologies used in the function patterns for obfuscation, transmission, storage, and retrieval, and other attributes of the data object segments, are unknown to the unauthorized accessor of the segments. The invention also provides, importantly, that these attributes of the various patterns described herein are widely different each time the invention is utilized to obfuscate, transmit, store, and retrieve a data object. Because it is difficult for the unauthorized accessor to know if they have a complete set of valid data object segments, or to establish a repetitive pattern of obfuscation, transmission, storage, and retrieval across obfuscated data objects and encryption keys, it is extremely difficult for them to decrypt the data object segments and reassemble them into the original data object, thereby providing privacy and security to users of the ODO.

In another aspect of the invention, data object segments can also be stored and communicated in formats other than digital packet data, including, without limitation, in a physical machine-readable format such as barcodes, QR codes, stenographic images, removable media, and other physical representations of digital data, or on removable digital media as well, to further render more difficult the acquisition of the complete set of segments that will allow restoration of the original data object. Some segments may be stored on the local computer, which can be additionally used as a remote storage server to other remote systems that separately retrieve and reassemble the segmented data object for file synchronization or communications purposes, or other purposes.

One beneficial aspect of the invention is that it is easily and effectively utilized using shorter length encryption keys on low cost computing equipment, thereby reducing the cost and complexity of ensuring secure and private data transmission and storage. By effectively reducing the amount of information known about the content of an encrypted data object, the invention reduces the efficacy, or even the possibility, of a "brute force" decryption attack. It provides strong security even with short encryption keys since the absence of content information about the original data object will greatly increase the amount of information which a brute force attack must guess, rendering the known encrypted data bits less decipherable into cipher text, and, therefore, less usable by the unauthorized accessors of data object segments. Hence, the encryption key lengths of the known segments can be shorter, and require less computational overhead, since the data object will still be increasingly difficult to decrypt due to the segments missing from the entire ODO.

Function and Function Input Value Pattern Permutations Provided by the Invention:

In one aspect of the invention, reversible patterns are determined through a variety of methods that specify how the data object will be obfuscated, transmitted, stored, retrieved, and reassembled back into its original form. These patterns are recorded into object and segment management records that provide information to make the process secure and reversible.

Four of the patterns used to process an original data object that are aspects of the invention are the Obfuscation pattern, the Transmission and Storage pattern, the Retrieval pattern, and the Invalid Data Pattern. They are summarized as follows:

Obfuscation Pattern:

Sometimes called the "Obfuscation Pattern Permutation" or "OPP", is a changeable permutation of a set of data object processing functions and values that instruct an obfuscation method how to process the original data object and its segments so as to make them unreadable to a system or party that does not know the obfuscation pattern. This pattern specifies how a data object will be obfuscated, how it will be segmented, how the segments will be reordered and optionally grouped, how Invalid Data will be inserted, as well as how further obfuscation functions will be performed with the segments prior to preparation for transmission.

Transmission and Storage Pattern:

Sometimes called "The Transmission Pattern", "the TPP", or the "Transmission Pattern Permutation" herein, as a shortened version of its name for convenience, and such terms, are interchangeable for purposes of this disclosure. This pattern is a changeable permutation of a set of transmission configurations, protocols, source and destination addresses, actions and functions, and their parameters, attributes, and values that instruct a transmission method how to transmit the obfuscated ODO segments, its segment groupings, and the related invalid data, so as to make them difficult to acquire, capture, associate, decrypt, and reassemble by a system or party that does not know the transmission and storage pattern. This pattern also includes instructions to the local and remote data object segment receiving, and storage resources for performing, multiple types of processes disclosed herein, including sending and receiving invalid data that are not derived from the original data object and are intended to be indistinguishable from the valid data object segments from the original data object. The TPP includes, without limitation, differing patterns of source and destination addressing in packets containing segments or segment groupings, and differing patterns of storage locations in which segments or segments' groupings from the same data objects are stored separately from each other in different secure access areas from where they are retrieved according to a retrieval pattern by a retrieving system. Segments or segments' groupings from the same data object may be stored in the same secure access areas, in groups with segments insufficient in number, to easily reassemble the original data object.

Retrieval Pattern:

This is a set of retrieval functions and their parameters that instruct a retrieval method how to retrieve the obfuscated data object segments from local or remote logical storage locations so as to make it difficult to "sniff", capture, associate, decrypt, and reassemble a complete set of segments by a system or party that does not know the retrieval pattern, so as to make them available to a reassembly process that is able to restore the encrypted data object to its original "cleartext" form. This pattern can include instructions to the local and remote data processing and storage resources, for themselves performing secondary retrieval operations from another storage resource. The Retrieval Pattern may also be used by one or more systems other than the originating system for purposes of communicating or synchronizing an ODO across multiple systems. The retrieval pattern may also specify alternative retrieval locations for reliability, such as storing multiple copies of a segment along a sequence of different storage devices.

Invalid Data Pattern:

This is a set of data generation and presentation functions and their parameters that generate invalid data and make the invalid data available to an invalid data insertion process. These invalid data pattern insertions and transmissions are retained in a system processing record to allow retrieval and reassembly methods to remove invalid data from the retrieved segments and the original data object, and to allow the retrieval pattern process to retrieve those invalid segments that were previously transmitted and stored in separate locations or in separate access areas during a transmission process so as to obfuscate which segments being retrieved contain actual valid data from the original data object. The Invalid Data Pattern also generates invalid data for processes that retrieve invalid pieces of data that were not previously transmitted by the originating system, and are intended to be indistinguishable from the actual valid data object segments from the original data object, in order to obfuscate the data object segment retrieval process to unauthorized outside entities.

Calculation of Pattern Permutations:

Another aspect of the invention provides a method for calculating permutations of patterns of functions and values for obfuscation, transmission, storage, retrieval, and inserting of invalid data into the original data object and its segments. This method allows the system to generate or acquire a permutation seed value, such as a random number or a value derived from a pass phrase, biometric measurement, a value generated by a time-based password generating algorithm, a selection by a user, a value taken from a list of previously generated random numbers, or the like, to determine a highly differentiated, as unique as possible, set of functions and values for processing the original data object using the methods of the invention. This increases the uniqueness of each instance of the use of the invention. This allows the invention to decrease the possibility that unauthorized accessors will be able to use pattern recognition, or related methods, to recover the original data object.

Also provided are a baseline list of pointers to functions and function input value ranges for each type of pattern, called "Pattern Function Tables", that provide the set of functions and their input values that will be permutated for each type of pattern permutation used in the invention. Provided is an Obfuscation Pattern Function Table, a Transmission and Storage Function Table, an Invalid Data Function Table, and a Retrieval Pattern Function Table. Also provided is a method for recording the permutations of patterns of functions and function input values used for obfuscating, transmitting, storing, retrieving, and inserting invalid data in the ODO, its segments and segment groupings. Also provided are data retrieval and reassembly methods that can utilize either the original permutation seed value or recorded permutation's patterns in order to retrieve and recover the original data object.

The invention provides algorithms that calculate permutations of patterns ("Obfuscation Pattern Permutations") that can direct an object processing method to compress and encrypt a data object and then segment it into variable sized pieces ("segments", or "data object segments", or "segment groupings"), insert false data ("invalid") bits and bytes, encrypt the segments multiple times using multiple encryption methods as well as compression, or otherwise obfuscate the data in the segments through logical operation transformations of segment data (for example, "XOR" or "NOT" operations), and the like. The invention then provides parameters for algorithms that determine a "transmission and storage pattern" to transmit individual encrypted segments, grouped segments, and "invalid" segments to multiple local or remote storage devices (herein called "RCST" systems, an acronym for "Receive, Compute, Store, and Transmit" systems) using diverse transmission protocols, timings, channels and media. These RCST storage resources store the segment in a specified location ("storage location") or secure access area that is separate from the storage locations of other segments from the same data object. The storage locations are determined by a negotiation with the originating system or another RCST system. The RCST system can also re-transmit the transmitted segments according to an instruction and transmission pattern embedded in the segment. The RCST systems can also independently and autonomously prepare a pathway for the transmission and storage of segments and segment groupings.

In another aspect of the invention, different permutation calculation algorithms, different baseline sets of functions and input value ranges, and different algorithm seed values are used to define and reconstruct the pattern permutations used in the methods of the invention. The invention provides a changeable master permutation calculation algorithm that calculates which permutation of a changeable baseline set of functions, and the input values, will be used by the methods processing an original data object. Selecting different processing permutation patterns for each data object to be processed by the invention allows it to use a different series of permutations of patterns uniquely different from other data objects processed in another instance of the invention. This elimination of repetition in patterns for data object and encryption key obfuscation and transmission further contributes to the security of segments and segment groupings since a monitoring entity will not be able to use multiple objects to establish a predictable pattern for obfuscation, transmission, storage, or retrieval of data object segments or segment groupings.

An important aspect of the invention is that the pattern permutations can be calculated for each ODO, with widely varying attributes each time a specific data object is securely obfuscated, stored, transmitted, or retrieved by the invention. This is accomplished by using randomly, or pseudo-randomly, generated numbers to "seed" an algorithmic calculation of permutations of functions and values that constitute the patterns disclosed herein. Each new use of the invention can generate different "seed" numbers that calculate widely different attributes to the patterns, including, without limitation, different functions, different attributes and input values and parameters for those functions, different numbers and types of functions, different "seed" values for pattern calculation, and different ordering of those functions that constitute the various patterns used by the various methods of the invention.

In another aspect of the invention, an instance of the invention can construct its own variation of baseline permutation function sets, function input values and algorithms for the calculation of obfuscation, transmission, storage, or retrieval pattern permutations. For example, each instance of the invention can have its own unique structure and selection of functions and values for all patterns, as well as a custom algorithm that determines how the functions ordinate and increment within the permutation table, such as a permutation of a table of obfuscation functions that will be used to obfuscate the object and its segments. Because the parameters for obfuscation, transmission, storage, and retrieval of the data object are defined by an algorithmic calculation of a permutation, one embodiment of the file containing the recordation of the obfuscation process only needs to retain the patterns' permutation offset values and a pointer to the associated permutation algorithm, and baseline function set, to be able to identify and recreate the pattern permutations used to process and restore the ODO. This provides further obfuscation of the data object since a third party desiring to recover the object must know the permutation seed value, permutation calculation algorithm, and baseline function set unique to an instance of invention, to determine the patterns used to process a data object. Since those values and structures can be unique to each instance of the invention, and able to be changed and versioned frequently over time, even for each unique obfuscated object, it is extremely difficult, or impossible, to capture, perform cryptanalysis, or reassemble the original data object by using recognition of repetitive patterns.

Records of Processes Performed:

In another aspect of the invention, the processing and transmission activities performed with the ODO and its segments that are required for retrieval and reassembly of the ODO are recorded in an Object Management Record and in Segment Management Records so that they can be reversed to recover the object in its original form. Sharing the Object and Segment Management Records, along with the keys used for decrypting the object and its segments, will allow other resources to retrieve and reassemble the obfuscated object segments from the storage locations that store the segments in access areas that are different from the storage locations or access areas of other segments from the same data object. This sharing allows the secure and private stored object segments to be accessed, retrieved, and reassembled for file synchronization or communication applications such as a store-and-forward messaging system similar in function to email. These object and segment management records, seed values, baseline function sets, algorithms, and decryption keys are maintained in a strongly encrypted format at the system end points in order to preserve the security and privacy of the processed data object.

The Object Management Record and Segment Management Records disclosed herein specify the functions, attributes, and input values used for the obfuscation, transmission, storage, and retrieval of the ODO segments. These records are used to track how the data is obfuscated, segmented, transmitted, and stored so that the obfuscation can be reversed in order to restore the ODO to its original form. These system management records include:

The Object Management Record:

This collection of data, typically stored as a row in a database, provides the information on how to identify an original data object, how it was obfuscated and transmitted and stored. It is used to verify and reassemble the original data object.

The Segment Management Records:

This collection of data, typically stored as rows in a database, are associated to an Object Management Record, as described above, and provide the information on how the segments of an ODO are identified, obfuscated, packaged, transmitted, stored, verified, and retrieved. It can additionally be used to retrieve and reassemble the segments of the original data object. Each transmitted segment is assigned an identifier from a sequence of random or pseudo-random identifiers that is used in transmission, storage, and retrieval to make anonymous and obfuscate the association of data object segments from the same ODO to each other, to the ODO, and to the originating system. This sequence of identifiers is related back to the original data object and its segments by the Segment Management Record.

Diverse Transmission Methods:

For security in transmission, the invention provides for transmitting obfuscated data object segments over separate transmission channels, media, and protocols. A segment transmission method is provided that transmits data object segments of the original data object over different combinations of transmission media such as the Internet, cellular phones, wireless data carriers, analog telephone switches, packet switched radio, and others. Also provided is a data retrieval method that receives the data object segments from the various transmission media so as to allow the reassembly method to reassemble the original data object. Since acquiring all of the pieces of a segmented encrypted data object is critical to decrypting it, transmitting pieces of that object require that an unauthorized accessor monitor and acquire data from a wide variety of transmission media, channels and protocols. This reduces the ability of hackers to obtain the complete data object during transmission, thereby increasing its security.

In another aspect of the invention, data object segments are transmitted by the invention's transmission method over different data carriers, over different network infrastructure elements such as internet backbones, different packet routing routes, different transmission and media, either physical or digital, or at different times, or in any combination thereof, so as to render more difficult the acquisition of the complete original data object's segments during transmission.

In another aspect of the invention, a transmission method is provided that transmits data object segments using transmission addressing and protocols that may enforce a predetermined or differentiated packet routing or addressing from the routing or addressing of other associated data object segments. This includes, without limitation, sending data object segments using static IP delivery rules programmed into a packet routing device. Also provided is a data receiving method that receives the data object segments in the differentiated package routing so as to allow the re-assembly method to reassemble the original encrypted segments.

In another aspect of the invention, a transmission method is provided that transmits segments of an original data object to diverse destination systems or to diverse transmission protocol addresses. Also provided is a data receiving method that allows the corresponding diverse destination systems or diverse transmission addresses to receive the data object segments and store them so as to allow the retrieval and reassembly methods to reassemble the original data object.

In another aspect of the invention, a transmission method is provided that transmits segments of the original data object by using individually, or in combination, diverse transmission protocols, such as FTP, SMTP, HTTP, SMS, TCP, UDP, NNTP, and the like, as well as such proprietary transmission protocols as can be devised. Also provided is a data receiving method that allows the corresponding destinations systems to receive the data object segments by using individually, or in combination, diverse transmission protocols such as FTP, SMTP, HTTP, SMS, TCP, UDP, NNTP, and the like, as well as such proprietary transmission protocols as can be devised so as to allow the re-assembly method to authenticate, and process them, in order to reassemble the original data object.

Further, the invention provides for more secure transmission of the data object segments by embedding the content and metadata of the obfuscated data object segments in the content portion of various transmission and communication protocols that are able to be parsed by the receiving system (RCST system). Different data communications' protocols for transmission of segments of the original data object utilized by the invention include, without limitation, HTTP, FTP, SMTP, NNTP, or other transmission protocols, as will be well known to those knowledgeable in the art of data transmission and data communication. Using different protocols further increases the difficulty of acquiring and assembling the entire original data object, as the hacker must be able to identify, capture, parse, relate the content of, and decrypt all of the various utilized transmission protocols simultaneously.

In another aspect of the invention, a transmission method is provided that transmits segments of original data objects during varying time intervals, and with varying time delays. Also provided is a data receiving method that receives the data object segments during various time intervals, and with varying time delays, so as to increase the difficulty of associating data object segments in transit.

Further, the invention provides that the systems transmitting and receiving the data object segments can exchange encryption keys and transmission patterns and assess storage and retention capabilities prior to transmission to determine the optimal set of storage locations and separate access areas for the various segments of the encrypted data object, which include a set of storage locations that store the segments from the same data object in diverse, separate, and securely isolated access areas. The invention can instruct the storage locations' computing resources to perform security enhancing functions on the segments, such as further obfuscation, negotiating secure transmission to another separate storage resource, transmission to another storage location, copying to another storage location to allow access by another system and with a different retention period, and by deleting and destroying the data object segment according to a retention instruction from the transmitting system.

Any data object can be an original data object for purposes of the invention, regardless of purpose. For example, since encryption keys are, themselves, data objects that can be processed and transmitted just as any other original data object, as disclosed herein, the invention provides methods that allow secure storage and transmission of encryption keys, just as any other data object with its own specific function. A segment transmission that uses symmetric key encryption will exchange the symmetric session key with greater security because, segments of the complete symmetric key are transmitted in re-ordered segments, over different data carriers using different transmission infrastructure or enforcing data packet routing over different routers, over different types of transmission media such as IP Networks, Wireless Networks, analog switching networks, and the like, or any combination thereof, or at different times to make the segments not appear to be part of the same transmission sequence. The security and privacy of encryption keys exchanged between systems is increased when the various segments of those keys are transmitted between systems over different transmission paths, and by different intermediate systems, providing anonymity through additional layers of encryption on the exchanged encryption key segments.

Further, the invention can provide an increase in the security of an encrypted data object when different data object segments of the complete decryption key data object for that encrypted Original Data Object, or its segments, or its segment groupings, all, and of each of which are also data objects, as disclosed in this application, are stored in reordered segments, in different locations, on separate access areas, or on storage systems different from segments from the same data object, on different Storage Media, in different Storage System access areas, or any combination thereof, and, further, are transmitted, in reordered segments, over different transmission media, using different transmission protocols, using transmission time lag intervals, or any combination thereof.

Additional Aspects of Segment Transmission:

In another aspect of the invention, a transmission method is provided that transmits a negotiation message to the receiving RCST system to alert it to receive a data object segment, or combined reordered grouping of segments of the original data object, and may or may not specify a specific transmission pathway or addressing pattern over which that segment or grouping will be transmitted. In one aspect, the negotiation object is used to exchange encryption keys with a destination system. In another aspect of the invention, the negotiation object is used to reserve a logical indexed storage location for a data object segment on the destination system access area, that does not store another segment, or a sufficient number of segments to allow reassembly, from the same data object. In another aspect of the invention, the negotiation object is used to verify the authenticity of the destination system. Also provided is a data receiving method that receives the negotiation object so as to allow the receiving system to retrieve a transmission pattern record, and/or instructions with which to prepare various reception subsystems for reception, processing, and storage of the data object segments. Also provided is a data receiving method that receives the negotiation object so as to allow the receiving system to exchange an encryption key for further communications with the transmitting system, either by optionally exchanging the encryption key utilizing the invention or by not utilizing the invention. Also provided is a data receiving method that receives the negotiation object so as to allow the receiving system to reserve a storage location for a received data object segment that is in a different access area or storage system from those storing another segment from the same data object. Also provided is a data receiving system that allows received data object segments to be stored for a specified period of time, or retention period, after which they are automatically destroyed by the receiving or destination system.

In another aspect of the invention, a data reception method is provided that "times-out" the reception of data object segments according to the delivery latency tolerance parameters contained in the data object segment transmission pattern record or instructions. Also provided is a data reception method that transmits a request to the originating transmission system, or systems, requesting a retransmission of any data object segments or negotiation objects that do not arrive within the delivery latency tolerance parameters. Also provided is a data transmission method that allows a Receive, Compute, Store, and Transmit (RCST) system to receive, authenticate, read instructions from the transmission, process, store, decrypt, re-encrypt, and obfuscate according to the methods described herein, and re-transmit a data object segment that had been requested for retransmission by the reception system, optionally storing the data object segment.

RCST Systems:

The invention, further, provides methods for one or more systems to receive the data object segments, or segment groups, transmitted from the originating system. In this specification, these systems are referred to as Receive, Compute, Store, and Transmit systems (RCST systems).

The invention provides for methods for the RCST systems to perform functions including, without limitation: a) receive segments and other data objects transmitted from other components of the invention, b) perform computational processing tasks with them, including, without limitation, decrypting, encrypting, de-compressing, compressing, transforming, re-segmenting, re-ordering of segments, amending metadata, and the like, c) store the received and possibly computationally altered data object segment or segment group in a secure access area separate from other segments from the same data object, and for the time period specified in the segments' retention metadata, or for a default time if a retention period is not so specified, and d) optionally transmit the received, computationally altered, or stored, data object segment to another component of the invention that includes, without limitation, the originating system, another RCST system, or another receiving system other than the originating system, such as another system operating as an end point in a communications or synchronization activity. The invention also provides for an RCST system that is able to receive, parse, and process, for the purpose of the invention, the diverse transmission protocols, utilized by the transmission method, to transmit the obfuscated data object segments' content and embedded metadata. The invention also provides for an RCST system that is able to receive, parse, and process received segments and data objects according to instructions embedded in the received data object or packaged segment.

In a further aspect of the invention, the RCST system can transmit data object segments and metadata securely to RCST systems, or to other receiving systems, by using either the methods of the invention herein described, or by using more commonly used methods of secure data transmission. The RCST system can transmit segment data in either manner, both to systems requesting the segment from it, or to a system with which the transmitting RCST system has negotiated storage location. The RCST system is similarly able to securely receive and process data object segment content and metadata that is transmitted to it by a requesting system, or that it has requested from a transmitting system. Processing the received segment data on the RCST can include, without limitation, storing it in a pre-reserved logical storage location, decrypting the segment data, re-encrypting the segment data, transmitting the segment data to another RCST or user system, further obfuscating the segment data according to instructions embedded in the segment data and according to obfuscation methods disclosed herein, destroying the segment data at the expiration of the segment data retention period, or other types of instructions that can be embedded in the segment data metadata by a transmitting system.

In another aspect of the invention, an RCST system can generate and provide transmission encryption keys, reservations for logical storage locations within its system, transmission patterns, or can transmit segments or segment groupings to processes and systems that negotiate a transaction or exchange of data with the RCST system. The invention also provides that the RCST system and the system negotiating a transaction with it may have pre-arranged secure communication methods such as pre-arranged encryption keys, a virtual private network, and other secure communication methods as will be known to those skilled in the art of secure data communications.

The invention also provides that the RCST system, and the system negotiating a transaction with it, may have pre-arranged a set of obfuscation, transmission, storage, and retrieval pattern permutations that they will use to securely exchange symmetric or other types of encryption keys, data object segments or segment groupings, invalid data, or other types of data objects. The RCST systems can also utilize the invention to exchange different pattern permutations to use in place of the pre-arranged sets of pattern permutations to avoid using repetitive pattern permutations. In another aspect of the invention, the RCST system can request and retrieve encryption key and pattern set information from other systems of the invention including, without limitation, other RCST systems, originating systems, and other systems that are retrieving or receiving data object segments.

In another aspect of the invention, an RCST tracks which logical storage locations in its storage domain are available for storing data object segments and segment groupings. The RCST will know if a storage location in its storage resource is currently claimed, or reserved, by another data object segment. The RCST sends, to a system requesting a storage location, an identifier for a storage location that is available for use, also referred to in this specification as a "reservation". The RCST sets a flag, for that storage location, as being unavailable to other storage reservation requests for the period of time specified in the reservation request from the originating system or another RCST. If the RCST does not receive a segment to optionally process and store from the originating system, or other RCST within the reservation time, the storage location is released, and made available for further storage requests.

In additional aspects of the invention, the RCST system provides storage location reservations or denials to systems that request to store a data object segment on its system. When the request to store a segment is received, the RCST verifies the authenticity of the request, and then assesses its capacity for storage and retention of the segment based on size and retention metadata included in the request. The RCST then returns a positive or negative response to the requesting system based on its ability to execute the request. The RCST system is similarly able to request a logical storage location reservation from another RCST storage resource, or other data storage resource, to provide to that resource the required verification and segment storage requirements metadata, and to process and respond as configured to the returned reservation or denial from the system receiving the request.

In one aspect of the invention, the originating system, or a series of RCST systems, performs a negotiation with one or more Receive, Compute, Store, and Transmit ("RCST") systems that includes, without limitation, an exchange of encryption keys for secure communication with the RCST, a specification of an encryption technology to be used with the encryption key, and a reservation of a storage location index on the receiving RCST system in a secure access area or storage location separate from other segments from the same data object.

A series of RCST systems can by utilized to predictably receive, re-process, store, or re-transmit the object segments along a known series of transmission and storage locations (the "transmission pathway"). In a further aspect of the invention, the transmission pathway can follow the transmission pathway specified in a transmission pattern permutation calculated by the originating system or by an RCST system.

Transmission Pathway Preparation Methods:

The invention provides two methods for the establishment of a transmission pathway for the secure transmission of segments, or segment groupings, that can be used separately or in combination.

The first method begins with the originating system negotiating directly with one or more receiving RCST systems multiple different transmission encryption keys, originating system identifiers, segment identifiers, transmission patterns, storage locations, and other transmission and storage metadata for secure transmission and data object integrity verification of transmitted segments. In this method, the originating system knows all of the encryption keys, storage locations, RCST identifiers, and related metadata in the transmission pathway.

In the second method for the establishment of a transmission pathway, two or more RCST systems independently and autonomously negotiate keys, locations, and identifiers for secure transmission of data object segments with or without informing the originating system of the keys, locations, identifiers, and other transmission and storage metadata. In this method, the originating system transmits the segment or segment groupings to a first RCST system with instructions embedded in the metadata of the transmission package to ensure that at one stage in the transmission pathway, that will be arranged independently by one or more RCST systems, the segment or grouping will be stored with a specific segment identifier at a particular location on a specific RCST system with a specific encryption key that matches the retrieval pattern permutation for that segment or segment grouping.

A sequence of RCST systems then negotiates a secure transmission pathway between themselves according to embedded instructions. They use encryption keys negotiated at the time of segment transmission, negotiated previously so as to be predetermined, or they use a secure transmission technology, such as a virtual private network, or other secure data transmission communication method. In this second method, the receiving RCST system can further obfuscate, and place different identifiers on, a segment or segment grouping to increase the anonymity of the segment and further obfuscate its association with other segments, the originating system, and the original data object.

In the first transmission pathway preparation method, the invention provides a method for the originating system to establish a transmission pathway that the originating system itself determines and negotiates with a sequence of RCST systems that will receive, store and re-transmit the segment or segment grouping, along with invalid segments, to the next RCST in the pathway after optionally processing it for obfuscation, transforming it into a different protocol packaging, or storing it according to the instruction included with the transmitted segment. After negotiating an encryption key and storage location with one or more destination RCST systems, the originating system can then embed the destination RCST identifiers and addresses sequentially into segment transmission metadata and, then, transmit the segment or segment grouping with a storage location reservation request to the RCST systems. Each RCST in the transmission pathway then, in turn, receives the segment, decrypts it, verifies it, stores it for the time specified in the retention period, and transmits it to the subsequent RCST in the transmission pathway.

In one aspect of the this method of the invention, the originating system prepares the transmission pathway by negotiating with a number of RCST systems, for example, four RCST systems, to transmit an object segment to a storage location on one or more of the RCST systems. During this process, the originating system negotiates an exchanged symmetrical, or other type of encryption key, and a storage location index reservation with each RCST system in the transmission pathway sequence. It then encrypts the object segment in successive layers of encryption in the reverse order of the transmission pathway, beginning with the key exchanged with the RCST that will be the last RCST in the transmission pathway. It then encrypts the object segment with successive layers of encryption, in reverse order of the order of the sequence of transmission pathway RCST systems, using the keys negotiated with the associated destination RCST systems. In this manner, the first receiving RCST system will be able to decrypt the object segment and transmit it to the second RCST system, which will, in turn, decrypt the second level of encryption with the key exchanged with the originating system, and transmit it to the third RCST in the pathway, and so forth, until the end of the transmission pathway is reached at the last negotiated RCST system, and the final decryption of the segment object will occur with the last negotiated key.

In this method, the originating system negotiates encryption keys and logical storage reservations with multiple RCST systems or user systems and, then, encrypts the data object segment or segment grouping, or invalid data object segment, in multiple layers of encryption using the negotiated keys in the reverse order of the RCST systems transmission path to which the segment data will be sent. The originating system encrypts the segment object to be transmitted one or more times with the keys that have been exchanged from the corresponding one or more RCST systems in the reverse order that they will receive the encrypted data object segment. The originating, transmitting system, embeds the appropriate instructions within each layer of encryption so that the decrypting RCST system will be directed to transmit, store, or otherwise process the segment according to the transmission pattern negotiated by the originating systems and as determined by the transmission pattern permutation. Within each encryption layer is embedded the destination addressing metadata for the next RCST system in the transmission pathway whose exchanged key will decrypt the next layer of encryption of the segment data in the transmission series, and so forth.

In the second transmission pathway preparation method of the invention, the RCST systems operate independently of the originating system in the initiation, preparation, and execution of a multi-stage, multi-encryption-layer transmission pathway used by the invention to obfuscate the association of segments to each other and to establish anonymity of the origin and destination of the data object segments or invalid data object segments. In this second method, multiple RCST systems negotiate transmission encryption keys and logical storage reservations with one or more other RCST systems, or other receiving systems, so that data object segments from the same data object are stored in separate secure access areas. The multiple RCST systems send embedded instructions to other RCST systems to similarly negotiate encryption keys and storage locations independently and, then, encrypt the data object segment or segment grouping in multiple layers of encryption using the negotiated keys in the reverse order of the transmission pathway negotiated by those other RCST systems.

If the transmitting RCST system has negotiated keys with multiple RCST systems, the transmitting RCST system encrypts the segment object to be transmitted multiple times with the keys that have been exchanged from the multiple RCST systems in the reverse order that they will receive the encrypted data object segment. The transmitting RCST system embeds the appropriate instructions within each layer of encryption so that the decrypting RCST system will be directed to transmit, store, or otherwise process the segment according to the instructions embedded in the layer that it can decrypt, including, without limitation, instructions to negotiate further stages in the transmission pathway, to store the segment or grouping at a reserved storage location, or to embed instructions for a specific RCST system to store the segment or grouping in a specific storage location with a specific encryption key separately from other segments from the same data object as specified.

Within each encryption layer is embedded either instructions to prepare a specified number of RCST systems as a transmission pathway, or the destination addressing for the next RCST system in the transmission pattern path whose exchanged key will decrypt the next layer of encryption of the segment data in the transmission series. In this latter aspect, the destination addressing for the next RCST system in the transmission pathway is not specified by the metadata from the originating system, but is instead determined by a transmission pathway established between the RCST systems, without the participation of the originating system. In this aspect, the initial RCST system is instructed, by the originating system, to store the segment, or grouping encrypted with a specified encryption key, on a specific RCST system at a specified storage location that matches the retrieval pattern for the segment as determined by the originating system. The originating system controls the certain instances of the segment's storage pattern so that segments from the same data object are stored in separate access areas, or on differing storage systems.

Segment Processing by RCST Systems:

In one aspect of the invention, the computer systems that receive the segments from the originating computer (RCST systems) can perform computational tasks with the received segments, including, without limitation, decrypting with the key exchanged with the originating computer, re-encrypting with a different key, for example one exchanged with another RCST, parsing or interpreting the transmission protocol containing the object segment, reading and executing an instruction embedded in the transmission, re-packaging the segment in a different transmission protocol, embedding instructions into the re-packaged object segment transmission packet, and re-transmitting the re-packaged segment and its embedded instructions to another RCST system or retrieving system, including a system with which it had previously exchanged encryption keys. The receiving RCST system can also generate, package, and transmit invalid data in order to further obfuscate the transmission of valid data. Instructions to the receiving RCST system, and subsequent RCST systems, can include instructions on how to transmit the segment to the next stage of its prepared transmission pathway, including transmitting the segment to another specific receiving RCST with which the transmitting originating system had previously exchanged keys. This allows the system to construct a transmission pathway in which the encryption key exchange occurs: a) between the originating computer and the destination RCST systems along the pathway, b) between the RCST systems constituting the transmission pathway, or c) any combination thereof. In one aspect of the invention, the instructions transmitted to, and relayed by, the RCST systems instruct the RCST systems in the transmission pathway to eventually store the object segment in an RCST location that will allow the retrieving computer to retrieve the segment from that RCST location.

This aspect of the invention allows the retrieval pattern to specify retrieval of the transmitted object segments from storage locations that are different from the storage locations to which the object segments were originally transmitted. This aspect of the invention further provides that the object segment is able to be stored in various formats, at various locations, throughout a transmission path negotiated either by the originating computer, or autonomously by a series of RCST systems, and that the segment will predictably be stored at a location which matches the location specified in the retrieval pattern. Any of these storage instances of the object segments known to the originating system that occur along the transmission pathway can serve as a backup, or redundant copy, of the object segment, to enhance reliability of the system for authorized users who know the series of encryption keys and storage locations used along the transmission pathway. Further, the retrieval pattern can contain location, access, protocol, and encryption information for a number of RCST systems that store the segment along the transmission pathway, allowing the retrieval computer to retrieve the segment from a diversity of locations, providing more certainty and security to the retrieval process, while still preserving the anonymity of the association and origin of the data object segments.

Segments from the Same Original Data Object Stored in Separate Secure Access Areas:

In one aspect of the invention, the transmission and storage pattern derived from the transmission permutation can specify the assignment of a specific storage location for each Segment or Segment Grouping that ensures that segments from the same data object are stored separately in different secure access areas, different storage locations or resources, or different RCST systems. It can also ensure that no more than a number of segments insufficient to reassemble the ODO according to a system configuration of such limits be stored in the same secure access area or storage location. Routing a transmission to a specific destination RCST system can be accomplished by multiple methods known to those familiar with the art of transmitting data, including the specification of a static TCP/IP address, a Universal Resource Locator, Strict Source Routing, Loose Source Routing, and the like.

In another aspect of the invention, a storage method is provided that stores discrete, separate data object segments, or segment groupings of the original data object, in diverse Data Storage locations and resources that are separate from Data Storage locations and resources storing other segments from the same original data object. Also provided is a data retrieval method that retrieves the discrete, separate segments or segment groupings of the original data object from diverse storage locations and resources that are separate from Data Storage locations storing other segments from the same original data object so as to allow the re-assembly method to reassemble the original data object.

In another aspect of the invention, a storage method is provided that stores discrete, separate data object segments or segment groupings of an original data object in diverse secure access areas that do not store other segments from the same original data object so as to require diverse authentication events to allow storage, acquisition and re-assembly of the segments contained in the data object. Also provided is a data retrieval method that performs required authentication events to retrieve the discrete, separate data object segments or segment groupings from diverse storage locations that do not store other segments from the same original data object so as to allow the re-assembly method to re-assemble the original data object. This provision makes it much more difficult for hackers to collect a group of segments sufficient to reassemble the original data object as they would be required to obtain access to a greater number of secure access areas.

In another aspect of the invention, a storage method is provided that stores discrete, separate data object segments or segment groupings of the same original data object separately and apart from each other on diverse Storage Media and devices, including local or remote Storage Media and devices, so as not to allow exposure of multiple segments of the original data object, and as few as possible, access to, theft, destruction, or failure of the storage medium or device. Also provided is a data retrieval method that retrieves the discrete, separate segments and segment groupings from diverse separate storage locations that do not contain segments from the same original data object so as to allow the re-assembly method to reassemble the original data object.

Separation of Segments in Transmission and Storage:

In another aspect of the invention, the data object segments, whether or not they are transmitted, can be transmitted over differing transmission media to, and stored separately in, different locations, on different Storage Media, or on different Storage System access areas, local storage areas, remote storage areas, or any combination thereof, so as to render more difficult the access to a complete set of the original data object's segments during storage and transmission.

Transmission and Storage of Invalid Data:

In another aspect of the invention, the RCST system can request and receive "invalid" segment data and process it in the same manner as valid segment data. This processing of "invalid" data includes, without limitation, storing it in a pre-reserved logical storage location, decrypting the invalid segment data, re-encrypting the invalid segment data, transmitting the invalid segment data to another RCST or receiving system using the methods of the invention herein described, further obfuscating the invalid segment data according to instructions embedded in the invalid segment data, destroying the invalid segment data at the expiration of the invalid segment data retention period, or other types of instructions that can be embedded in the invalid segment data metadata by a transmitting system. Similarly, the RCST system can generate invalid data from an invalid data pattern permutation algorithm and transmit that invalid data to other RCST or user systems. Generating and transmitting invalid data allows the system to further obfuscate the transmission of valid data object segments within the system with the intention of making the invalid data appear indistinguishable from valid data to unauthorized users.

Segment Anonymity:

Transmitting the data object segment from RCST to RCST, with each RCST having its own unique encryption key, allows the system to verify the authenticity of the transmission, produce anonymity for the segment, both in transit and at rest, and to produce multiple, individually secure copies of segment objects to increase availability and disaster recovery capacity. This allows the segment transmission to show only the RCST network identification and addressing, such as a TCP/IP address or the like, to unauthorized accessors of the segment data, either in transmission or at rest, thereby preserving the anonymity of the system that originated the segment data. Storing the segment data at various stages in the transmission path also provides the originating system multiple copies of the segment data for disaster recovery purposes, each version of the copy of segment data being more securely encrypted since the key is unique to that stage of the multi encryption layer transmission pathway. If needed, the originating system, or another authorized system with knowledge of the encryption keys associated with a stored segment, can retrieve the multi layered encrypted segment data from any stage in the transmission path in which it was stored and decrypt to its original pre-transmission format using the sequence of encryption keys with which it was encrypted for multi stage transmission.

Segment Retrieval:

In another aspect of the invention a retrieval method is provided that retrieves data object segments of original data objects using retrieval protocols that enforce a predetermined, differentiated packet routing from the routing of other data object segments associated with the same original data object. This includes, without limitation, sending data object segments using static IP delivery rules programmed into a packet routing device. Also provided is a data receiving method that receives the data object segments in the differentiated package routing so as to allow the re-assembly method to reassemble the original data object.

In another aspect of the invention, a retrieval method is provided that retrieves data object segments to diverse destination systems or to diverse retrieval protocol addresses. Also provided is a data receiving method that allows the corresponding diverse destination systems, or diverse retrieval addresses, to receive and re-transmit using the same or different protocols by which it received the data object segments so as to allow further retrieval by another destination system or retrieval address that provides the re-assembly method to reassemble the original data object.

In another aspect of the invention, a retrieval method is provided that retrieves data object segments of the original data object segments by using individually, or in combination, diverse retrieval protocols, such as FTP, SMTP, http, and the like, as well as such proprietary retrieval protocols as can be devised, in such a manner that may or may not utilize the same protocol in which the same data object segment was previously transmitted. Also provided is a data receiving method that allows the corresponding destinations systems to receive the data object segments by using individually, or in combination, diverse retrieval protocols such as FTP, SMTP, HTTP, and the like, as well as such proprietary retrieval protocols as can be devised, and in such a manner that may or may not utilize the same protocol in which the same data object segment was previously transmitted, so as to allow the re-assembly method to authenticate, validate, and process them in order to reassemble the original data object. Using different protocols, and transmitting associated data object segments with diverse protocols, further increases the difficulty of acquiring and assembling the entire original obfuscated data object, as the hacker must be able to identify, capture, parse, and decrypt all of the various utilized protocols simultaneously.

In another aspect of the invention, a retrieval method is provided that retrieves data object segments, or data object segment groupings, of original data objects during varying time intervals, and with varying time delays. Also provided is a data receiving method that receives the data object segments during various time intervals, and with varying time delays, so as to allow the re-assembly method to reassemble the original data object.

Re-Transmission of Segments by RCST Systems:

In another aspect of the invention, a retrieval method is provided that retrieves data object segments or data object segment groupings from a set of retrieval patterns that change over time. Also provided is a retrieval pattern that sets a retention period on a first RCST system, with instructions for each segment to be transmitted, with further relocation instructions for the segment or segment grouping to be transmitted to a second RCST storage location according to a pre-established pathway specified by the retrieval pattern. In this aspect of the invention, a retrieval pattern is generated that will provide a storage location destination on a first RCST address with a certain retention period along with embedded instructions to the first RCST system to transmit the segment in a secure manner provided herein to a second RCST system after the expiration of a specified retention period. The instruction can optionally instruct the first RCST system to destroy the segment stored on its system or continue to retain it after transmitting it to a second RCST system. The first RCST system can optionally embed instructions to the second RCST system to transmit the segment to a third RCST system after the expiration of a specified and optionally different retention period, and so forth, with multiple RCST systems participating in relocating the segment to different systems over different periods of time. The retrieval pattern can specify that only certain segments from an original data object will be relocated at certain time intervals, or all of them will be relocated at different time intervals.

In another aspect of the invention, a computer system is able to retrieve the stored segments of the original obfuscated data object from the diverse storage locations and reverse the obfuscation of the segments to restore the original data object (the "reassembly"). Reassembly is performed by initially retrieving the object management and segment management records detailing how the segments were configured for retrieval and reassembly prior to transmission. The Management Records will inform the system as to the locations of the segments, the keys used to decrypt them, the parts of the transmission pathway with its keys that were prepared for their retrieval known to the retrieving system, the protocols with which the segments can be retrieved, as well as the obfuscation pattern which must be reversed to reorder, reassemble, decompress, and decrypt the Original Data Object and its segments.

The retrieval method will perform a retrieval negotiation with RCSTs that both contain the valid encrypted segments from the original data object and those invalid segments that do not, in order to obscure the retrieval and storage pattern and path of the data object's segments. The retrieving system will both retrieve and store segments from multiple RCST's, whether or not they contain valid data from the original data object, in order to create invalid signals in the data flow.

In another aspect of the invention, a retrieval system retrieves multiple obfuscated data object segments from diverse, separate storage locations, accumulates, reorders, and reassembles the retrieved segments so as to reconstruct and recover the original obfuscated encrypted data object. The retrieval system can be the same system that transmitted the object, or another system which knows the pattern used to retrieve and to reassemble the object from the retrieved segments, or it can be a different system that has the required retrieval and reassembly information and is able to execute the processes required to retrieve and reassemble the various segments of the original data object. This aspect provides for data object synchronization, and information communication applications, between different systems using the invention.

In this aspect of the invention, the retrieval of the object segments can be executed on a system that is different from the originating system. In this aspect, a second system which is operating the invention can be informed of the retrieval pattern and transmission pathway with its associated storage location indices and encryption keys for a certain set of segments, segment groupings, and invalid data associated with an original data object. This retrieval information can be communicated between the different transmitting and retrieving systems through a number of methods including, without limitation, physical records, such as a bar code or QR code, through encrypted communications with a symmetric encryption key, through asymmetric key encrypted communications, through pre-determined patterns known to the two systems, and other methods for communication of secrets known to those skilled in the art of secret sharing. In this aspect of the invention, a first system operating the invention processes the object and transmits and stores its segments according to a set of patterns known to one or more separate retrieving systems, or according to a set of patterns generated at the time of processing which are communicated secretly to one or more retrieving systems.

When the Invention has retrieved all of the segments of the segmented data object, it then reverses the obfuscation processing that was performed on the object and its segments. It decrypts the segments, reorders them to their original order, removes invalid data, combines them into the original data object, decrypts and decompresses the data object, and verifies its authenticity with the hash value calculated prior to object obfuscation. The object is then restored and rendered usable in its original form.

Multiple Renderings of Segment Storage:

In another aspect of the invention, the originating system can process and transmit multiple renderings of the segmented object that are obfuscated and transmitted in different patterns for the purpose of providing differing retrieval pattern availability of the segments to multiple retrieving systems that do not know the same retrieval patterns, but are able to retrieve the segments during the allowed retention period with their specific retrieval pattern that matches one of the renderings transmitted by the originating system. In another aspect of the invention, the RCST system can be instructed, through an embedded instruction, to transmit a retrieval report to the originating system, that reports when the segment is retrieved by another system, to provide tracking and confirmation of the activities of the one or more retrieving systems.

In this aspect, an originating system, or an RCST system, can instruct a receiving or destination system, or RCST system, to receive, transmit, and store, in diverse separate secure access areas and storage locations, multiple renderings of the same data object segment using different obfuscation, transmission, retrieval and invalid data patterns. This allows multiple secure and private copies of object segments to be accessed and retrieved by different systems or parties using different retrieval patterns and encryption keys and methods, to be kept as redundancy and backup copies, and to be kept for differing retention periods. Also provided is a retrieval pattern communication system that can securely instruct other systems as to how to retrieve and reassemble one or more renderings of the segmented data object. Also provided is a data retrieval system that is able to utilize these patterns, instructions, and parameters to retrieve and reassemble the segmented data object.

Security Monitoring and Segment Relocation:

In another aspect of the invention, a security monitoring and reporting method is provided that reports activity within the system and distinguishes anomalous or suspicious activity with the invention. This allows operators of the invention, or an automated process, to analyze activity to determine if an attack or exploitation of the system has occurred or is occurring. Also provided is a method to instruct the systems storing the segments and segment groupings of the data object to further obfuscate and relocate the data object segments or their groupings to other storage and transmission systems automatically upon an event such as anomalous activity, after a specified period of time, or on demand. This allows systems to specify differing retrieval patterns for a set of segments that will expire and be superseded by other retrieval patterns over time.

Advantages of the Invention

Multiple advantages are provided by the invention. Two of which are: 1) secure and private data transmission between multiple differing storage and transmission systems, and 2) secure and private data storage across multiple differing and separate storage systems. When an encrypted and otherwise obfuscated data object is segmented into smaller pieces, it becomes extremely difficult, if not impossible, to decrypt the original data object without all of the pieces present and arranged in their correct position in the original data object. This is an extension and expansion of the phenomena wherein encrypted objects are less able to be decrypted to the degree that data is missing from the encrypted object. If only pieces of an encrypted data object are obtainable by an entity monitoring a transmission media or retrieving the contents of a data store, it is highly unlikely, or even impossible, that the entity will be able to recover the cleartext (unencrypted) contents of the data object. If those pieces of the data object are further obfuscated through encryption, reordering, inserting invalid data, or other methods, the entity must also correctly decrypt and reverse obfuscation of those objects before being able to determine if it has all of the correct and original segments required to decrypt the original data object, with such a determination being very difficult, if not impossible, to do without knowing the nature of the original data object and how it was obfuscated and segmented.

Further, the invention makes it less effective to steal, copy, or otherwise illegally obtain the contents of a data storage device or server since it would be extremely difficult or impossible to reconstitute the obfuscated data object from the incomplete collection of the object's segments stored on one, or even multiple, RCST systems, data storage resources, or secure access areas. By placing obfuscated segments along with invalid segments on storage devices located in diverse locations or with different storage vendors and systems, it is logistically difficult to collect all of the obfuscated data object segments associated with an original data object, and further to determine which of the object segments stored across multiple domains are in fact authentic parts of the original data object and which are invalid segments placed to further obfuscate the reconstitution of the object's contents. This data storage and communications system using no central server storing or transmitting an encrypted data object in its entirety, using either remote or local storage with original data object segments stored in separate secure access areas, provides the above advantages over current technologies that store encrypted objects in their entirety on one storage server, allowing for the possibility of theft of that data object and decryption of it by brute force cryptanalysis or other decryption methods.

Further, transmitting obfuscated segments of the obfuscated data object over diverse transmission media that follow different physical pathways greatly decreases the likelihood that an entity monitoring the data transmission pathways will be able to collect all of the segments of the original data object needed to reconstruct it. Further, if the transmitting and storage systems transmit invalid data object segments that appear to be obfuscated segments of the original data object, the monitoring entity will have to determine if those segments are part of the segments needed to reconstitute the original object. Further, if the transmitting system transmits the obfuscated data object segments with different source identifiers over erratic and sporadic time periods, and on different physical or logical transmission pathways, different transmission media, and different transmission routings, it will be more difficult for transmission monitoring entities to associate diverse transmitted data object segments to a specific source object or transmitting system. Further, since the invention transmits over multiple types of protocol layers, including, without limitation, HTTP, FTP, NNTP, SMTP, and others, the monitoring entity is required to detect and parse each type of protocol packet to discover data object segments. Further, transmitting and retrieving data object segments in multiple parts is often more efficient in terms of speed of communication, so transmitting the data object as smaller pieces provides an efficiency that partially compensates for the additional computing overhead of data obfuscation, transmission and storage of invalid data object segments.

The Invention requires that any third party wishing to discover the data object contents and collect all of the object's or encryption key's segments in transmission be able to:

Monitor all possible transmission protocols from the client device,

Monitor all possible transmission channels from the client device,

Know the encryption keys for the object, its segments, and transmission pathway

Collect all of the "valid" data object segments for the transmitted object in order to decipher it Accurately remove false or "invalid" data from the encrypted segments The invention requires that any third party wishing to discover the data object contents, and collect all of the object's segments in storage, or "at rest", be able to:

Know if the receiving system stored or only relayed a transmitted valid segment.

Know the transmitted segment transmission path and where it is finally stored.

Know the various encryption, compression and obfuscation methods and their ordination used on the object and its segments, i.e., know the Obfuscation Pattern Permutation.

Know where invalid data were inserted into the object segments at rest.

Be able to associate the correct set of segments with the original data object.

Know the keys used for encryption of the data object and its segments.

Know the segment reordering pattern of the original object.

Collect all of the "valid" segments for the transmitted object in order to decipher it.

Be able to access multiple and diverse secure access areas and/or storage systems.

The effort required to satisfy the requirements listed above is significantly greater than the effort required to "hack" or exploit data security systems commonly in use today. Because of this, the invention provides significant security and privacy benefits to users of digital data.

Additional aspects and embodiments of the present invention will become apparent upon review of the following detailed description and accompanying drawings.

Description of the Specific Embodiments

In one embodiment, an unencrypted data object is provided. Also provided are multiple optional data compression and decompression methods to reduce the size and repetitiveness of the data object. Additionally provided are multiple data encryption and decryption methods. Also provided is a process for segmenting, or dissembling an encrypted data object into segments, and for restoring, or reassembling, an encrypted data object from its segments. Also provided is a process for inserting invalid or false data that do not represent the content of the original data object into the original data object and into its data object segments, and a method for removing invalid or false data from the object and segments. Also provided are processes for reordering the segments so that the original order of the segments is obfuscated, and a method for reversing the reordering of the data object segments. Also provided is a process for grouping the reordered segments, and a method for rejoining, restoring to original order, and reassembling the separate segment groupings into the original unencrypted data object. Also provided is a process for inserting invalid data into original data object, its segments, and its segment groupings. Also provided is a method for specifying obfuscation, transmission, storage, retrieval, and reassembly of a data object using permutations of functions and function values, and a method for calculating a specific permutation of functions and function values for applying patterns of functions to the data object, its segments, and the invalid or false data.

Further provided is a method for transmitting these segment groupings over different data routings, infrastructure, and media, and a method for receiving the segment groupings over different data routings, infrastructure, and media. Also provided is a method for receiving these separate segment groupings from different data routings onto computing and storage systems that are able to execute instructions embedded in the data object segment transmission data. Further provided is a method for transmitting and receiving these segments and segment groupings of the data object and invalid data using different transmission protocols. Also provided is a process for receiving these segments, and segment groupings, with different transmission protocols onto computing and storage systems that are able to execute instructions embedded in the data object segment transmission data. Also provided is a process for translating segments from one transmission protocol to another, and then transmitting the segments using a different protocol to another receiving system. Also provided is a process for retrieving, reversing the obfuscation of, and reassembling the segments and segment groupings back into the original segments of the original data object so as to allow the reassembly of the segments into the original data object. Also provided is a method for decrypting the original data objects so as to restore the unencrypted original data object.

Further provided are the following methods and processes:

A Pattern Processor:

This method's functions include, without limitation: determining the configured source of permutation seed value, generating seed value if needed, calculating, reading, or receiving the permutation that specifies the set of functions and function values that the invention will use to obfuscate, transmit, insert and transmit invalid data, store, retrieve data object segments or their groupings, and reassembling distributed object segments into the original data object, and presenting these patterns to other methods. These other methods include, without limitation, the obfuscation, transmission package, transmission pathway, invalid data, retrieval and reassembly processors and their methods as disclosed herein, which utilize the associated pattern permutation from this processor to process the data object and its segments. These permutations of patterns of functions and values may or may not be stored in object and segment management records to allow the reassembly of an original data object from those records.

An Object Processor—

This method's functions include, without limitation: reading the obfuscation pattern permutation, creating and populating an Object Management Record (OMR), creating and populating a Segment Tracking Object (STO), digesting or hashing the Original Data Object (ODO) for later verification, identifying and obfuscating the encrypted original data object by segmenting, encrypting, adding invalid data, reordering, compressing, performing logical operations on, packaging data objects for segment processing, and otherwise performing obfuscating functions specified by an obfuscation pattern permutation that may be devised.

A Segment Processor:

This method's functions include, without limitation: reading the obfuscation and transmission pattern permutations, segmenting the original data object, tracking the segmentation of the original data object, obfuscating data object segments, encrypting segments, adding invalid data to segments, reordering segments, compressing segments, performing logical operations on segments, formatting data object segments with specified transmission protocols, embedding values, and instructions for processing to be performed by a system receiving a transmitted segment, encrypting segments for transmission, and preparing data object segments and segment groupings for transmission. Transmitted segment metadata that is added includes, without limitation, identifiers for packages and instructions to other systems, target storage resources identifiers, transmission pathway instructions, and other functions as can be devised to obfuscate and prepare for transmission of a data object segment, segment grouping, or invalid data object segment.

An Invalid Data Processor—

This method's functions include, without limitation: reading the obfuscation pattern permutation and the invalid data pattern permutation, determining the configured setting for generating invalid data, generating invalid data, and providing invalid data to other processes according to the invalid data pattern.

A Transmission Package Processor—

This method's functions include, without limitation: reading the Transmission Pattern Permutation (TPP), preparing and packaging for transmission, according to the TPP, object segments ready for transmission, obfuscating and encrypting packaged segments for multi-layer transmission, embedding instructions for further processing of segments by RCST systems, embedding instructions for transmission time lags between transmission of segments, if specified in the TPP, and packaging invalid data for invalid packet transmissions in different transmission protocols.

A Transmission Pathway Processor:

This method's functions include, without limitation: reading the transmission pattern permutation, preparing one or more transmission pathways with a series of one or more RCST systems for the reception, processing, storage, and transmission of object segments, maintaining a database of transmission pathway metadata, handling and preparing transmission keys and metadata prepared by RCST's, identifying, handling and preparing available transmission media, generating and exchanging encryption keys for hashing and transmitting, negotiating storage location reservations and other transmission metadata, determining and transmitting segments over the best transmission medium, securely transmitting segments to a process requesting those segments optionally using exchanged keys, determining qualities of and transmitting segments over various transmission media, performing transmission integrity verification, executing time lags between transmitting segments if specified, tracking status of transmissions, responding and rectifying transmission errors, recording transmission and other metadata in transmission and segment management records.

A Retrieval Processor:

This method's functions include, without limitation: reading the transmission and retrieval pattern permutations, negotiating object segment retrieval of stored data object segments with the RCST systems in the transmission pathway, receiving the segments from the RCST storage systems, and inserting them into the reassembly queue.

A Reassembly Processor:

This method's functions include, without limitation: reading the obfuscation, transmission, invalid data, and retrieval patterns' permutations, or, alternatively, according to system configuration, reading the object management and segmenting management records to determine how to reassemble the data object segments into the original data object, using the Segment Tracking Object (STO) to reconstruct reordered segments and to reject invalid data, verifying segment integrity, parse data object segments and segment groupings from various protocol formats, restoring the original order of reordered segments, decrypting segments and encrypted original data objects, removing invalid data, decompressing segments and data objects, reversing logical operations, and determining which retrieved data object segments are valid for use in the reassembly and recovery of the original data object.

An Initialization Processor and Main Program Loop:

This method is typically performed at system startup. Its functions execute according to configured parameters of the system and include, without limitation: checking for queued object retrieval requests, checking for queued object transmission and storage requests, using the permutation processor to prepare one or more sets of pattern permutations to prepare for processing of a data object, using a transmission pathway processor to prepare one or more transmission pathways, using the invalid data process to prepare invalid data objects, optionally updating RCST reference information, and identifying available transmission media. This processor then continues to perform these checks, invoke the transmittal of invalid object segments according to the Transmission and Storage Pattern Permutation (the TPP), and "hook" into any external idle cycle processes until the system exits.

In one embodiment, the invention provides for systems that Receive, Compute, Store, and Transmit ("RCST systems") segments, segment groupings, and invalid data object segments. These systems execute the same processors using the same types of patterns and functions as an originating or receiving system. RCST systems can also provide additional functions for the transmission, obfuscation, storage, receiving, and retrieval of data object segments. These include, without limitation:

Providing encryption keys to other system that wish to transmit, receive, or retrieve object segments or other data with the RCST;

Providing storage location reservations to processes that request to store data on the RCST system;

Exchanging encryption keys with other systems in order to securely transmit data to them, including other RCST systems, originating, transmission, or retrieval systems;

Negotiating storage location reservations with other RCST systems in order to reliably and retrievably store segments on them;

Executing instructions embedded in a segment packaging to process a received segment;

Executing instructions embedded in a segment packaging to prepare a multi-stage transmission pathway with other RCST systems for the transmission and retrievable storage of segments;

Receiving exchanged keys and storage locations from an RCST subsequent to it in the transmission pathway and transmitting those keys and location to the RCST system or originating system that precedes the RCST in the transmission pathway; Decrypting, Storing, or re-transmitting to another RCST or to a receiving system a retrieved segment according to a received instruction or according to a transmission pattern permutation;

Relaying received segments to another RCST system;

Translating the protocol or formatting of a received or stored segment into a different protocol or format and storing or transmitting that segment in its transformed protocol or format;

Executing instructions embedded in segment packaging to process data object segments for further obfuscation, protocol formatting changes, storage, relaying, encryption for transmission on a transmission pathway, changing identifiers or addressing to obfuscate the origin of data objects and their segments;

Encrypting a received segment with a key that was previously exchanged with another RCST or user system and transmitting the re-encrypted segment to that system;

Executing relays of invalid data object segments using the transmission methods described herein;

Originating generation, packaging, storage requests, and transmission of Invalid data object segments using the transmission methods described herein; and Executing relays of invalid data object segments using the transmission methods described herein.

FIG. 1 illustrates a flow diagram according to one embodiment of the present invention. In particular FIG. 1 illustrates an overview of a method for securely storing data from the first computer, or transmitting and synchronizing data object segments from the first to one or more other computers and storage systems, or in another embodiment, to a second computer.

Initially the original data object to be securely transmitted and stored is determined by a transmitting, or originating, computer, step 110. The data may include textual data such as documents, spreadsheets, credit card, financial information, form submissions, video, or the like; images data such as facsimiles, scans, photographs, or the like, and other types of data.

Figure 10:
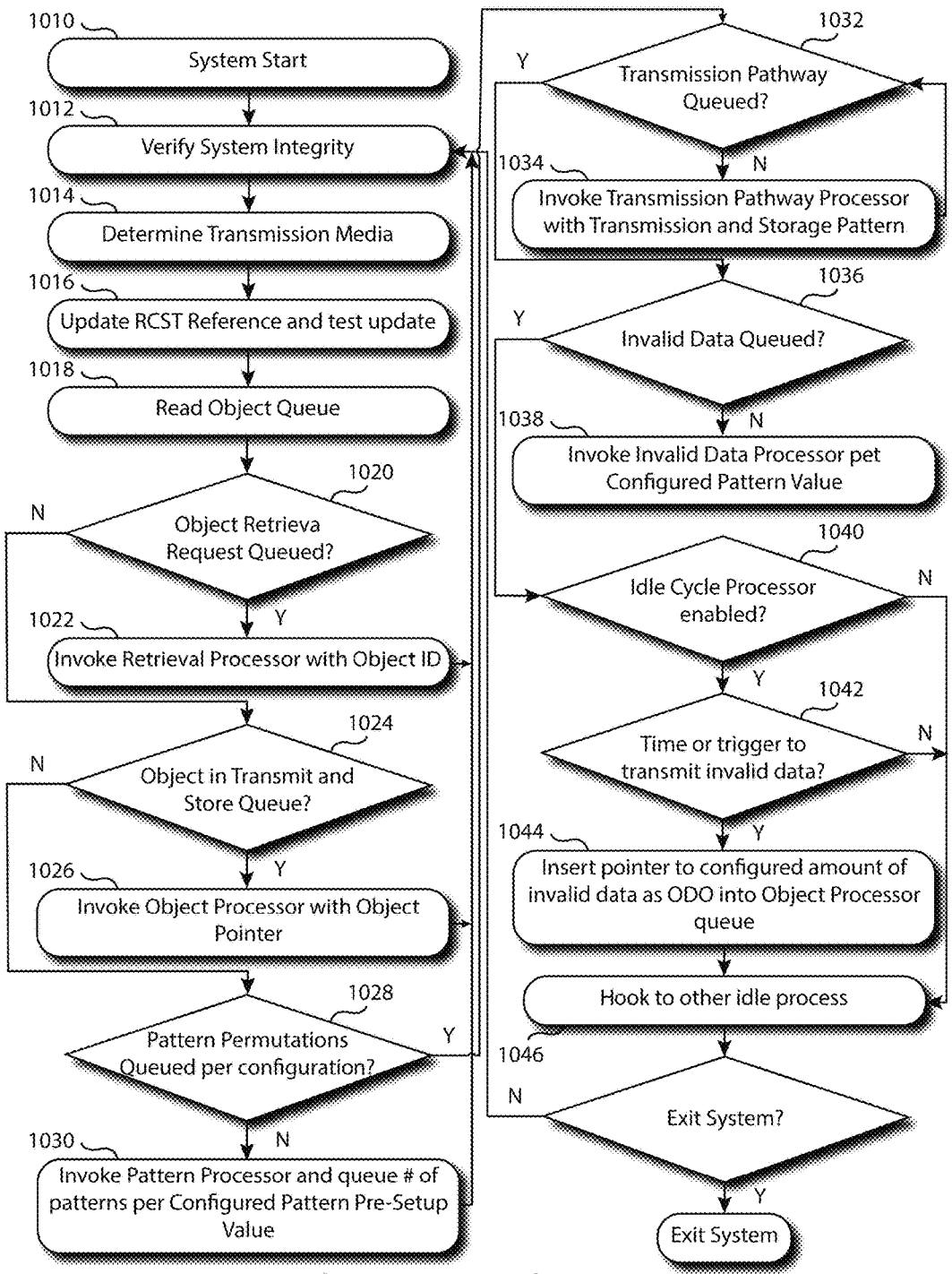
FIG. 10: A flowchart of the originating, or RCST, system initialization and main loop method.

Initialization and Main Loop Processor:

FIG. 10 illustrates the operation of the system in one embodiment. The originating system starts up, Step 2002, and then invokes the Initialization Processor to prepare the system for operation, which begins by verifying system integrity, step 2004, identifying, assessing, and queuing, for system use, any available transmission media allowed by a system configuration file, Step 2006. The Processor then, if configured to do so, optionally requests an update to the RCST reference table, Step 2008, which provides current information as to the IP addresses, Domain URL's, FTP identifiers, or other protocol, and specifies which RCST systems are able to exchange segments over a data transmission network. The system then optionally tests the responsiveness of one or more RCST systems, Step 2008. The system then queries the retrieval queue, Step 1012, and, if there is a retrieval request, it invokes the retrieval processor, Step 1014. The system then queries the Data Object process queue, and, if there is a Data Object processing request, it invokes the Object processor, Steps 1016 to 1018.

In one embodiment, the originating system uses a Pattern Permutation Processor to calculate unique, or as close to unique and non-repeating as possible, sets of functions and processes, and values and attributes for those functions and processes, that the invention will apply to an original data object and its segments for purposes of obfuscation, transmission, storage, retrieval, and integration of invalid data in the processing of that data object and its segments, Steps 1020 to 1022. As disclosed below in greater detail, this embodiment accomplishes this by using two algorithms, the first being an algorithm that selects a specific set of functions and processes, and the ranges of values and attributes that can be used with those functions and processes, called the functions permutation, and the second algorithm determining the specific values and attributes to be used from those ranges for the processing of the data object, called the values permutation. The offset can be calculated from a random or pseudo-random "seed value", or with other values as can be generated or acquired to achieve the purpose of establishing a permutation offset value.

The initialization processor further polls to see if a transmission pathway is queued and ready to be used by the system, step 1024, and, if so configured, will invoke the Transmission Pathway Processor to prepare the number of transmission pathways so configured, step 1026. In one embodiment of the invention, during the initialization period, and as needed during the system operation, the system invokes the Transmission Pathway Processor, step 1026, which allows an originating system, as well as RCST systems as disclosed below, to prepare and manage segment transmission over a segment transmission pathway by negotiating secure transmission with a sequence of one or more RCST or other receiving systems in order to transmit a segment to storage locations on the RCST or other systems in the transmission pathway.

The initialization processor then polls to see if invalid data is queued and ready to be used by the system, step 1028, and, if so configured, will invoke the Invalid Data Processor to prepare the amount of invalid data configured to be available, step 1030. The initialization processor then checks to see if the idle cycle processing is enabled, step 1032, and if so configured, will place an invalid segment in the Segment Processor, which will cause the segment to be processed and transmitted according to the next available Transmission Pattern Permutation, step 1034. This transmitting of invalid data object segments increases the difficulty for an unauthorized accessor of monitoring, capturing, and decrypting transmissions from the originating system. The initialization processor then checks to see if another process has been "hooked" into the main loop as a way to extend the functionality of the system, step 1036.

In this embodiment, the Main Processor from time to time, and as triggered by an event or by a timer, or by request from other processes, and if enabled to do so in the configuration file, determines that it is instructed to transmit invalid data packaged as a segment of invalid data, step 2033. It then executes a process to point to a configured amount of invalid data being presented by the Invalid Data Processor as ensured by step 1030. It then presents this invalid data pointer as an Original Data Object (ODO) by inserting it into the Object Processor processing queue, step 1034.

The subsequent processing, as disclosed in detail below, will read invalid data from the Invalid Data Processor, package it for transmission, and submit it to the Transmission Pathway Processor queue for transmission in the same manner that a valid data object segment is packaged and submitted for transmission. This action makes it more difficult for an unauthorized accessor to assemble a complete set of valid segments to restore the original object since they do not know if the transmitted invalid segment package is actually valid object segment data. It also raises the cost of attempting to acquire and identify obfuscated data, thereby reducing the likelihood of data theft.

The invalid data package is intended to be indistinguishable from the valid segments packages transmitted by the invention during its operation. To do this, the invalid data transmission process follows the same processes as for valid data transmission described herein, and is processed in a manner identical to a valid object segment. The RCST receiving this packaged invalid data will process it in the same manner as any other transmitted data object segment as disclosed herein.

Figure 11:
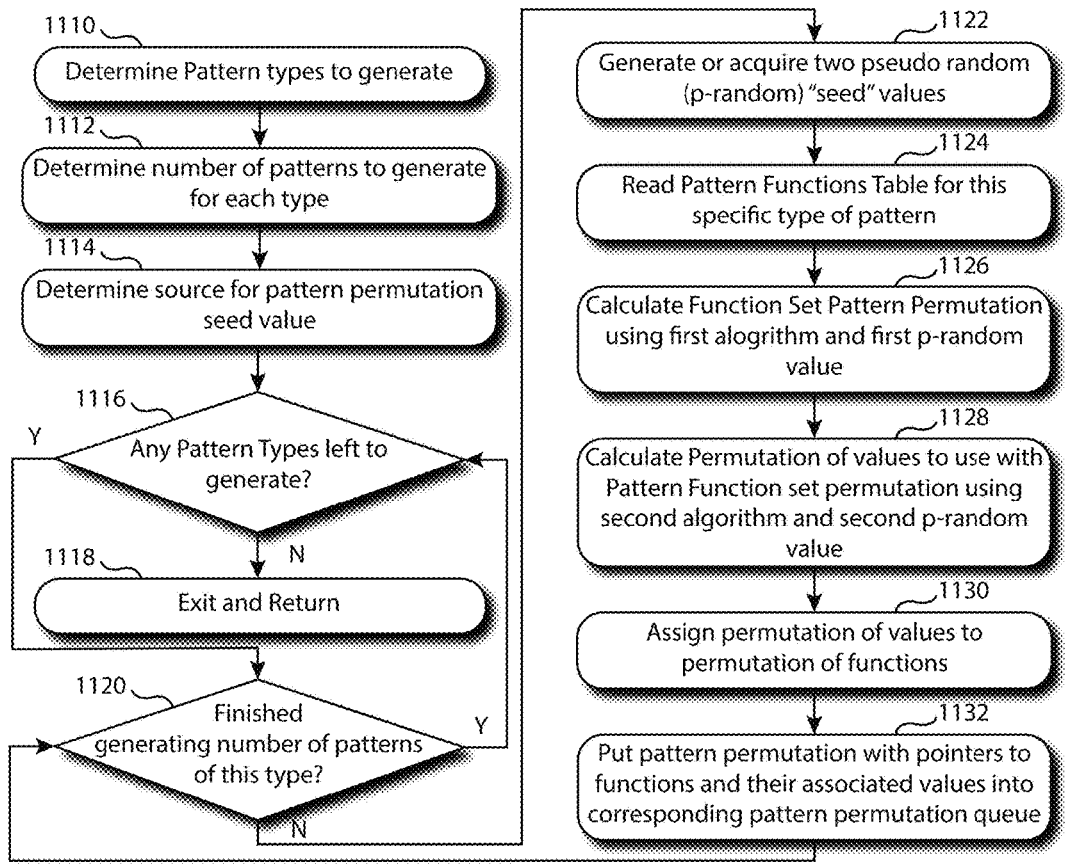
FIG. 11: A flowchart of the method that calculates, generates, records, and presents the permutations of function and function value patterns used by other processes in the invention.

The Pattern Processor:

FIG. 11 illustrates one embodiment of the Pattern Processor that calculates the permutations of patterns used to obfuscate, transmit, store, generate invalid data, retrieve and reassemble the original data object. In this embodiment, for example with the Obfuscation Pattern Permutation (OPP), a permutation calculation algorithm calculates the offset of a permutation of a pattern of obfuscation functions and function value ranges by starting with a base permutation in which the functions are all at the lowest values in their ranges. The permutation table from which the pattern is derived then increments each sequential permutation for the lowest level value field to its maximum value within the range specified as disclosed herein, and then increments the second lowest level value field to its maximum range while re-running the incrementing of the lowest level value field between each new increment of the second lowest level value. When the second lowest level value field is incremented to the maximum of its range, the third lowest level value field is incremented to its maximum range while re-running the full ranges of value fields lower than itself, and so forth, until all of the value fields in the permutation have been incremented through their entire range of values.

This allows the system to use an algorithm to calculate the values of a permutation offset based on knowledge of the permutation table schema, ordination, value ranges, and progression of value incrementing. The permutation offset algorithm can be programmed in a number of ways familiar to those knowledgeable in the art of programming algorithms for permutations.

For example, if there were four value fields (a, b, c, d) in the permutation table, with an allowed range of three values for each value field (1, 2, 3), the table would calculate in this manner:

a1,b1,c1,d1 /* all functions at their lowest value
a1,b1,c1,d2
a1,b1,c1,d3 /* the lowest level parameter maxes out its range
a1,b1,c2,d1 /* the lowest level parameter resets and the $2^{nd}$ lowest level value increments
a1,b1,c2,d2
a1,b1,c2,d3/* here the lowest level parameter maxes out again
a1,b1,c3,d1 /* here the 2nd lowest level value increments
a1,b1,c3,d2
a1,b1,c3,d3 / * here the $2^{nd}$ lowest level and lowest level values maximize
a1,b2,c1,d1 /* here the 3rd lowest level parameter increments
a1,b2,c1,d2
a1,b2,c1,d3
a1,b2,c2,d1
a1,b2,c2,d2

Additional security and privacy can be provided by changing the permutation pattern algorithms in a number of ways that include, without limitation, changing the functions in the list of functions allowed in the permutation, changing their order of execution, changing the manner of sequencing attributes and values in the value field sequencing (for example, descending instead of ascending), changing the allowed range of values for an obfuscation parameter, and using an algorithm that predictably scrambles the order of the permutations in the final table.

As illustrated in one embodiment in FIG. 11, the originating system first determines what type of patterns it will generate, step 1110, and then the number of patterns for each type, step 1112. It then determines the configuration for the source of the patterns, which can include, without limitation, reading the permutations from a predetermined list of permutations, acquiring the permutations from an external system or user, or by generating random seed values with which to calculate the permutations. In this embodiment, the pattern processor checks to see if there are any types of pattern permutations to generate, step 111608, and if there are, it determines the number of those patterns left to generate, step 1120. In this embodiment, the processor will calculate the permutations so it generates two random, or as close to random as possible, values, Step 1122, that will be used to calculate the functions and function input values in a set of permutations that constitute a pattern used for original data object processing. For example, when the invention is invoked to process an original data object for secure storage and transmission, and it will then use this embodiment of the Pattern Processor to establish the specific data processing functions and function input values that comprise the manner in which a specific data object will be obfuscated, transmitted, stored, retrieved, reassembled, and integrated with false invalid data during its processing.

In another embodiment, the values used in the pattern permutation calculation algorithms can be determined by multiple methods, depending on the configuration of the system, including, without limitation, to automatically generate a random, or as close to random as possible, set of values, to automatically select a set of values from a provided list of values that may or may not be a list of randomly generated values, to request a set of algorithm input values from an outside source, such as a random number generator connected to a network or an external synchronized number generator, to request the input of a set of values from a system operator, and the like. The set of values, however determined, that are used in the algorithms to calculate the pattern permutation offsets are herein referred to as "seed values".

The Pattern Processor then reads a table of function pointers with function input value ranges for the specific type of pattern being processed called the "Pattern Functions Table", step 1124, from which it will determine the set of functions and their input value ranges from which it will calculate the permutation offset to determine a set of functions and value ranges to be used in processing the ODO and its segments. It then determines a first permutation of a Function Set Pattern with value ranges, step 1126, from a permutation of the Pattern Functions Table from the first seed value offset. It then calculates the permutation of the specific values permutation for that Function Set Pattern using the second seed value offset, step 1128. It then assigns the values in the second values permutation to the function pointers in the first Function Set Pattern permutation, step 1130. This assignment produces a pattern of function pointers and their input values that will be applied to the processing of the original data object and its segments by placing the pattern into the pattern permutations queue for a processor method corresponding to that step in the ODO or segment processing, step 1132.

The first "seed value" is used as the input to an algorithm that calculates the specific offset of, and contents of, permutation values for the ordination of pointers to functions specified in the Pattern Functions Table that determines the processing sequence order, the range of attribute values for, and the enabling, or disabling of, functions that may be performed by a particular processor method of the invention disclosed herein. The second seed value is used as an input to an algorithm that calculates the permutation offset specifying specific values within the function input value ranges found in the permutation offset calculated by the first permutation algorithm. The second permutation of specific function values will be used as inputs to the functions determined by the first permutation calculation. In one embodiment, the first algorithm determines the permutation of functions, their processing order, and the input value ranges to be used in a pattern with those functions, step 1126. The second algorithm determines the specific values from the value ranges of the first permutation that will be used in a pattern of functions employed by a processor method in the invention, step 1128.

In one embodiment, the originating system will execute a program to determine two "seed numbers", step 1122, and use the first seed value in calculating a first permutation of a set of obfuscation function pointers and use the second seed value in calculating a second permutation of specific input values for the functions determined by the first algorithm's calculation. This pattern of obfuscation functions is herein referred to as an Obfuscation Permutation Pattern, or "OPP".

To construct the permutation algorithm that will calculate the OPP values, which functions will be included in the obfuscation process, the values used for those functions, and their order in the processing sequence permutation, the system uses the seed number to calculate a result that acts as a pointer to a position in an algorithmic range of permutations of a set of functions and associated ranges of values. This set of functions, and associated ranges of values, is defined by a "Pattern Functions Table", an embodiment of which is shown in FIG. 25, as provided in the invention, that lists data object processing function pointers available for execution by the embodiment of the invention on the originating system. The Pattern Functions Table lists ranges of values that can be used as parameters in the execution of those functions. As an illustrative example, if the algorithm were used to generate a table of all possible permutations in its set of available functions and value ranges, a row in that table would represent a specification as to which functions are to be performed on the data object, the ranges of values available for each of those functions, and the processing sequence order of those functions when used in the process of obfuscating the data object.

An "obfuscation pattern" derived from a permutation table will specify an ordination of pointers to functions that perform, without limitation, compressing the data object, including which algorithm will be used (Zip, Tar, Rar, etc.), encrypting the data object, including which encryption algorithm will be used, what key length will be used, and how the key will be generated.

Any logical operations may be performed on the data object or its segments, such as NOT'ing a segment to reverse the values of each of its bits, XOR'ing the object to a defined bit mask, and the like. The permutation can specify that the XOR mask be derived from a password known to a user.

Where invalid data will be inserted into the encrypted data object or its segments, How many segments the ODO will be divided into and the size of each segment by percentage of the ODO size, How segments will be rearranged into larger groups containing reordered, incongruous segments, How long the segments will be retained in the system. The invention provides for specification of a retention period for each stored segment.

In one embodiment, the "Pattern Functions Table" contains pointers to functions and their associated value ranges for the obfuscation of data objects, their segments, and invalid data. These functions include, without limitation, Compression Algorithm 1, Compression Algorithm 2, Number and proportion of Segments into which the data object will be divided, $1^{st}$ Encryption Algorithm, $1^{st}$ Encryption key range, $2^{nd}$ Encryption Algorithm, $2^{nd}$ Encryption key range, $3^{rd}$ Encryption Algorithm, $3^{rd}$ Encryption key range, Invalid Nybbles insertion pattern, Invalid Bytes insertion pattern, segments re-ordering pattern, XOR mask, Logical NOT, and the like. Other obfuscation functions can be included in a Pattern Functions Table that will be known to those familiar with the art of data obfuscation, such as bit reversal, one time pads, substitution, and others. An important part of the variation in obfuscation patterns is the inclusion and exclusion of specific functions in the pattern. Variation in the Patterns Functions Table produces variations in the pattern permutations used by the system processors, thereby increasing the complexity of the obfuscation and cryptanalysis requirements, thereby making it more difficult for unauthorized accessors to access the original data object.

The system then establishes, through one of various methods disclosed herein, a second "seed number" to calculate an offset in the second algorithmic table of specific values permutations from the ranges associated with the function permutations calculated in the first permutations table from the "Pattern Functions Table". As an example, this second calculation will determine the specific value to be used from the range of function input values allowed in the permutation of Pattern Functions determined by the first permutation algorithm.

An example from an embodiment of the extrapolated permutations table used as the algorithmic base for calculating pattern permutations is illustrated in FIG. 23, Step 2310, as well as in FIG. 24, step 2410. In this embodiment, FIG. 23 shows a portion of the table for the first permutation of functions, their ordination, and their value ranges from the Pattern Functions Table. The lowest level value field, the Segments Ordering function, is incrementing its range of values in the portion of the table shown in this example. FIG. 24 shows a portion of the table for the permutations of specific function input values, i.e., the second permutation algorithm, for a particular permutation of function pointers determined by a first permutation algorithm.

In one embodiment, the "Pattern Functions table" includes, without limitation, the attribute value ranges and function pointers for computer software functions that perform obfuscation functions, including, without limitation, data compression, XOR masking, encryption with various encryption algorithms, including, without limitation, AES, RSA, and Triple DES, invalid data generation, and Logical NOT transformation. In this example, the first permutation algorithm uses the first seed number to calculate an offset for a permutation of these "Pattern Functions Table" function pointers that can be represented as a row in a table, as illustrated in FIG. 23. In this example, available attribute value ranges are expressed in hexadecimal numerical representation. FIG. 23 shows these obfuscation functions and values in tabular format. In this example, step 2310 shows the specified functions and value ranges as calculated by the first permutation algorithm in a partial permutation table with functions reordered by the permutation calculation.

The second permutation algorithm will then use the second seed number to calculate the second permutation offset specifying the specific values for the attributes of the first permutation's functions. This combination of functions and values will be used by the Obfuscation Processor disclosed herein for the obfuscation of data objects, their segments, and invalid data. In this example, the second permutation algorithm uses a second seed value to calculate a permutation offset of input values for the set of functions calculated by the first algorithm, in FIG. 24, step 2410.

The obfuscation function input values permutation calculated by the second permutation algorithm is assigned to the functions in the first Obfuscation functions permutation, step 1130. It is then presented to, and used by, other processors in the invention as the "Obfuscation Pattern Permutation", or the OPP. For example, in this embodiment and according to the processing order and attribute values calculated by the second permutation algorithm as shown in FIG. 24, this OPP is used by the obfuscation processor to obfuscate a data object in the following manner: Compress the data object with the TAR compression algorithm, do not insert invalid nybbles, insert an invalid byte value after every hexadecimal 31 bytes in the object, then encrypt the object using the RSA encryption algorithm with the encryption key of "0A49FF34", then encrypt the object again using the AES encryption algorithm with the encryption key of "00115", then transform the encrypted object with an XOR operation using the mask "6AD7", do not perform a logical NOT transformation, segment the object into 20 segments (hex 14), reorder the segments by positioning after every third segment that segment that is six segments subsequent to it. Other obfuscation functions and actions, as well as other value ranges, as may be devised by those skilled in art of data obfuscation, will be included in other embodiments of the invention.

The originating system will similarly calculate permutations of patterns used for the obfuscation of data object segments, the transmission and storage of segments, the retrieval of segments, and the insertion and transmission of invalid data. FIG. 25 shows other pattern permutation function types for the processors named in this embodiment, and example value ranges for those functions. The functions and value ranges are meant to be exemplary only, and do not imply that, in the invention, these patterns are limited to performing these specific functions with these specific attribute value ranges.

Figure 15:
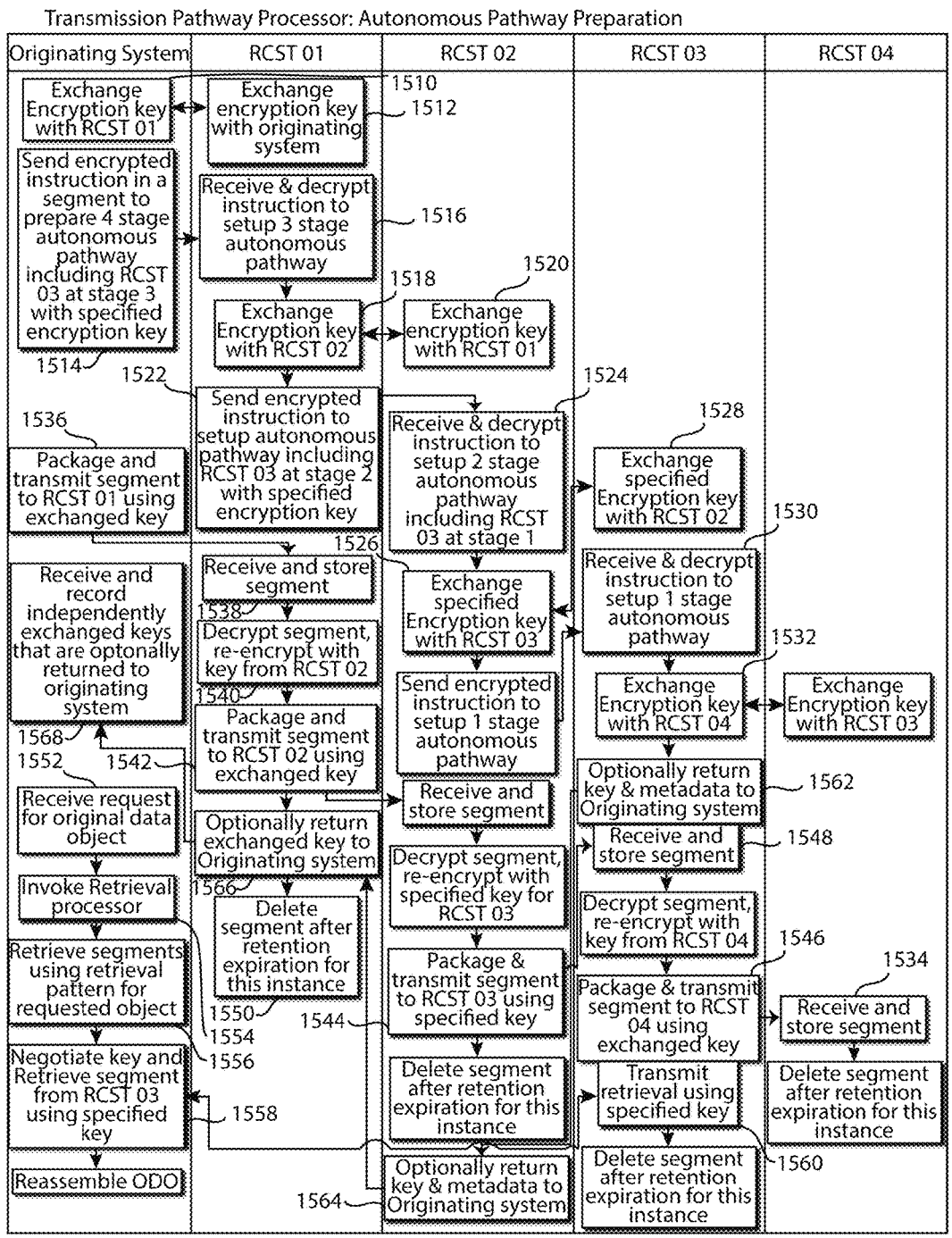
FIG. 15: A flowchart of the method in which diverse remote processing RCST systems autonomously prepare a transmission pathway for the diversified, separated transmission, and diversified, separated, and secure storage of valid and invalid Segments.

In this embodiment, a transmission and storage pattern permutation can specify a series of RCSTs with which the transmitting system will exchange encryption keys and reserve storage locations so that no segments, or too few segments to reassemble the ODO from the same original data object will be stored in the same secure access area. A transmission and storage pattern permutation will specify how the originating system will encrypt a segment successively with the ordered keys exchanged with the RCSTs that are its intended transmission pathway, or instruct an RCST to initiate an autonomous multi stage encrypted transmission pathway preparation and transmission independently of the originating system, as illustrated in FIG. 15. The transmission pattern and storage pattern permutation can also specify the instructions to be embedded with the segments in each successive encryption. These will be the instructions provided to a specific RCST system in the transmission pathway. These instructions can include, without limitation, instructions to prepare a transmission pathway, retransmit ("relay") the segment to another RCST, store it in a pre-arranged indexed location ("reservation") in its storage, or prepare and transmit other transmission pathway exchanges for a certain count of transmission stages in order to reach an intended storage location that corresponds to the retrieval pattern for a transmitted segment.

The Pattern Processor then presents to other processors, and methods in the invention, the Pattern Permutations that it has calculated for the various pattern permutations. Pattern Permutations may be calculated and presented on demand from another process, upon system initialization, during activity lags in the system, or in advance of an anticipated system process. In another embodiment, they may optionally be calculated in batches and stored in reference tables to reduce compute time during the processing of an original data object.

The Pattern Processor also optionally presents the seed values, the "Pattern Functions Table", and other elements used in the calculation of the permutation patterns for recordation by other processes in the original data object, segment, and transmission management records. This allows these other processes and methods to re-calculate the pattern permutations without having to store those permutations to assist in reassembling the original data object.

In another embodiment, the records of processing and transmitting a data object or its segments by the invention, including, without limitation, the Object Management Records, the Segment Management Records, the various Permutation Patterns, exchanged encryption keys and other metadata for RCST processing, any optional log entries, and the like, are stored in the originating system, or on another receiving system, as encrypted files that are also optionally segmented and stored in diverse places according to the process disclosed herein. This provides security and privacy for the inventions components on the end point systems utilizing the invention.

The system can use the pattern permutation processor during initialization, step 1022, or during idle cycle processing, step 1036, to prepare and queue one or more sets of pattern permutations according to the initialization configuration file in order to expedite later processing of an original data object and its segments.

In this embodiment, the system then uses a queued transmission pattern to prepare and queue one or more transmission pathways according to the initialization configuration file, step 1026, or the main loop processing, or during idle cycle process time, step 1036, in order to expedite later transmission of original data object segments.

The Invalid Data Processor:

In the present embodiment, different processes and processors may require false or invalid data to be inserted into an object, or into an object segment, or to be formed into segments of invalid data and transmitted using various transmission protocols, media, and routings, according to the methods of the invention. This is done in order to obfuscate the transmission and storage of valid ODO segments, either in transit or at rest. Invalid data uses may include, without limitation, that the Object processor may request invalid data from the Invalid Data Processor to insert into an original data object during obfuscation, the Segment Processor may request Invalid Data from the Invalid Data Processor for a Segment Tracking Object (STO) to point to during reordering, invalid data insertion, and other obfuscation of the segments, and the Transmission Package Processor may request Invalid Data segments to package and transmit in order to obfuscate which transmitted packets contain valid data from the ODO.

Figure 18:
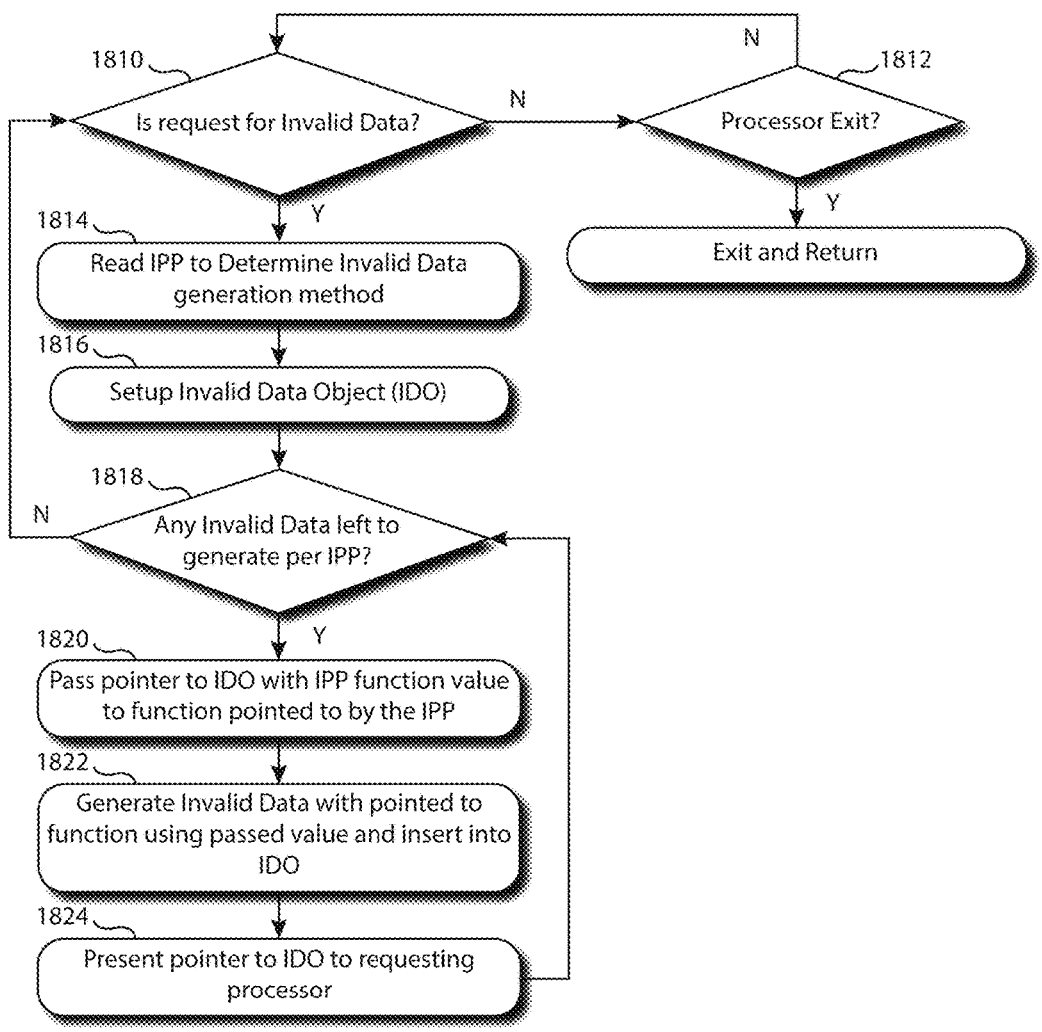
FIG. 18: A flowchart of the method that calculates, generates, and presents permutations of invalid data, as defined herein, that are used by other methods in the invention.

The Invalid Data is generated and made available to other processes from the Invalid Data Processor. FIG. 18 illustrates one embodiment of the Invalid Data processor. In this embodiment, this processor first senses a request for Invalid Data, step 1810, and then reads the Invalid Pattern Permutation (IPP) generated by the Pattern Processor which will direct the generation of the Invalid Data, step 1814. The IPP will provide a permutation of a set of functions to generate invalid or random data as specified, as well as specify an amount of Invalid Data to generate. These functions and their input value ranges are specified in the Pattern Functions Table for the IPP, and may include, without limitation, functions that generate Invalid Data by stringing together multiple randomly, or pseudo-randomly, generated bytes of data, fetching an amount of data from random access memory and then transforming it using a logical operation or other obfuscation methods, using input from sensors or other input devices to generate random data, acquiring intelligible data or content not from the ODO, or other methods of generating unpredictable, non-patterned data, as can be devised.

The Invalid Data Processor then sets up an Invalid Data Object according to the specifications of the IPP, step 1816. It then tests to ascertain if Invalid Data remains to be generated per the IPP, step 1818. If so, it then passes a pointer to the IDO and the IPP function value, determined by the second pattern permutation algorithm, to the Invalid Data generation function pointed to by the IPP function pointer, step 1820. The function then generates the type and amount of Invalid Data specified by the IPP and inserts it into the IDO, step 1822. The Invalid Data Processor then presents a pointer, to the IDO block, of invalid data, and a length for that block to the requesting process, step 1824.

When the requesting process completely or nearly uses the content of the IDO, and if it requires more invalid data, that process will request more Invalid Data from the Invalid Data Processor, step 3802, which will generate another IDO to present to the requesting process, step 1824.

In this embodiment, the Invalid Data is generated as randomly as possible so that pattern analysis will not reveal that data in transit or at rest conforms to a predictable Invalid Data pattern.

In another embodiment of the invention, the invalid data processor generates invalid data by obfuscating a non-random data object that contains interpretable content that may convey a meaning that is not from the ODO's contents using the processes disclosed herein. One of the purposes of this, without limitation, is to present data to unauthorized accessors, the decryption of which can mislead them in a deduction or prediction of the contents of the ODO.

Figure 12:
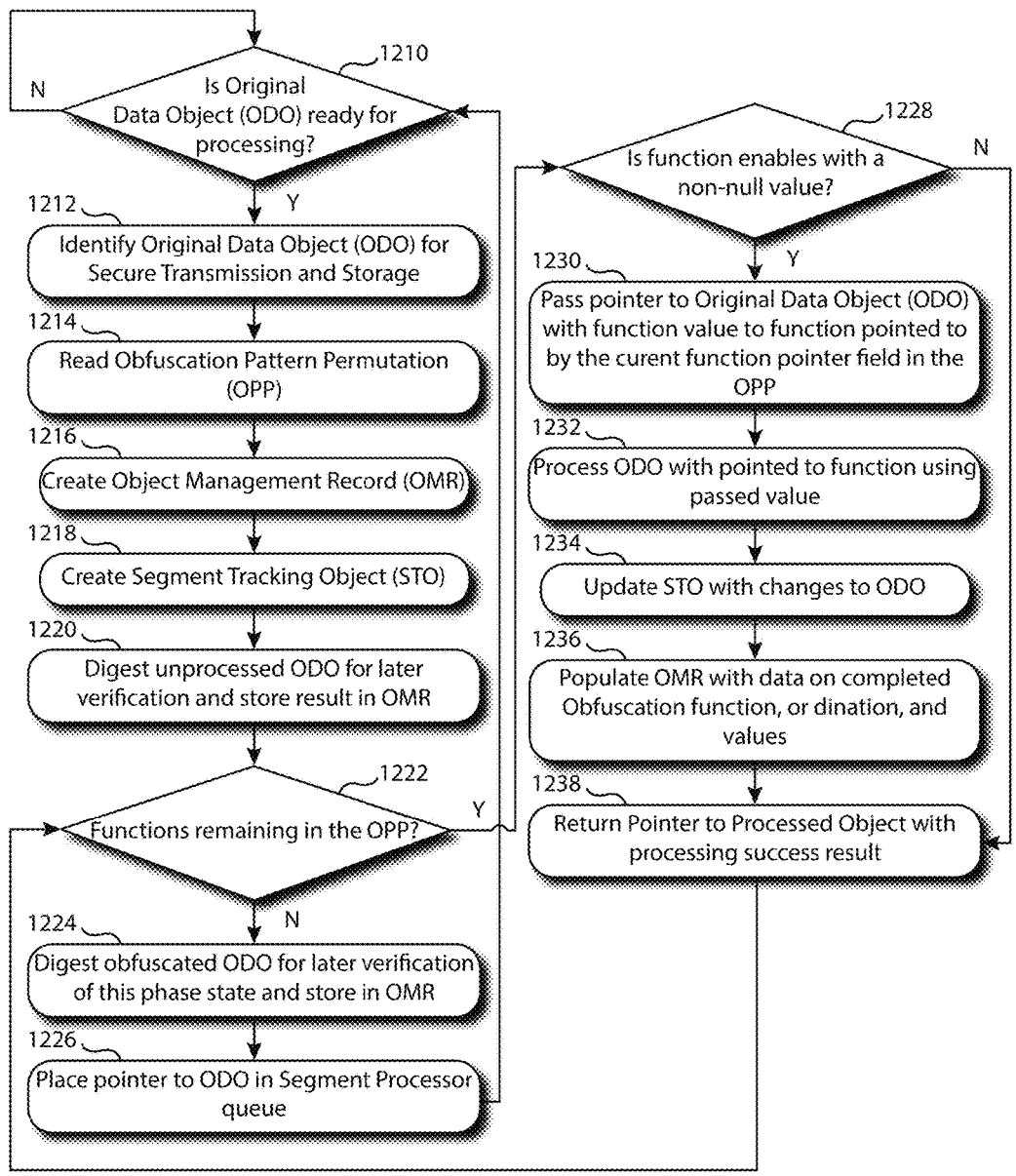
FIG. 12: A flowchart of the method that uses an Obfuscation Pattern Permutation to obfuscate an ODO while recording the obfuscation metadata in an Object Management Record.

The Object Processor:

In one embodiment of a method of the invention, as illustrated in FIG. 12, the system monitors for the presence of an original data object pointer in the Object Processor queue specifying an object to be processed according to the invention, Step 1210. When a data object, typically comprised of a binary bitstream, but possibly comprised of data blocks, is identified for processing, Step 1212, the system continues processing of the object.

The data represented by the object may include textual data such as documents, spreadsheets, credit card, email, SMS texts, financial information, Personally Identifiable Information, Protected Health Information, form submissions, database field values, or the like; image data such as facsimiles, scans, videos, photos, or the like; or other types of data for which secure transmission and storage is desired.

The pointer to the data object to be obfuscated, segmented, and transmitted may be placed into the Object Processor queue by a user action or, in another embodiment, the data object may automatically be placed into that queue by another computer program, or by using methods that may be automatic or intentional by a human user, or automatic or intentional by a computer or other processing system. An example of the latter case is where all the transmissions from a first computer across a network to another computer are to be secured according to the methods described herein. In another embodiment, the originating system user double clicks a file icon, executes a file save command from a menu, or drags a file icon into a designated folder, hits save in a computer application, or attaches a data object file to an email, all of which actions result in a pointer to that specific data object being placed into the Object Processor queue.

In this embodiment, if the user, or process invoking the processing of the ODO by the invention, specifies to not keep a copy of the original data object on the originating system, then the original data object can be rendered as a "stub" in an operating system interface that will invoke the Retrieval and Reassembly Processors when an action is performed on the stub by a system user, by the occurrence of an event, by an automated process, or the like. If the user or process specifies that the ODO is to be retained on the originating system, then it is not replaced with a stub and is retained.

The object processor reads and loads the Obfuscation Pattern Permutation (OPP), step 12146, which provides an ordination of pointers to the obfuscation functions and their input values that will be executed on the original data object. The Object Processor then creates an Object Management Record (OMR), step 12168, which it will use to record function pointers, input values, encryption keys, verification hashes, and the like. The OMR will be used after segment retrieval to assist in the reassembly of the ODO. The system then creates a Segment Tracking Object (STO), step 1218. The STO structure is illustrated in FIG. 22, and is described in greater detail below. The Segment Processor uses the STO to efficiently divide the ODO into segments, reorder and optionally group the segments, and insert invalid data into the ODO and its segments. The system then calculates a digest hash on the data object, step 1220, for verifying the integrity of the reassembled data object.

One embodiment of the data definition of the Object Management Record is illustrated in FIG. 70. Note that it contains optional pointers to Function and Values Records, the structure of which is shown in FIG. 72, which are elements of a list that can hold the functions, ordination, and values from the various permutation patterns used in the invention to process the original data object. These can be used instead of re-calculating the pattern permutations for the purpose of reassembling the original data object.

The system loops through the functions permutation in the OPP, step 1222, and for each function in the pattern, determines if the function is enabled and is assigned an input value, step 1228, and if so, passes a pointer to the ODO along with the pattern permutation function value to the function pointed to by the permutation function set, step 1230. The pointed to function processes the original data object according to its method and the passed input value, step 1232. The various obfuscation functions that can process the data object are well known to those familiar with data processing, and are not shown. The Object Processor then populates the STO, step 1234, and the OMR, step 1236, with information about the processing of the object that can be used to reassemble it, which are shown in FIGS. 70 and 72, as disclosed above. This is repeated until all of the functions pointed to by the OPP are executed as determined in step 1228, at which time the processed original data object is hashed for later verification during reassembly, with the hash value stored in the OMR, step 1224, and a pointer to the now obfuscated and encrypted ODO is placed into the Segment Processor queue, step 1226.

Depending on the OPP's permutation of the Obfuscation Pattern Function Table, the data object may be compressed in step 1232. Various compression methods may be used, and are well known. The data object may be encrypted in step 1232. Various encryption methods may be used, and are well known. The data object may be encrypted one or more times according to the encryption layer specification of the OPP in step 1232. An embodiment of this OPP specification is illustrated in FIG. 24, step 2410. In this embodiment, the data object is encrypted once using a private key of an asymmetric duel key system, as is commonly known to those skilled in the art of encrypting data. Alternatively, encryption methods may be used in an embodiment of the present invention that do not use the method described above, but provide an equivalent encryption capability. Further embodiments of the present invention may use encryption techniques where, as the more valid data from the original data object is not present at time of decryption, the object is the more increasingly difficult to decrypt and reassemble.

In the present embodiment, other obfuscation methods and functions are executed on the data object as specified by the OPP in step 1232. The OPP can specify the execution of multiple types of obfuscation functions in step 1232 depending on the permutation of functions and values determined by the Pattern Processor. These include, without limitation, further compression or encryption using the same or other compression and encryption algorithms, inserting invalid data at various locations in the object, determined by the invalid data pattern, performing logical operations such as an XOR or NOT logical operation on the data object or a portion thereof, or other obfuscation functions as may be devised. In one embodiment, the OPP specifies that the object is to be compressed with a TAR compression algorithm, encrypted with a triple-DES multi-layer encryption with the specified keys, that invalid bytes will be inserted from the invalid data queue after every $10^{th}$ byte of the data object, and that a logical NOT will be performed on the entire data object.

In this embodiment, when the Object Processor completes processing of the original data object (ODO) according to the Obfuscation Pattern Permutation, the ODO has been optionally compressed or encrypted, or encrypted in multiple layers, by the Object Processor, as illustrated in FIG. 12. The ODO is then hashed or digested, the result of which will be recorded in the Object Management Record for later verification purposes by the retrieval and reassembly methods of the invention. The system then mounts an Invalid Data Object (IDO) that is obtained or generated according to the Invalid Permutation Pattern (IPP), which is calculated from an invalid data permutation algorithm according to the Pattern Processing methods described herein, which can include, without limitation, generation of the IDO by a sequence of randomly generated numbers, fetching a sequence of bytes from a position in memory, importing intelligible data not from the ODO, or reading a portion of a predetermined string that preexisted in the system.

FIG. 21 illustrates a representation of an Original Data Object (ODO) as it is processed by one instance of the Object Processor and subsequent Segment Processor disclosed below. Step 2110 illustrates, in hexadecimal notation, a portion of the ODO prior to processing. The Object Processor then performs functions on this ODO, step 1232, according to the OPP. Step 2112 is a simulated representation of the data object after compression by the TAR compression algorithm, as shown in the OPP calculated for this embodiment, as shown in the first field of FIG. 24, step 2410. Step 2114 in FIG. 21 then shows a simulated representation of the ODO having been encrypted by the RSA encryption method according to the fifth field in the OPP in step 2410.

In the embodiment shown in FIG. 12, the functions performed by the Object Processor on the data object are recorded in the Object Management Record (OMR), step 1236, which provides the record of functions that allows the Reassembly Processor method to reverse the functions of the Object Processor method and restore the data object to its original form.

FIG. 28 illustrates the database schema used in one embodiment for the Object Management Record. The pattern permutation actions performed on the object are recorded in corresponding pattern Function and Values list records shown in FIG. 72, and pointers to those record lists are recorded in fields numbered OMR022, OMR023, and OMR024 as appropriate.

In the present embodiment, when the Object Processor has completed obfuscating the original data object according to the OPP, it inserts a pointer to the processed and segmented original data object into a queue for the Segment Processor and sets a notification flag that a new object is ready for segment processing, Step 12262418.

Figure 13:
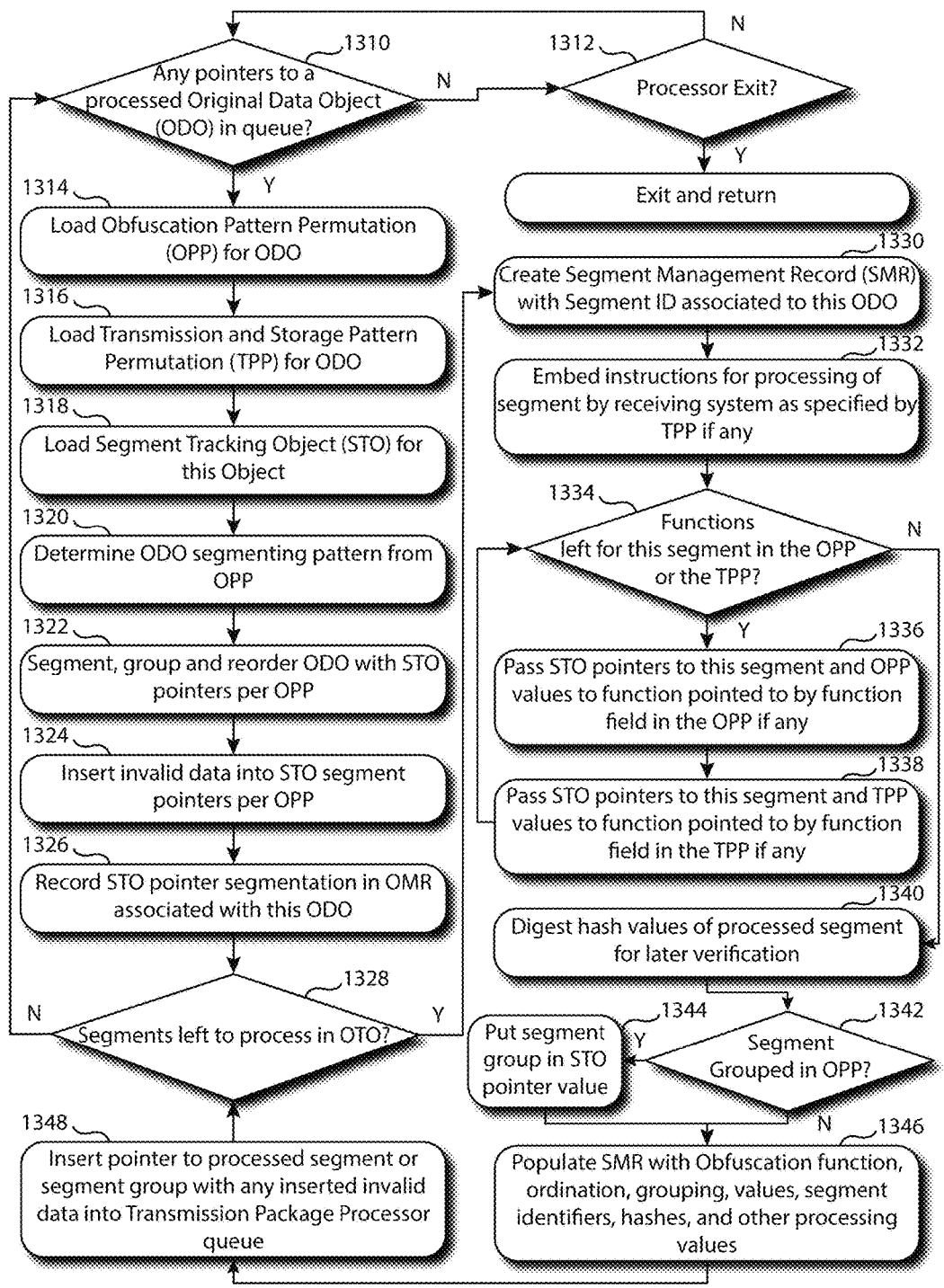
FIG. 13: A flowchart of the method that segments an ODO, reorders, groups, and inserts Invalid Data into the segments, and obfuscates and encrypts the segments using functions specified by the Obfuscation Patter Permutation while recording the segments' processing metadata in a Segment Management Record.

The Segment Processor:

FIG. 13 illustrates a Segment Processor method in the present embodiment. When the Segment Processor determines that there is a segmented object ready to be processed in its queue, or determines that the new segmented object available flag has been set by the Object Processor, step 1310, it reads and loads the associated OPP, step 1314, Transmission Pattern Permutation (TPP), Step 1316, and STO, Step 1318.

Next in the present embodiment, a data object segmenting pattern is determined by reading it from the OPP, step 1320. In a different embodiment, the segmenting pattern may be generated on the fly, or it may be a predetermined segmenting pattern from a library of segmenting patterns, or determined by a calculation of segmenting permutations in a separate obfuscation pattern permutation calculation. The length of the original data object is determined for segmenting purposes, and the divisor specified in the OPP is then applied, and the original data object is then divided by the divisor into segments of data of the original data object represented as pointers in the STO.

An embodiment of an STO, as shown in FIG. 22, illustrates that an STO structure contains an array of fields for pointers to data object segment locations and lengths within an ODO, an IDO, or another data object, shown in step 2210 showing the segment location, step 2212 showing the segment length, and in combination with step 2220 that specifies in which data object the segment is located. The STO embodiment also provides ordination value fields that allow manipulation of the ordination of the segment pointers for reordering the segments, including invalid or other data object segments. Step 2214 is populated with the ordination of the segment prior to reordering, and step 2216 is populated with the ordination of the segment after reordering. These values can efficiently be populated so as to reorder and intermingle valid, invalid, and other segments into the segments that will be processed, packaged, transmitted, stored, retrieved, and reassembled according to the methods of the invention, without physically or logically changing the pointed to objects. The STO embodiment in FIG. 22 also shows grouping value fields, step 2218, that allow pointers to optionally reordere segments from diverse data objects to be grouped into a specific segment grouping when this field is populated with the same group value. The STO embodiment additionally provides a field as in indicator as to which data object the STO record pointer is pointing, step 2220.

The STO populates its array of pointers with values pointing to positions in the Original Data Object according to the segmentation specification in the OPP, step 1322, as well as populating pointers with values pointing to positions in a stream of Invalid Data that has been presented by the Invalid Data Processor, step 1324. The OPP may specify that the segments are not of equal length, but of different lengths.

In this embodiment, the values used as invalid data are returned from a request for invalid data to the Invalid Data Processor in step 1324. The Invalid Data Processor may use a random number to form an invalid data stream, or other methods to form an invalid data stream as herein disclosed, and then return a pointer to the stream of invalid data to any process that requests one. In this embodiment, the Segment Processor receives an invalid data stream pointer from the Invalid Data Processor and inserts a length of invalid data into the segment that it is being obfuscated according to the invalid data insertion function specified in the OPP, if such an invalid data insertion is specified in that particular OPP.

In this embodiment of the present invention, invalid data may be introduced into different locations of the data object and between or within valid data object segments in step 1324 using the STO structure to point to an invalid data object (IDO) as disclosed in greater detail below. In such embodiments, the location of these invalid data object segments is determined by the OPP's specification for segmenting patterns, and the location of invalid data within them. In one embodiment, the invalid data inserted into segments may include data from random data generating algorithms, randomly found data, such as an area of Random Access Memory, other intelligible content not from the original data object, or the like, and is also expected that such a step makes it more difficult for unauthorized parties to recover the original data.

FIG. 21 illustrates a representation of an Original Data Object (ODO) as processed by the invention. The Segment Processor performs segmenting functions on this ODO, according to the OPP, using the STO in step 1322. Step 2116 illustrates, in hexadecimal notation, a portion of the ODO as a representation of the data object after segmenting in step 1322. Step 2118 shows the data object segments reordered by configuration of the ordination fields in the STO pointer structure. Step 2120 shows the presentation of invalid data, presented by the Invalid Data Processor, shown as segments numbered 80 through 84. Step 2122 is a representation of the ODO obfuscation, with Invalid Data object segments inserted into the ordination of ODO data object segments, using the STO, as in step 1324. Step 2124 illustrates how the segments can be grouped into data object segment groupings by configuring the values of the grouping field in the STO pointer structure according to the grouping specification in the OPP. Step 2128 in this embodiment shows a grouping of segments numbered as Segment Group 3, which consists of reordered ODO segments numbers 3 and 8, as well as two reordered invalid data object segments numbered 82 and 83. For reference, step 2130 illustrates how the individual segments can later be stored in different secure access areas or different storage locations on different RCST systems after transmission. In step 2130, Segment Group 01, as shown in step 2126, has been transmitted to, and stored on, the RCST 2001 system.

In this embodiment, after the Segment Processor segments the data object into multiple segments according to the OPP, step 1322, and inserts invalid segments into the STO pointer structure, step 1324, it begins a loop to process each of the data object segments pointed to by the STO, step 1328. During each execution of the loop, it assigns each segment a segment ID, as specified in the OPP, and creates a Segment Management Record (SMR) associated with this segment, step 1330. It then populates metadata fields, in the segment header associated with each segment ID, with any instructions that will be embedded and transmitted to the receiving RCST systems, step 1332.

One embodiment of the data definition of the Segment Management Record is illustrated in FIG. 74. The SMR embodiment contains optional pointers to Function and Values Records, the structure of which is shown in FIG. 72, which are elements of a list that can hold the functions pointers, processing ordination, and input values from the various permutation patterns used in the invention to process the original data object. These can be used, instead of re-calculating the pattern permutations, for the purpose of reassembling the original data object.

The Segment processor then submits the STO pointer, to the current segment, to the Segment Pattern Permutation Processor loop for further obfuscation and transmission processing by the Segment Processor, Step 1334. The loop determines if any pattern functions remain in the OPP functions to be executed on this segment, step 1334, and if so, the Segment Processor passes the STO segment pointer and the function input values from the OPP to the function pointed to by the pattern function pointer in the OPP, step 1336. The function that processes the segment according to the OPP is well known to those familiar with data processing and is not shown. It then does the same action with any function pointer in the TPP iteration, step 1338. The function that processes the segment according to the TPP is well known to those familiar with data processing and is not shown. It then populates the corresponding SMR with information specifying how the segment was processed, step 1346, so that it can be used to restore the segment for reassembly of the original data object.

In this stage of this embodiment of the present invention, and depending on the specification of the obfuscation and transmission pattern permutations, specific data object segments from the original data object are processed as individual objects, and may be compressed in step 1336. Further, an individual data object segment may be encrypted in step 1336. In this embodiment, all data object segments may be encrypted, if that is specified by the OPP. In alternative embodiments, a predetermined number or patterns of data object segments are encrypted, for example; every odd numbered data object segment is encrypted. In another embodiment, every even numbered data object segment can be encrypted with the AES algorithm, while every odd numbered segment is encrypted with the DES algorithm, depending on the pattern specified by the OPP. The type of encryption can vary, and multiple encryption schemes can be used, for example, with symmetric keys, with asymmetric keys, with a stream cipher, with a block cipher, and the like. Mixing different encryption algorithms is intended to make cryptanalysis of the segments by unauthorized accessors more difficult.

In one embodiment, certain data object segments may be encrypted again for further protection in step 1336. Diverse encryption algorithms and diverse key lengths may be used at this stage, i.e., encryption using different levels or types of encryption, different key lengths, and the like. It is expected that such a step makes it more difficult for unauthorized users to recover the original data.

During the Segment Processing loop, the Segment Processor method reads the Transmission Pattern Permutation to determine whether the segments, or groups of segments, are to be transmitted to another Computer System, such as an RCST system, or the groups are to be stored in local storage or memory, or if they are to be transmitted with an FTP, HTTP, or other protocol, or if there is to be a time lag in the transmission of the segment, and other types of transmission specifications, as can be contained in the TPP. The transmission instruction is processed and applied to the data object segment, step 1338.

The system then reads the associated Segment Tracking Object (STO) structure that was created in step 1218 and loaded in step 1318. The STO structure contains a sequence of pointers that point to both the ODO and the IDO. They are populated with values according to the Obfuscation Pattern Permutation (OPP), that specify the length, order, position, and grouping of the data object segments for packaging, transmission, and storage. The values of the fields in the records of the STO will define the group, order, positions, and lengths of valid segments of the original data object, and invalid segments of the IDO as they will be packaged and transmitted to the RCST units with embedded instructions, values, and addressing. The processing of the STO and its pointers provide for insertion of invalid data into, and reordering of, the original data object segments, as well as other further obfuscation of the original data object, without requiring actual manipulation of the original data object data or its data stream itself, thereby increasing the efficiency of the invention, and reducing its computing overhead requirements.

In this embodiment, the method reads the OPP to determine the number of segments into which the original data object will be divided. The OPP segmenting function and value may specify that the data object be segmented into a set number of segments, such as 32 segments, with each segment being of equal proportion, while the last segment includes the remainder, or modulus, or is smaller than the other segments, if that is the result of the object segmenting of the division of the object into 32 segments. Other OPP permutations may specify other ways of segmenting the data object including, without limitation, segmenting the object into a certain number of segments, wherein the even number segments are 30% longer than the odd numbered segments, and the like.

In this embodiment, the first STO record pointer value points to the first byte of the original data object, the second STO record pointer value points to the second segment of the original data object, which will begin in the position determined by the length of the proportion of the file accorded to each segment calculated by the length of the original data object divided by the number of segments specified in the OPP. For example, if the original data object is 1000 bytes long, and the OPP specified that the original data object will be divided into 8 symmetric segments (segments lengths can vary and differ from each other in other permutations), then each segment in the original data object will be 125 bytes long, since 1000/8=125 bytes. Therefore, the second STO segment pointer will point to byte number 126 of the original data object, the third STO segment pointer will point to original data object byte 251 (126+125), and so forth. The STO records with segment pointers pointing to the ODO are numbered with sequential odd numbers by having their ordination fields populated with sequential odd numbers, which allows the method to logically insert invalid data from an IDO between them by using even numbers in the ordination values fields of STO records with segment pointers pointing to inserted invalid data. For example, if the first STO segment pointer, which points to byte #1 in the ODO, is given an ordination value of #1 in its STO record's ordination field, then the STO record with a pointer that points to the second segment in the ODO is given an ordination value of #3 in the STO structure. Thereby the STO pointer ordinated as #1 will point to ODO byte #1, the STO pointer ordinated as #3 will point to ODO byte#126, the STO pointer ordinated as #5 will point to ODO byte 251, and so forth.

In this embodiment, the Segment Processor inserts invalid data object segments among the valid data object segments of the ODO by giving even numbered ordination values to STO records that point to the Invalid Data Object (IDO) series of random, predetermined, or found data. When the STO pointers are sorted by ascending ordination value, this logically inserts those even numbered ordinations of STO pointers that point to the IDO in between the odd numbered ordinations of STO pointers that point to the ODO data object segments. For example, if the OPP specifies that invalid data will be inserted between every other segment of the original data object to further obfuscate the transmitted and stored segments, then the process will invoke a new record in the STO structure, with a pointer to the IDO for the length specified in the OPP, which in this embodiment is 16 bytes of invalid data to be inserted from the IDO. The process will populate the ordination value of this new STO record with a pointer to the IDO as STO pointer #2, thereby logically inserting it between STO pointers #1 and #3, which point to the first and second contiguous segments in the original data object. The STO record structure contains a field that specifies which object each STO record's pointer points to, which can be to the ODO, IDO, or another identified data object. STO pointer structure records also contain a field that specifies the length of the segment to which the STO pointer points. The Segment Processor method will invoke a new record, in the STO structure, that points to the first available byte in the IDO, right after the length of the invalid segment pointed to by the first IDO pointer, which in this embodiment is byte #17 of the IDO, since the first IDO pointer in the STO with an ordination value of #2 started at the first byte of the IDO, and is 16 bytes long. The method will ordinate this new pointer as STO pointer #6, thereby logically inserting it between STO pointers #5 and #7, which point to the third and fourth contiguous segments of the ODO. In this way, the process has used pointers to logically insert invalid data between the first and second, and the third and fourth, contiguous segments of the original data object. In this way, the process did not insert any invalid data between the second and third contiguous segments of the ODO (i.e., STO pointers ordinated as #3 and #5) in accordance with the OPP specification to insert invalid data only between every other original data object segment. The process continues to invoke new records in the STO that point to contiguous portions of the IDO that are logically inserted between every other segment in the original data object until it has reached the end of the number of segmentations of the original data object according to the OPP.

The process can then use the STO to easily and efficiently reorder the segments of the original data object and IDO by simply assigning new ordination values to the STO record's ordination fields according to the reordering function and value of the OPP, if one is specified. The execution of the function of reordering of segments can occur before or after the invalid data object segments are pointed to by the STO pointer structure, before or after the segments are encrypted, or before or after any other obfuscation methodology specified in the OPP.

In this embodiment, after the data is divided into groups of data object segments as pointed to by STO pointers, steps 1322 and 1324, the segments may be grouped into two or more groups of segments containing valid data, invalid data, or a combination. In one example, one group of data object segments includes all even numbered data object segments, and the other group of data object segments includes all the odd numbered data object segments. In another embodiment, one group of data object segments includes every fifth data object segment, and the other group of data object segments includes the remaining data object segments. In another embodiment, one group of data object segments includes every fourth data object segment, the next group of data object segments includes the every third data object segment of the remaining segments, a third group includes every fifth segment of the remaining segments, and so forth, until the number of remaining segments is less than the number of segments in the smallest group, and they comprise the last segment grouping. In this embodiment, one or more invalid data object segments may be intermingled with the data object segments.

The segment grouping, group number, and ordination of the segment groupings is defined by the OPP, and is implemented in values in the grouping field in the STO record structure. Some of the segments may be reordered within the ODO, or grouped according to the OPP and then reordered within the groupings of data object segments, step 1322. In this embodiment, after the segment has been processed by the Segment Pattern Processing Loop, steps 1334 through 1338, the method determines, from the OPP, for that segment, if that segment is intended to be in a group of segments, step 1342. If so, the segment's STO record's group value field is populated with the group identifier from the OPP, step 1344. Segments with the same group value in the STO pointer structure will be placed into the same group of segments, to be packaged and transmitted as a group.

Pointers from the STO to invalid data, processed segments, and groups of processed, segments are then placed into the Transmission Packaging Processor queue for preparation for transmission and storage, step 1348. The Segment Processor then checks if additional segments from the ODO require processing, step 1328. If not, it then checks to see if additional pointers to an ODO, or any other data object, have been inserted in its processing queue, step 1310. If not, it loops until processor exit, or until a new ODO pointer is sensed, step 1312.

In another embodiment of the present invention, adjacent segments of data objects are reordered within different groups using the STO record grouping value, step 1322. For example, segment one is placed in group one, segment two is placed in group two, segment three is placed in group three, and the like. In another example embodiment, half the segments are placed in group one, and the other half of the segments are placed in group two. Further, the ordering of data within segments need not occur in the same order as they occurred in the original data object. In such embodiments, the ordering of the data objects may be stored within the segmenting pattern Segment Management Record in step 1346.

In step 1326, the Segment Processor method records, in the Object Management Record (OMR), the first original ordination, grouping, position, pointed to object, and lengths of the STO before reordering, as well as the ordination, grouping, position, pointed to object, and lengths after reordering. It also records, in the OMR, the grouping, position, pointed to object, and lengths of the pointers, to the invalid data of the IDO, so that the retrieved segments can be restored to the original ordering of the original data object and IDO segments. Additionally, the Segment Management Records (SMR) store the hash of segments, step 1346, processed by the Segment Processor in step 1340 for later use in verification of the retrieved segments by the Reassembly Processor in step 1716.

Any of the details of the segmenting of the original data object into discrete segments, reordering of those segments, encryption of those segments, insertion of invalid data into those segments, and the like, may be stored in the SMR, step 1346.

As disclosed in greater detail below, the Reassembly Processor will join retrieved segments with associated Object Identifiers and sort them according to their original, pre-reordered, STO record's ordination values. The Reassembly Processor will also ignore any segment data pointed to by STO record's object-pointed-to fields indicating that the record points to a non-ODO data object, including IDO invalid data. The Reassembly Processor will then output the retrieved valid ODO segments in the original order of the ODO, as specified by the record of the pre-reordering ordination of the STO pointers that point only to the original data object and not to the IDO which, in this embodiment, are the pointers in even numbered ordination value STO records. The output object is then verified by the hash calculated from the ODO, prior to segmentation, and stored in the OMR. If the output object is verified as the authentic processed original data object, it is then passed to the decryption and compression algorithms specified in the OMR or OPP, as those originally used to obfuscate the ODO for reversal of the obfuscation processes.

In another embodiment, the invention can obfuscate, segment, reorder, group, and transmit the data object, and its segments, to provide for optimal retrieval and reassembly efficiency on the receiving system. This is accomplished by dividing the original data object into multiple "sections" that will each be treated as discrete, individual, original data objects. Each of these discrete, individual, original data objects, that are "sections" of the original data object, are individually obfuscated, segmented, segment reordered, invalid data inserted, further obfuscated, packaged, transmitted, their segments stored in separate access areas, and otherwise processed as a complete ODO, according to the invention. This embodiment allows the retrieving system to reassemble "sections" of the original data object to their original unencrypted state while the retrieving system is simultaneously retrieving other segments in order to restore other "sections" of the original data object. This method provides for efficient use of time due to simultaneous multi-tasking of the processes of retrieving and reassembling the original data object without requiring all of the data object segments to be retrieved and verified before reassembly of the entire original data object can commence. Each original data object "section" can be restored while other segments of other "sections" are being retrieved and processed, allowing for an efficient "joining" of restored "sections" of the original data object "sections" at the end of the process. This embodiment also provides for partial restoration or reassembly of an original data object in the event that some valid segments of the original data object are not retrievable or restorable. In this embodiment, different patterns can be used for obfuscation, invalid data, transmission, storage, and retrieval for the segments of different "sections" of the original data object, thereby increasing the difficulty of restoring the original data object by brute force or other cryptanalytic methods.

Figure 14:
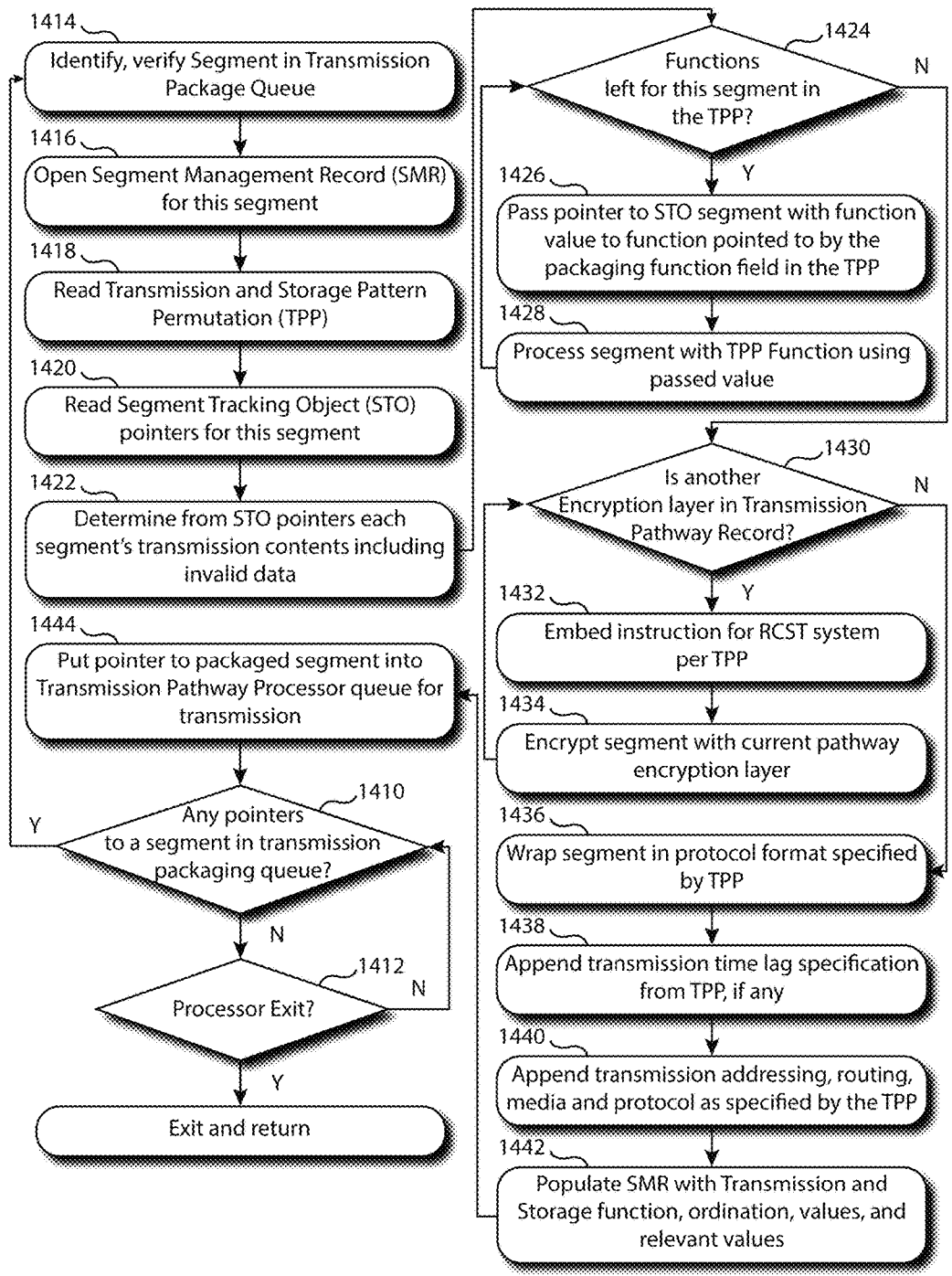
FIG. 14: A flowchart of the method that prepares, formats and packages processed segments and invalid data object segments for transmission to diverse and separate storage locations.

When the compression, encryption, reordering, grouping, invalid data insertion, and other obfuscation of a data object segment is completed, the Segment Processor submits the processed segment to the Transmission Package Processor, an embodiment of which is illustrated in FIG. 14.

The Transmission Package Processor:

The Transmission Package Processor detects the presence of a pointer to a data object segment in its processing queue, step 1410. It then identifies and verifies the segment to prepare it for processing, step 1414. It then loads the SMR, for this segment created in step 1330, to read transmission packaging and processing instructions, and to write processing results, step 1416. It then reads the Transmission Pattern Permutation (TPP) to determine how to format and package this segment for transmission, or for local storage, step 1418. The method then reads the associated STO, step 1420, to determine the ordination, groupings, lengths, and invalid data inclusion in the segment to be packaged for transmission, or prepared for local storage, step 1422.

The Transmission Package Processor then passes the pointer segment to the Transmission Package Processing Loop, step 2814. If the loop control determines that a function remains to be executed in the TPP function list, it passes STO pointers to the segment or segment group, including invalid data and function input values from the SMR, to the function pointed to in the TPP, step 1426. The function then processes the segment, step 1428, and then returns control to the loop control, step 1424. The functions that process the segment according to the TPP, in step 1428, are well known to those familiar with data processing and are not shown.

In one embodiment, a Transmission Pathway Processor separately prepares one or more data transmission pathways by negotiating transmission keys and storage locations with one or more RCST systems, as described below in greater detail. The results of the transmission pathway preparation are stored in one or more Transmission Pathway Records (TPR), which are presented on the transmission pathway presentation queue. The TR structure specifies the receiving system's identifiers, addressing, secure area access method and credentials, the transmission encryption key, transmission protocol, storage protocol, storage location indexing, transmission pathway identifier, and open fields for other metadata, as needed. The Transmission Package Processor queries Transmission Pathway Records and retrieves RCST identifiers, accesses credentials, addressing, encryption keys and storage location information for the RCST systems on the transmission pathway that the Transmission Pathway Processor has prepared. If a transmission pathway is not prepared, the Transmission Package Processor invokes the Transmission Pathway Processor, which then prepares a pathway, prepares the TPR queue, and presents it to the Transmission Package Processor, as disclosed in detail below. The Transmission Pathway Processor uses the TPR queue to provide addressing, encryption keys, ordination, and identifiers for all of the known RCST systems in the prepared transmission pathway for a particular segment or segment grouping. A segment can be transmitted along any prepared transmission pathway as long as the segment is stored along the pathway to allow for retrieval of the segment by a Retrieval Processor. To this end, the Transmission Package Processor records and inserts, into the associated Segment Management Record (SMR), the transmission packaging and transmission attributes it receives from the Transmission Pathway Processor, or the Transmission Pathway Records, that will allow retrieval of the segments and reassembly of the ODO.

FIG. 74 illustrates the database schema used in one embodiment for the Segment Management Record. The TPP actions performed on the segment are optionally recorded in a corresponding pattern Function and Values records list, FIG. 74, pointed to by the pointer value in the field numbered SMR032, as appropriate.

To prepare the segment for transmission along the transmission pathway, the Transmission Package Processor begins the Transmission Encryption Loop, step 1430. If the TPP specifies that the segment is to be transmitted to an RCST system for RCST storage, as opposed to stored locally without transmission, the Transmission Package Processor will embed transmission and processing instructions, and metadata, for the segment, or segment group, for the receiving RCST, or other receiving systems, as specified by the TPP, step 1432. It will then encrypt the segment for transmission, step 1434, using the specific encryption key in the TPR that was pre-negotiated with the RCST on that stage of the transmission pathway by the Transmission Pathway Processor.

The Transmission Package Processor executes the transmission encryption loop, step 1430, to encrypt the segment, its identifiers, and embedded instructions in the sequence corresponding to the reverse order of the stages of the transmission pathway, to allow for sequential decryption and processing along the prepared transmission pathway, as described herein. It encrypts the object segment in successive layers of encryption, beginning with the key exchanged with the last RCST in the transmission pathway. It then encrypts the object segment with successive layers of encryption key, in reverse order of the order of the sequence RCST systems in the transmission pathway. In this manner, the first receiving RCST system, which is the last encryption key used to encrypt the object segment package, will be able to decrypt the object segment, and transmit it to the second RCST system, which will, in turn, decrypt the segment with the specific key it exchanged with the Transmission Pathway Processor, and transmit it to the third, who will use its exchanged key to decrypt the segment, and so forth, until the end of the transmission pathway is reached.

In an alternative embodiment, the first receiving RCST is instructed to use its own instance of a Transmission Pathway Processor to autonomously prepare a transmission pathway independently of the originating system, in such a way to ensure that the segment will be stored in a secure access area along the pathway, so that it may be retrieved by a retrieving system, with a coordinated retrieval pattern permutation. In this embodiment, the originating system's instance of the Transmission Pathway Processor does not prepare the entire transmission pathway, only a portion of it, or none of it. This alternative embodiment is disclosed in more detail below.

In this alternative embodiment, the Transmission Package Processor reads, from the TPP, a specification to embed instructions to the first receiving RCST system, to prepare a 5 stage transmission pathway, and to transmit the segment into this pathway with the instruction to implement end point storage of the segment in the RCST system that has been pre-negotiated by the Transmission Pathway Processor as the fifth, and last, stage in the pathway, at IP address 10.1.10.16 (Note: this IP address is used for illustrative purposes only). The Transmission Package Processor enters the transmission encryption loop, step 1430, that will encrypt the segment, embed instructions and metadata that will allow each successive RCST system in the transmission pathway prepared by the first RCST system to decrypt the segment, read the instructions, and transmit the segment to the next RCST system in the pathway until it reaches the fifth RCST system designated by the originating system. This fifth RCST system will store its version of the transmitted segment for the time period specified in the retention metadata for the segment, and the RCST identifier and addressing, storage location, access credentials, encryption keys, and other retrieval metadata, will match a retrieval pattern used by a Retrieval Processor to retrieve this segment for the purpose of reassembling the original data object.

In the current embodiment using the TPR records of the transmission pathway negotiated entirely by the originating system's instance of the Transmission Pathway Processor, the Transmission Package Processor processes the segment in a five stage programmatic loop at step 1430, using a LIFO data "get" of the TPR pathway metadata that, in each pass, performs the following functions with the segment:

Read the next TPR with this transmission pathway identifier, verify correct ordination of the transmission pathway stage, get the encryption key, storage location reservation, RCST addressing, instructions, values, storage location reservation, retention period metadata, and identifiers for this stage of the pathway, and embed this pathway metadata into the current segment, Step 1432. Then encrypt the segment with the exchanged transmission encryption key, step 1434. This TPR pathway metadata will later be inserted into this segment's Segment Management Record in step 1442.

The embedding process, step 1432, will embed the RCST key for this stage of the transmission pathway, and append the instruction to store and transmit this segment to the RCST system ID and addressing embedded in the transmit instruction, which is the RCST system subsequent to this one in transmission pathway sequence, that was previously negotiated by the Transmission Pathway Processor. It will also embed an instruction to the receiving RCST to transmit the segment in a transmission protocol specified by the TPP, and into which the receiving RCST will transform the segment protocol packaging if it does not match the protocol in which the RCST received the segment.

Embedded Instructions:

For example, in this embodiment, the Transmission Package Processor may embed an instruction for the RCST system to store the segment for 15 days, at the expiration of which, the instruction will specify that it transmit the segment to another specific RCST system to retain the segment for 30 days, and so forth, in a pattern of segment migration that ensures that a segment will not be stored in the same secure access area as another segment from the same data object, or in another embodiment, no more than three segments from the same data object would be stored in the same secure access area, or similar constraints that would restrict the number of segments, from the same original data object, that can be stored in the same secure access area.

The migration of transmitted segments can happen with any frequency specified by the TPP, including segments from the same data object that migrate at differing time intervals. In this embodiment, the first transmitted segment will migrate from its receiving RCST to another specified RCST after 45 minutes, then again after 2 hours, then again after 5 minutes, then again after three days, and so forth. The second transmitted segment will migrate from its receiving RCST to another specified RCST after 15 minutes, then again after 2 days, then again after 7 hours, then again after three minutes, and so forth. This migration of the segment can synchronize with a changing retrieval pattern to allow the segment to not remain at rest in a specific location for a specific period of time, and still be able to be retrieved at any time by a co-ordinated retrieval process using a co-ordinated retrieval pattern permutation. This process of continuous migration to changing and differing secure storage access areas in coordination with a synchronized changing retrieval pattern makes it more difficult for unauthorized accessors to collect segments from an original data object, as the segment may have migrated before they could gain unauthorized access to its secure storage area.

In another embodiment, an embedded instruction could instruct the receiving RCST to not store the segment, but to immediately transmit it (relay) to another specific RCST system. In another embodiment, an embedded instruction could instruct the receiving RCST to prepare a transmission pathway with one or more unspecified RCST systems to reach a final target RCST storage location where it can be stored separately from other segments from the same data object, and to then prepare the segment with the exchanged keys, embed instructions for the next RCST receiving the segment, and transmit the segment to the next RCST system in the transmission pathway that it has prepared, and so forth. In another embodiment, the embedded instruction could command the RCST to encrypt and, then, repackage the segment in another, different, transmission protocol format, such as from an NNTP protocol to an FTP protocol, prior to transmitting the segment to a subsequent receiving system.

Further Transmission Packaging:

The Transmission Package Processor then formats and wraps the segment and its metadata in appropriate header information for the transmission protocol and routing as specified by the Transmission Pattern Permutation, or TPP, Step 1436. The Processor then appends any transmission delay instructions in the TPP, step 1438, as well as any specific transmission addressing or protocol metadata, step 1440, to the segment package, for use by the Transmission Pathway Processor's subsequent transmission process, shown in FIG. 3, and in other embodiments in FIGS. 19 and 20.

In the present embodiment, the Transmission Package Processor determines how the groups of data object segments are to be routed, over the transmission media, according to the TPP, step 1440. The TPP instructs the Transmission Package Processor to append routing metadata to the segment package for routing according to the TPP. These include, without limitation, the type of transmission socket to be used among TCP, UDP, or others that may be devised, what specific IP address or Universal Resource Locator to embed as the target receiving system, what source address to embed in the packet header, and whether to use a packet or non-packet routing method and media. In this example, non-packet routing media may comprise central office telephone networks, including modems, wireless transmission using a cellular transmission infrastructure, and the like.

The Transmission Package Processor then populates the SMR, step 1442, with the data and metadata used to package the segment for transmission as herein disclosed. The Transmission Package Processor then inserts the processed and packaged segment into the Transmission Pathway Processor queue, and sets the "segment ready to transmit" flag, Step 1444, to notify the Transmission Pathway Processor that processed and packaged segments are ready to be transmitted.

Figure 5:
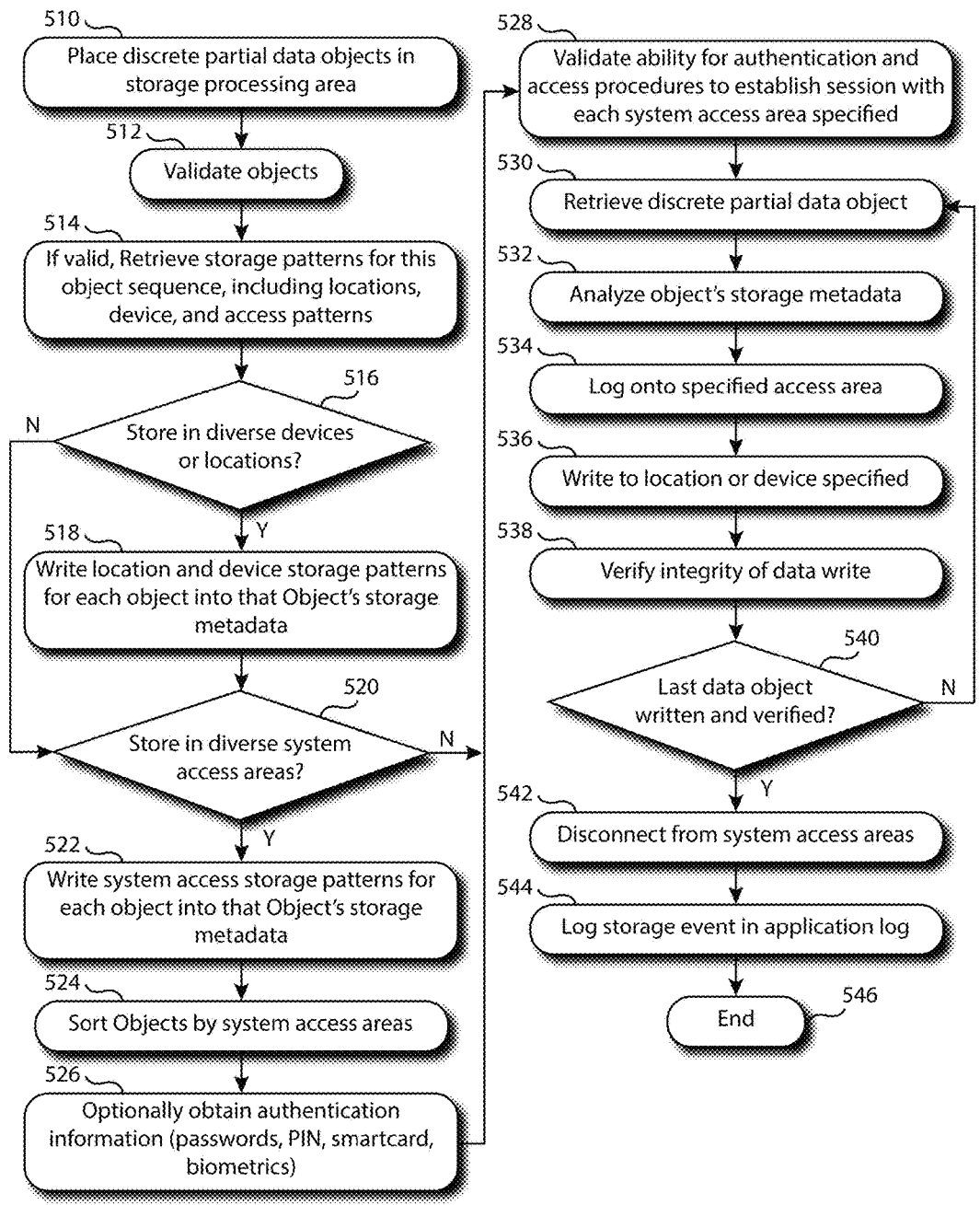

Alternative Segment Packaging Embodiments:

FIG. 5 illustrates an embodiment of the present invention wherein the Transmission Package Processor executes a process to instruct the segment to be stored in a secure access area separate from segments from the same Original Data Object (ODO). It determines from the TPP that data object segments are stored in diverse, separate, secure access areas and storage resources. Initially, data object segments are placed in the Storage Processing area of the Transmission Package Processor, step 510. Next, the data object segments are validated, step 512. In the present embodiment, the data integrity and authenticity are checked by analyzing the attached digital signature.

Upon successful validation, the method retrieves a storage pattern for this data sequence from the TPP, step 514. These storage patterns are typically recorded in the Object Management and Segment Management Records. As described above, the storage patterns include specifications for storing the data object segments. The Transmission Packaging Processor then determines, from the TPP, if the segments should be stored in diverse devices or locations, step 516. If the TPP specifies storage in diverse devices and locations, the Transmission Packaging Processor method writes the instructions, to store the segments in diverse locations, into the segment's package metadata, step 518, according to the TPP.

The present embodiment then determines whether the data object segments should be stored in diverse system access areas, step 520. This is typically specified by the TPP, and can designate local separate secure access areas that do not require transmission of the segment, or to remote storage on receiving systems that do require transmission of the segment. The method then writes the separate secure access storage instructions into the segment package metadata, step 522.

Figure 2:
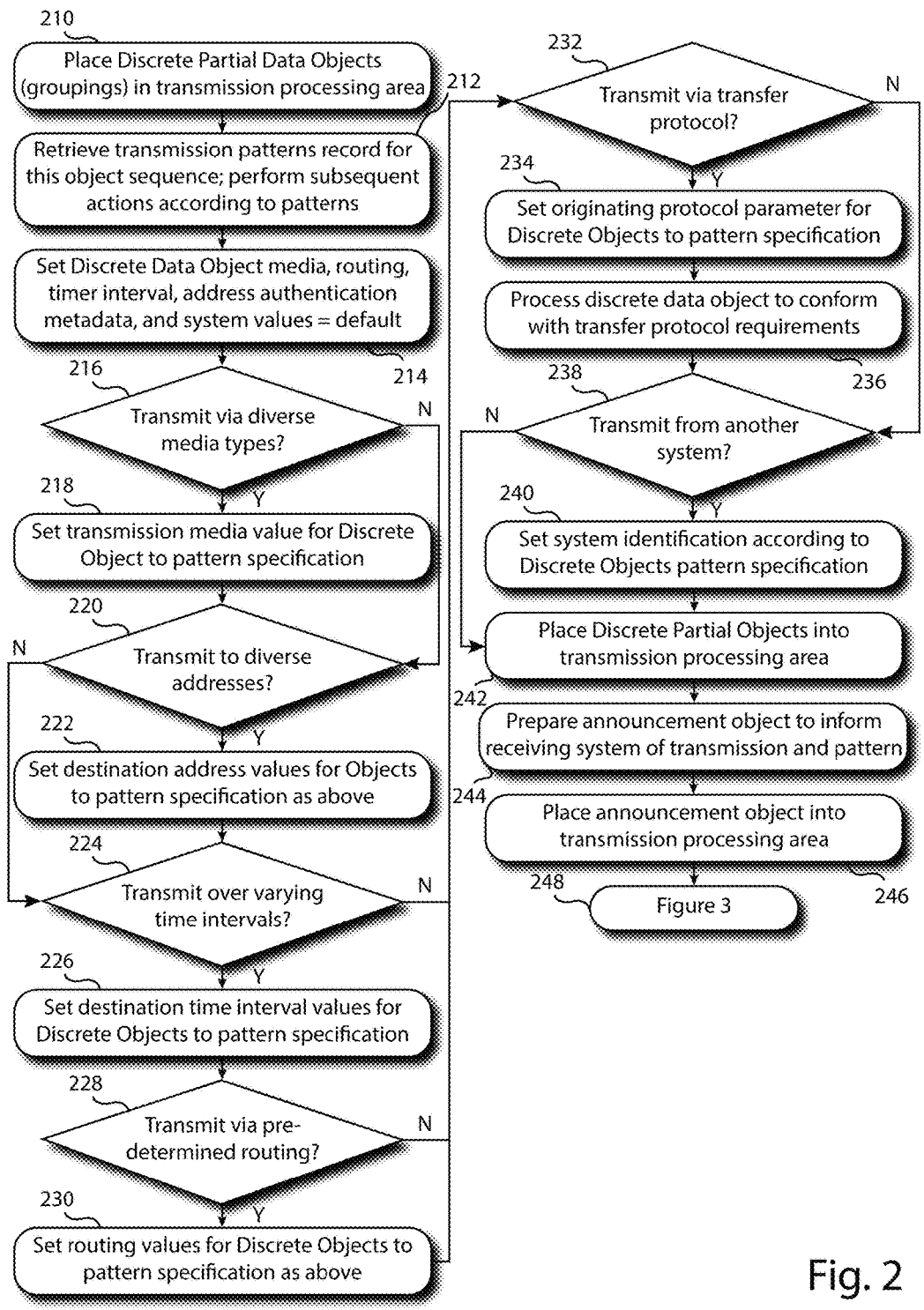

FIG. 2 illustrates a flow diagram of this embodiment. A segment or segment grouping is inserted into the Transmission Package Processor queue, step 210. A transmission pattern is then determined by reading the TPP, step 212. In the present embodiment, the transmission pattern is used to determine how the groups of data object segments are conditioned and then eventually transmitted, as will be illustrated below. In another embodiment, the TPP can be read from a file of pre-determined Transmission Pattern Permutations; as opposed to the TPP being generated by a Pattern Permutation Processor, as can occur in other embodiments. Next in the present embodiment, different transmission parameters for each segment are set to the configured default values, step 214. In one embodiment, default transmission metadata allows groups of segments to be dispersed, and dissociate from other groups, during transmission and storage. Some transmission parameters which may be adjusted by the TPP include, without limitation: the transmission media, the time intervals between the transmission of the separate segments, ordering of data object segment transmission, the routing of data packets on a network, the network onto which a segment will be routed, the various diverse multiple separate receiving systems to which the separate and distinct segments will be transmitted individually over separate and distinct transmission media, the transmission of invalid data, the separation of storage segments from the same ODO into different secure access areas or storage resources, and the like. Authentication and integrity metadata may also be added to the transmitted segment to validate the data objects on receipt. In this embodiment, authentication metadata techniques may include a PKI digital signature, encrypted with a SHA-1 message digest of the data object segments.

Next, transmission parameters for each segment are set according to the pattern specified in the Transmission Pattern Permutation (TPP), as illustrated in the following steps.

In one embodiment, it is determined whether the separate, and distinct, segment, or segment grouping, is to be transmitted using diverse transmission media channels, step 216. If so, the Transmission Package Processor sets the segment package transmission metadata, step 218, to instruct the Transmission Pathway Processor, which will, subsequently, transmit the segment to determine the best available diverse transmission media over which to transmit the segment to the receiving system designated in the segment package metadata. In this embodiment, media types include transmission over packet based digital networks, such as the Internet, central office telephone switching circuitry, wireless digital transmission using cellular frequencies, and the like. In an alternative embodiment, other groups of data object segments may be stored in a physical format, including digital storage media, such as tapes, smart phones, optical disks, hard drives, thumb drives, and solid state media, as well as printed materials such as barcodes and QR codes. Such an embodiment requires an unauthorized accessor of the data to monitor many types of media simultaneously in order to capture all groups of data object segments to recover the original data object. For example, the requirement of monitoring many types of transmission media resources is expected to exceed the capability of most unauthorized accessors, limiting unauthorized users' ability to recover the original data object.

The method then determines how the transmission pattern permutation (TPP) specifies how the segments will be transmitted to different addresses at different receiving systems, step 220. The TPP specifies, for example, whether one valid or invalid data object segment will be transmitted to a network address and another valid or invalid data object segment will be transmitted to a second network address. The TPP further specifies, for example, whether one valid or invalid segment will be transmitted using a network source address other than the address of the system transmitting the segment. In this embodiment, the Transmission Package Processor sets the segment package transmission addressing metadata according to the TPP, step 222. It sets the metadata to instruct the Transmission Pathway Processor to transmit the segment to the specified addressing values. By using diversified addressing on digital packets, the method forces unauthorized accessors to know the range of addresses to which these segments or groupings of segments will be transmitted, thereby limiting techniques using addressing information to associate and then acquire data packets and data object segments in transit.

The method then determines whether the segment or segment grouping is to be transmitted over varying time intervals, step 224. If so, the Transmission Package Processor sets the segment package transmission metadata to instruct the Transmission Pathway Processor to transmit the segment after a time delay specified in the TPP, step 226.

By transmitting data objects at varying time intervals, unauthorized accessors are forced to monitor transmission infrastructures and associate segment transmissions over longer periods of time to increase the chances of capturing all of the segments required to reconstruct the original data object. Since the amount of traffic on some networks, such as the Internet, requires substantial data capturing and Storage Resources to capture the traffic from even a small interval of time, this greatly increases the cost and effort involved in capturing a complete set of data object segments. It also improves the possibility that the unauthorized accessors will miss capturing some segments, and thereby render the data object much more difficult to reassemble.

The method then determines whether the segment or segment grouping is to be transmitted via predetermined routing, step 228. If so, the Transmission Package Processor determines the transmission routings from the TPP and sets the segment metadata for transmission via the specific routing, step 230.

In one embodiment of the present invention, the predetermined routing may be connected to a router on a first ISP that is coupled to a backbone network infrastructure element that is different from the backbone network infrastructure coupled to a second ISP to which other routers in the system are connected. This embodiment enables the Transmission Package Processor to instruct the Transmission Pathway Processor to transmit different segments from the same ODO over separate and distinct transmission backbones, or instruct the Transmission Pathway Processor to transmit different segments from the same ODO over different predetermined routings. As a result, unauthorized accessors are forced to monitor data traffic on multiple network backbones simultaneously, and across multiple transmission protocols, in order to capture all of the data object segments derived from a data object.

In the current embodiment, source and destination addressing for a specific segment is also used to establish routing paths that are specific, and distinct, to a particular network service provider or data carrier, for transmitting the packets of a data object segment. This can be accomplished using Strict Source Routing (SSR), or Loose Source Routing (LSR), information in the data packet header metadata. Additionally, if the source and destination addresses of the data packet are both contained in the address space of the service provider or data carrier, the packets typically stay on that provider's network, with higher predictability. This is typically because providers tend to route packets on their own carrier infrastructure to avoid charges resulting from switching packets on to other carriers' infrastructures. By addressing segments, or groupings of segments, to travel to more than one address, unauthorized accessors are forced to monitor multiple data routing infrastructures simultaneously. This greatly increases the cost and effort involved in capturing a complete set of data object segments associated with the original data object, thereby limiting the ability of those accessors to acquire, decrypt, and reassemble the segments.

In another embodiment of the invention, the source address specified in the packet header, or datagram header, for the transmission protocol, which can include without limitation the TCP, or UDP, protocols, and the like, can represent the address for a system other than the transmitting system. This can be used within a network of transmission, storage, and retrieval systems to further obfuscate the transmission of data object segments. In this embodiment, the source address specified by the transmitting system can be the address of another system which is programmed to receive datagram and transmission protocol acknowledgement, and verification responses, and respond to them accordingly, so as to control, and verify, the transmission of the data object segments.

The method then determines, from the TPP, whether a specific information transfer protocol will be used for diverse data object segments, step 232. If so, the Transmission Package Processor determines the transmission protocol from the TPP and sets the segment metadata for transmission via the specific protocol, step 234. The Transmission Package Processor then, further, packages the segment by processing it to conform with the requirements of transmitting it via the TPP specified transmission protocol, step 236. Types of well known data transfer protocols include FTP, HTTP, SMTP, SMS, MMS, NNTP, and the like. In one embodiment, the ability of the system to specify proprietary transfer protocols known to the receiving system is also envisioned. Using diverse protocols to transmit data objects requires that unauthorized accessors monitor and capture multiple protocol transmissions from a data source, thereby increasing the cost and effort to do so.

In one embodiment, transmission capabilities include, without limitation, protocols that have notice and retrieval messaging, and notification capabilities, where the originating system is able to request that a receiving system retrieve a segment from a separate protocol server, as in step 238. This allows the originating system to confirm that the receiving system received some data, and also controls the receiving systems' access to the remaining data. For example, the originating system can send, to an RCST, an encrypted and embedded HTTP formatted instruction that will allow the receiving RCST system to retrieve a data object segment for storage or transmission purposes from a system acting as a "web server" or http processing resource. This http resource could be the originating system, the RCST system, or another system on which the segment has been made available, including other third party information systems. This process can be used with many and diverse protocols, utilizing protocol servers, including proprietary protocols, as can be devised, and including, without limitation, SMTP, NNTP, and FTP servers.

In one embodiment, it is determined whether a segment specified by the TPP is to be transmitted from a different transmission system, step 238. In such an embodiment, the intermediary system transfer information specified by the TPP is written into the Metadata associated with a segment, step 240. In one embodiment, some, or all, of the data can be transferred, via a virtual private network, dedicated data line, or other privacy enhanced transmission medium, to another transmission system that, in turn, sends the segment to the receiving system. By transmitting segments from multiple systems to multiple systems, and by storing segments from the same ODO in separate secure access areas or storage resources, unauthorized accessors are forced to monitor the transmission, and storage points of multiple systems, in order to capture complete set of segments. This greatly increases the cost and effort of doing so, thereby limiting their ability to perform that action.

Transmission Pathway Processor

In another embodiment, when the originating systems has prepared, for transmission, one or more segments, or groups of segments, they're stored in memory accessed as the Transmission Pathway Processor's transmission queue, step 242. Next, the Transmission Pathway Processor prepares an "announcement", or transmission negotiating object, step 244, which typically comprises Metadata for the subsequent data transmission, that has been encrypted and digitally signed, step 246. The negotiating object is subsequently transmitted to the intended receiving system. In another embodiment, the Transmission Pathway Processor has already negotiated a secure transmission to the receiving system, and placed the secure transmission metadata in the Transmission Pathway queue. In this case, the transmitting system will use the pre-negotiated transmission metadata instead of sending a negotiation object to the receiving system.

The Transmission Pathway Processor's two main functions are to prepare secure transmission pathways for segment transmission, and to securely transmit segments over those pathways. This method manages activity with the diverse transmission media over which the invention transmits data object segments, as well as the logistical interactions required by the diverse transmission protocols with which the invention transmits data object segments.

In one embodiment, the Transmission Pathway Processor prepares a transmission pathway with four RCST systems in a sequence that will each sequentially receive, store, and, possibly, re-transmit a segment or segment grouping. During this process, the Transmission Pathway Processor negotiates an exchanged symmetrical, or other type of encryption key, and a storage location index reservation with each RCST system in the transmission pathway sequence, according to a TPP. It reserves the storage locations on these RCST systems for a retention period, for example for three hours, at each RCST in the sequence. The RCST system granting the storage reservation will mark the reserved location as unavailable to other storage operations during the retention period. The negotiated transmission metadata, including encryption keys, is recorded into related Transmission Pathway Records, which are placed into a transmission pathway record queue and marked as a transmission pathway of four RCST stages with the transmission keys and metadata controlled by, and known to, the originating system.

The Transmission Package Processor places a pointer to a segment into the Transmission pathway Processor queue, step 1444. That segment that has typically been encrypted by the Transmission Package Processor in multiple encryption layers, steps 1430 to 1434, according to the reverse order of the transmission pathway is recorded into the Transmission Pathway Records created by the Transmission Pathway Processor. The segment pointed to in the Transmission Pathway queue may contain valid data, or it may contain invalid data, or a combination thereof.

The Transmission Pathway Processor then transmits the encrypted segment to the first destination receiving system in the transmission pathway, identified in the segment packaging, typically an RCST system. It will transmit that segment over a transmission medium, intended to be diversified from the transmission media of another segment, if so specified by the segment packaging metadata. Upon successfully receiving the segment transmission, the first RCST system will decrypt the encrypted segment with the previously exchanged key that was the last key used by the Transmission Package Processor in step 1434. The first RCST will then parse the segment package, and execute the embedded instructions. If so instructed, it will then relay the encrypted object to the second RCST in the transmission pathway, which will then decrypt it with the key that the originating system previously exchanged with that second RCST system, which was the second to last key with which the Transmission Package Processor encrypted the segment in step 1434. The second RCST system will then process, and possibly re-transmit, the segment in a similar manner to the third RCST system in the transmission pathway, and so forth, until the last RCST system in the pathway receives the encrypted segment and decrypts it with the first key used by the Transmission Package processor to encrypt the segment in step 1434. This last RCST system will then parse the segment package and execute the embedded instructions, which may include storing the segment.

The receiving RCST systems decrypt the segment with the keys exchanged with the originating system, and then process the segment according to the instruction embedded in the segment. Each RCST will execute a storage process on the received segment if the embedded instruction so specifies, regardless of whether or not it is the final stage in the segment transmission pathway. This allows each originating system, or any system that has the retrieval patter permutation and encryption keys corresponding to the storage location of the segment to be able to retrieve the segment from any RCST storing it, and subsequently decrypt it using the exchanged encryption keys.

Each RCST along the transmission pathway, in accordance with the instructions embedded with the segment, may or may not store the received segment in a location on that RCST. The TPP used by the Segment Packaging Processor may present instructions that instruct certain RCSTs in the transmission sequence to store the segment it receives with certain retrieval pattern metadata. Segments stored on RCST systems may be retrieved by any system using the associated retrieval pattern permutation, and be used to reassemble the original data object. By being able to access and process the retrieval pattern with the object and segment management records that contains encryption keys and verification hashes, the originating system, or another system or device, can retrieve the segments, along with invalid segments, for obfuscation, and reconstruct the object by reversing the obfuscation and segment reordering pattern as recorded in the object and segment management records.

The Transmission Pathway Processor transmits the queued segments, as specified by the TPP, to the RCSTs over various diverse and separate transmission media that are available to the transmitting system, as disclosed herein. It transmits the queued segments in the various communications protocols in which the segments are packaged, that include, without limitation, TCP/IP packet messaging, UDP packet messaging, HTTP messaging, FTP, NNTP messaging, and the like. It also transmits the queued segments according to the time delay specifications embedded in the segment package metadata.

In the current embodiment, when the Transmission Pathway Processor on the originating system negotiates transmission pathway encryption keys and storage metadata individually, with each RCST in the transmission pathway, computing and bandwidth overhead occurs on the originating system.

In another embodiment of the invention as illustrated in FIG. 15, each RCST in a transmission pathway autonomously negotiates an encryption key exchange, TPP, and a storage location reservation directly and independently with the next RCST in the transmission pathway, wherein the originating system does not negotiate transmission keys, metadata, and the like, with each RCST in the pathway, but, instead, with the first RCST in the pathway and, optionally, with specific other RCST systems in the transmission pathway. Some RCST systems in the pathway may have established a Virtual Private Network, or already have exchanged encryption keys, and, thereby, may not need to establish secure communications, thereby further reducing computational overhead for the RCST systems and the originating system. In this way, the computing and bandwidth overhead for pathway preparation is distributed to other systems in the transmission pathway, thereby increasing the transmission efficiency.

In this embodiment, a series of RCSTs each sequentially and independently exchange an encryption key and a transmission pattern, and "reserve" an index to a logical storage location for a transmitted segment prior to receiving the segment. Each RCST can independently determine which RCST to select as the subsequent RCST in the transmission pathway, or have it determined for them by instructions embedded in the received segment or segment grouping. An RCST can also determine the subsequent RCST to it in the transmission pathway by selecting the subsequent RCST from a list of RCST's with which it has already established encrypted communications.

In the embodiment shown in FIG. 15, the originating system instructs the first receiving RCST system to autonomously prepare a transmission pathway with a number of RCST systems specified in a counter in the embedded instructions, in this example, four RCST systems, including the first RCST system. The originating system, additionally, embeds instructions to the first RCST system to store the transmitted segment on the third stage of the transmission pathway, at RCST03, using a predetermined encryption key known to the originating system, step 1514, which is embedded in the transmission metadata and encrypted with the key exchanged between the originating system and the first RCST system. The originating system can use the embedded and encrypted key to subsequently retrieve the stored segment from the RCST03 system according to its retrieval pattern permutation, step 1558.

In this embodiment of the invention, the RCST's in the transmission pathway, themselves, perform the transmission pathway preparation, segment obfuscating, segment transformation, protocol transformation, the insertion of instructions, and transmission of segments, and invalid segments, from system to system, in the transmission pathway. They can, then, optionally, anonymously, return the keys, identifiers, addressing, and locations in the transmission pathway to the originating system. Hence, in this embodiment, the originating system does not negotiate and prepare the transmission pathway with each RCST in the pathway, but delegates that activity to the RCST systems in the pathway.

One advantage of this aspect of the invention is that delegating pathway negotiation to the RCST systems provides privacy and security to the originating system without imposing any pathway negotiation overhead. By distributing the tasks of negotiating multiple key exchanges, and storage location reservations, to a series of RCST machines participating in a transmission pathway, the computing and bandwidth overhead for establishing a transmission pathway is distributed among the various systems participating in the transmission and storage of encrypted data object segments across the various stages of the transmission pathway.

In the embodiment illustrated in FIG. 15, the originating system exchanges an encryption key with a first RCST system, steps 1510 and 1512. The originating system then uses that key to encrypt and transmit embedded instructions to the first RCST system, step 1514, that instruct the first system to prepare a four stage transmission pathway, including the first RCST system, and to store a specific transmitted segment on a certain RCST system known to the originating system, as in this example at the third stage in the transmission pathway, and specifically at RCST03. The embedded instructions specify the storage location index and encryption key that the originating system has pre-negotiated with RCST03. This pre-negotiated encryption key can be used for the transmission, storage, and retrieval of the segment from RCST03.

In another embodiment, the key used for the third stage may be referenced from a table of encryption keys previously established with an RCST system, and use specified retrieval metadata that matches the originating system's associated retrieval pattern permutation.

In the current embodiment, the originating system then securely transmits the encrypted instructions to the first RCST system, step 1514, and the first RCST receives it, decrypts it, reads the instruction to set up a 4 stage autonomous transmission pathway with the ensuing segment to be stored at RCST03 in the third stage, using the specified key embedded in the instructions, step 1516.

The first RCST system then prepares a transmission pathway by exchanging an encryption key with a second RCST system RCST02, steps 1518 and 1520, which initiates a key exchange sequence across multiple RCST systems controlled by a decrementing counter. The first RCST system then encrypts the instructions, and specified encryption key, from the originating system, with the key it exchanged with RCST02, and transmits them to RCST02, step 1522, which receives and decrypts them, step 1524. The decrypted instructions instruct RCST02 to prepare a transmission pathway with RCST03 using the embedded, specified encryption key. The originating system TPP has pre-determined that storing the segment on RCST03 will not allow an amount of segments from the same original data object, sufficient to restore that object to be stored, in the same secure access area or storage resource on RCST03. The embedded instructions and metadata used for storing the segment on RCST03 correspond to the originating system's retrieval pattern, including encryption keys, storage locations, and the like.

Subsequently, RCST02 exchanges the encryption key specified by the originating system in the decrypted metadata with the third RCST in the transmission pathway, RCST03, steps 1526 and 1528. The second RCST system, RCST02, then sends instructions, encrypted with the specified key, to RCST03, that instruct RCST03 to prepare a one stage pathway with another RCST system, which RCST03 receives and decrypts, step 1530. RCST03 then selects and exchanges an encryption key with a fourth RCST system, RCST04, step 1532. Extending the transmission pathway to a fourth RCST stage is intended to obfuscate the transmission of the data object segment to unauthorized accessors who may attempt to trace a transmission pathway, and determine the storage location, of a segment that corresponds to a specific retrieval pattern.

If so instructed by the originating system, the RCST systems in the prepared pathway may, optionally, return, to the originating system, all of the keys and metadata they have autonomously negotiated, steps 1562 to 1568. The originating system configuration may specify this key return in order to have multiple RCST systems from which it can retrieve the segment for reliability purposes.

The originating system then packages and transmits the data object segment to the first RCST system RCST01, step 1536, using the key exchanged in step 1510. RCST01 receives the segment, step 1538, then decrypts it with the key exchanged in step 1512, then re-encrypts it with the key exchanged with RCST02 in step 1518, and transmits the segment to RCST02, step 1542. RCST02 receives and stores the segment, then decrypts with the key exchanged with RCST01 in step 1520. RCST02 then re-encrypts the segment with the encryption key specified by the originating system, packages it, then transmits it to RCST03 using the specified key, step 1544. RCST03 receives and stores the segment, step 1548. At this point, RCST03 is storing the data object in a location, and with an encryption key known to the originating system, which will allow a retrieval pattern, known to the originating system, to retrieve the data object segment in order to reassemble the Original Data Object.

RCST03 then, similarly, decrypts the segment package with the originating system specified key, re-encrypts it with the key exchanged with RCST04 in step 1532, and transmits the segment to RCST04 using that exchanged key, step 1546. RCST04 receives the encrypted segment and stores it, step 1534.

The originating system then receives a request for the Original Data Object (ODO), step 1552. It then invokes the Retrieval Processor, disclosed in greater detail below, step 1554. The originating system's instance of the Retrieval Processor then retrieves the segments for the ODO from the Retrieval Pattern Permutation corresponding to the requested ODO, step 1556. One retrieval pattern element's specification, location, and key, will correspond with the segment stored on RCST03 by the process currently disclosed. The Retrieval Processor then negotiates retrieval of the segment from RCST03 using the specified key, step 1558. RCST03 then transmits the stored segment, using the originating system specified key, to the originating system, step 1560, which uses the segment to reassemble the ODO.

In this embodiment, each of the RCST systems storing the transmitted segment delete the segment after the expiration of a specified retention period, step 1550, by example.

This method operates as a transmission pathway, since the RCST systems in FIG. 15 each, in turn, receive the segment, decrypt it using the key exchanged with the previous stage in the transmission pathway, execute the embedded instruction, steps 1516, 1524, 1530, and 1534, and encrypt the segment with the key exchanged with the next stage destination RCST system in the transmission pathway. Each RCST then transmits the encrypted segment to the next RCST system in the pathway, steps 1536, 1538, 1542, 1544, and 1546, until the end of the transmission pathway is reached. During the transmission along the transmission pathway, certain RCST systems may execute an embedded instruction to exchange keys with, and transmit, the segment to a specific RCST system that corresponds to the originating system's retrieval pattern, steps 1526 and 1528, so as to allow retrieval of the segment from the specific RCST system by the originating system. In this way, the object segment will be transmitted, anonymously, from RCST system to system, and be available for retrieval, at certain RCST systems, along the transmission pathway, as predetermined by the originating system. In this method, it is not necessary to transmit the keys from each stage in the transmission pathway back to the originating system, thereby decreasing the overhead of the transmission process, and increasing its privacy and security.

In another embodiment, the RCST systems illustrated in FIG. 15, that prepare and execute the transmission pathway between themselves, independently of, and as instructed by, the originating system, will, optionally, return to the originating system the entire transmission pathway's exchanged keys, the RCST identifiers and addresses for each stage in the pathway, the storage location reservations in the transmission pathway, and other transmission, storage, and retrieval metadata, as needed to retrieve the segment from the stages of the transmission pathway. In order to do this, each RCST receiving an object segment transmits back to the RCST preceding it in the pathway, the exchanged keys, identifiers, addressing, metadata as disclosed herein, and the storage location negotiated with the RCST subsequent to it. Each RCST system, similarly, transmits, to its precedent RCST, all keys and locations transmitted to it by all RCST systems subsequent to it in the transmission pathway, steps 1562, 1564, 1566, until all the keys and locations in the transmission pathway are securely transmitted to, and recorded by, the originating system, step 1568.

In another embodiment, each RCST system obfuscates, and transmits back to the system from which it received the object segment, the exchanged encryption key, storage location index, and RCST identifier from the subsequent system to which it transmitted the object. These are then sent to the RCST system that preceded that system in the series, and so forth, until all the exchanged keys, storage locations, and RCST identifiers have been returned to, and recorded by, the originating system by the first RCST system, using the original key exchanged between the originating system and the first RCST system, steps 1562, 1564, 1566, and 1568. This aspect of the invention allows the originating system to know the keys and locations of the object along the transmission pathway, and, thereby, retrieve the object segment from any system that stored the object during the transmission of the object along the pathway.

The RCST's participating in the transmission pathway may or may not transmit the keys and metadata back to the originating system, as disclosed herein, depending on the instructions from the originating system. If they do transmit the keys and transmission metadata back to the originating system, the originating system records the encryption keys and other transmission metadata in the segment management record associated with the transmitted segment, step 1568. This allows the originating system to, either, 1) encrypt each segment, or segment grouping, in sequential layers that match the order of the key exchanges executed by the series of destination RCSTs prior to transmission by the originating system, or 2) retrieve the segment from any stage on the transmission pathway that returned its key and retrieval metadata to the originating system.

In another embodiment, wherein the originating system delegates the transmission pathway preparation, transmission, and reporting to the participating RCST systems, as illustrated in FIG. 15, the originating system negotiates a key exchange and storage location reservation with a first RCST system, steps 1510 and 1512. It then uses that negotiated key to transmit an encrypted segment to that first RCST system, as well as an obfuscation pattern and a transmission pathway pattern with embedded instructions, to establish a transmission pathway, optionally including a counter value, a combination of steps 1514 and 1536. It includes, in the pathway preparation instruction, a counter which will decrement to count and control the number of further RCST systems that will constitute a transmission pathway. The embedded instruction instructs the first RCST system to negotiate a key exchange and storage reservation with a second RCST system, steps 1518 and 1520.

The first RCST system then encrypts the object segment, transmitted by the originating system, with the key exchanged between the first and second RCST systems. The first RCST system then transmits the encrypted segment to the second RCST system, along with a different obfuscation pattern and transmission pathway pattern, and with the decremented counter, and instructions to transmit the object segment to a third RCST system, a combination of steps 1522 and 1542. The second RCST receives the segment and embedded instructions for the first RCST system, step 1524. The second system then repeats the actions of the first RCST system with a third RCST system, a combination of steps 1526 and 1544, and so forth, until the counter is decremented to a termination value, which is zero in this embodiment. At this point in the process, a number of RCST systems in the transmission pathway, that number matching the counter value transmitted by the originating system, have executed the process that occurred between the first and second RCST systems. The originating system thereby knows the locations, encryption keys, and retrieval metadata for only a specific and limited number of RCST systems in the transmission pathway that will correspond to the retrieval pattern for that transmitted segment.

In another embodiment, an RCST system establishes with, another RCST system, a secure transmission channel, such as a Virtual Private Network, a changeable synchronized pattern of source and destination addressing distributed over multiple packets specified by a pattern permutation, or the like. When instructed to establish a transmission pathway, a first RCST system can include a second RCST system with which it has already established a secure transmission channel. This eliminates the requirement for a key exchange between the two RCST systems.

In the embodiment above, the steps may be rearranged, and a greater or lesser number of similar steps may be performed in other embodiments of the present invention. A detailed description of another embodiment is described below.

Figure 3:
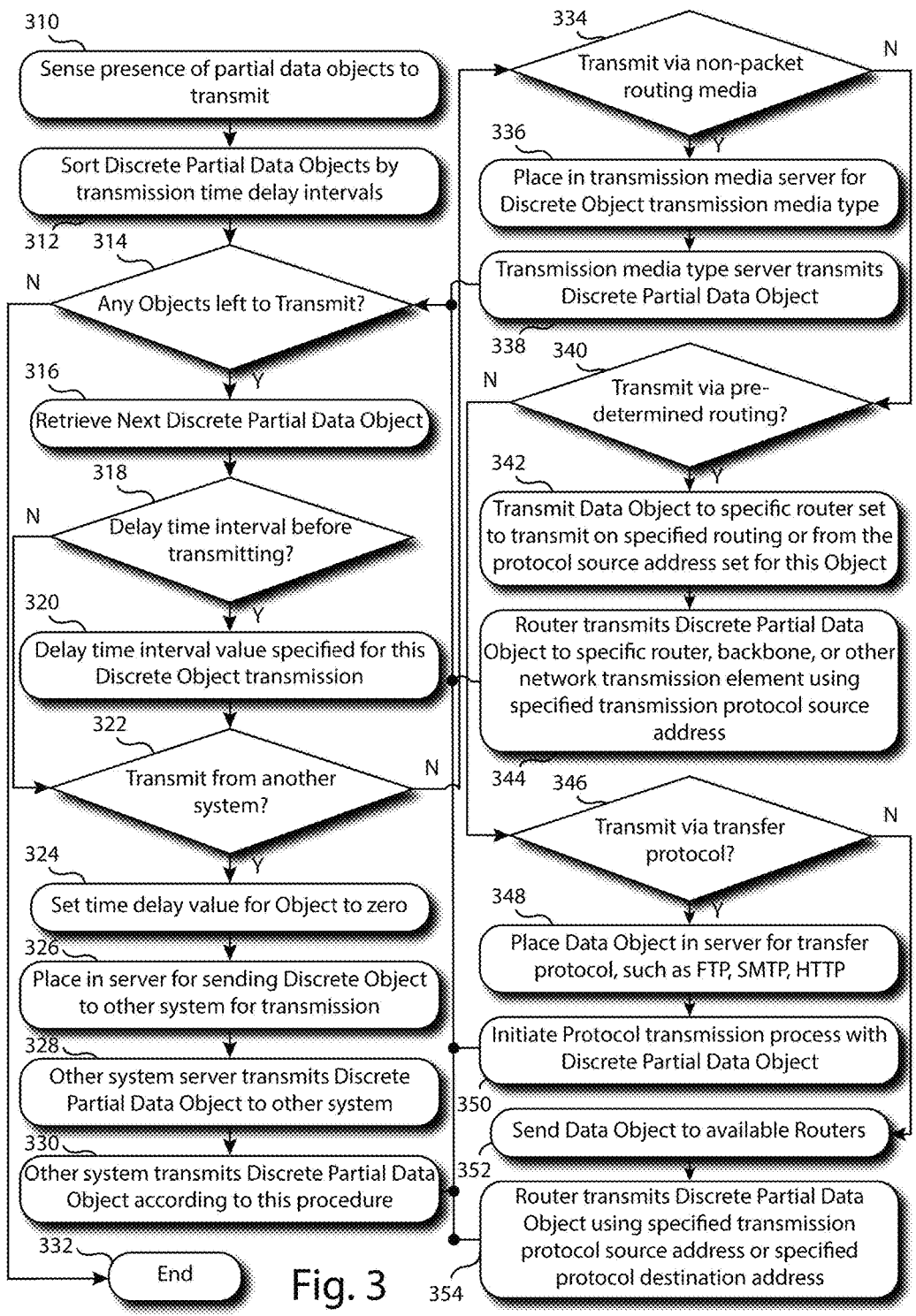

An Alternative Transmission Pathway Processor Embodiment:

FIG. 3 illustrates a flow diagram according to an embodiment of the present invention. In particular, FIG. 3 illustrates the procedures executed by a Transmission Pathway Processor when transmitting ODO and invalid segments.

In the present embodiment, transmissions of segments and groups of segments, as well as the negotiating object, may be performed by a logical transmission server. In this embodiment, when the Transmission Pathway Processor determines that a segment or a group of data object segments are ready to be transmitted, step 310, the Transmission Pathway Processor sorts the segments in order of time delay of transmission, placing pointers to the segments that will be transmitted so that the sooner a segment will be transmitted, the sooner it will be accessed on the transmit queue, step 312.

The Transmission Pathway Processor then determines if there are any segments left to transmit on the transmit queue, step 314. If there are no segments left to transmit, the processor ends operations, step 332. If there are segments left to transmit, the current processor retrieves the segments, step 316, then determines if there is a time delay before the transmission of the retrieved segments, step 318. If so, the Transmission Pathway Processor reads the segment package metadata to determine the time interval, and waits for that time to elapse before commencing the transmission sequence, step 320.

The Transmission Pathway Processor then determines whether the data object segments are to be transmitted from another system, step 322. If so, the segments, and groups of segments, are, subsequently, transferred from the other transmission system to the destination RCST system. And, if so, then it resets the time delay parameter in the object metadata to zero, since that time is already expired. It then passes the group of data object segments to a transmission processor, step 326, that, subsequently, transmits the data, securely, to another system. In the present embodiment, it is envisioned that the other system will send the segments in a secure manner as described herein, step 330.

If the segment is flagged for transmission on non-packet routing media, step 334, then it is placed in an appropriate memory area, step 336. It is transmitted over non-packet routing media, step 338.

Next, in this embodiment, the Transmission Pathway Processor determines whether the Transmission Package Processor has specified that the segments are to be transmitted using a predetermined transmission routing, step 340. If so, the Transmission Pathway Processor transmits the segment to the set of specific address and systems, designated in the segment package metadata written by the Transmission Package Processor, step 342. In one embodiment of the present invention, this address may be a router that is connected to a first ISP that is coupled to a backbone network infrastructure element that is different from the backbone network infrastructure, coupled to a second ISP to which other routers in the system are connected. This embodiment enables the Transmission Package Processor to deliberately transmit a data object segment over different packet routing backbones.

After a group of data object segments has been sent, the process disclosed above may be repeated for a next group of segments, step 314. If no other groups of segments are available, the process halts, step 332.

In the present embodiment, the Transmission Pathway Processor determines whether segments are to be sent using a specific transfer protocol, step 346. This typically occurs by reading the protocol specification in the segment package. If the group of data object segments are to be transmitted using a specific protocol, the groups of data object segments are wrapped in the appropriate metadata and header information for that specific protocol, and placed in the transmission queue capable of transmitting that protocol, step 348.

Subsequently, the specified protocol's transmission and receiving processes on the originating and destination systems then manage the transfer of data object segments using that protocol. By using multiple protocols, unauthorized accessors are deterred from using protocol stream capture to acquire a complete set of data object segments. This embodiment also has the advantage of more predictably transferring a data object segment through firewall security systems. For example, ports for common protocols are routinely opened on the firewall to allow email, World Wide Web, file transfer protocol traffic, and the like, to be shared with their network outside the firewall protected network.

In this embodiment, the data object segment is transferred, securely, using the exchanged key, and via a specified transfer protocol, step 352. The sending and receiving systems exchange authentication tokens, in the form of digital signatures, and then begin uploading and capturing the data object segments. When data are sent through the routers, with varying source and destination addresses, they may be sent across varying network paths. This embodiment deters unauthorized accessors from acquiring a complete set of data object segments by using packet address analysis. These accessors would be required to know and monitor a broad range of source and destination addresses and protocols, to and from which the data objects can be sent, and be able to monitor and capture all traffic between that range of network addresses.

In another embodiment, after the preparation of the transmission pathway, both invalid and valid segments are transmitted across different carriers and transmission media to separate secure access areas so that enough segments from the same data object are not stored in the same access area so as to allow reassembly of the Original Data Object from the group of segments in the same secure access area. In one embodiment where two groups of data object segments have been determined, e.g., odd and even, a first group of data object segments may be transmitted across a TCP/IP Network; and the second group of data object segments may be transmitted across a Cellular Network. In another embodiment, the first group of data object segments may be transmitted across a specific transmission media, for example, utilizing a first Computer Network backbone, and the second group of data object segments may be transmitted across a different transmission media, for example, utilizing a second Computer Network backbone. As disclosed herein, many different types of diverse communication carriers and transmission media can be used. Directing data object segment packets over a specific backbone can be accomplished by diverse methods, including, without limitation, using Loose-Source Routing (LSR) or a Strict-Source Routing (SSR) data in the packet header.

Figure 8:
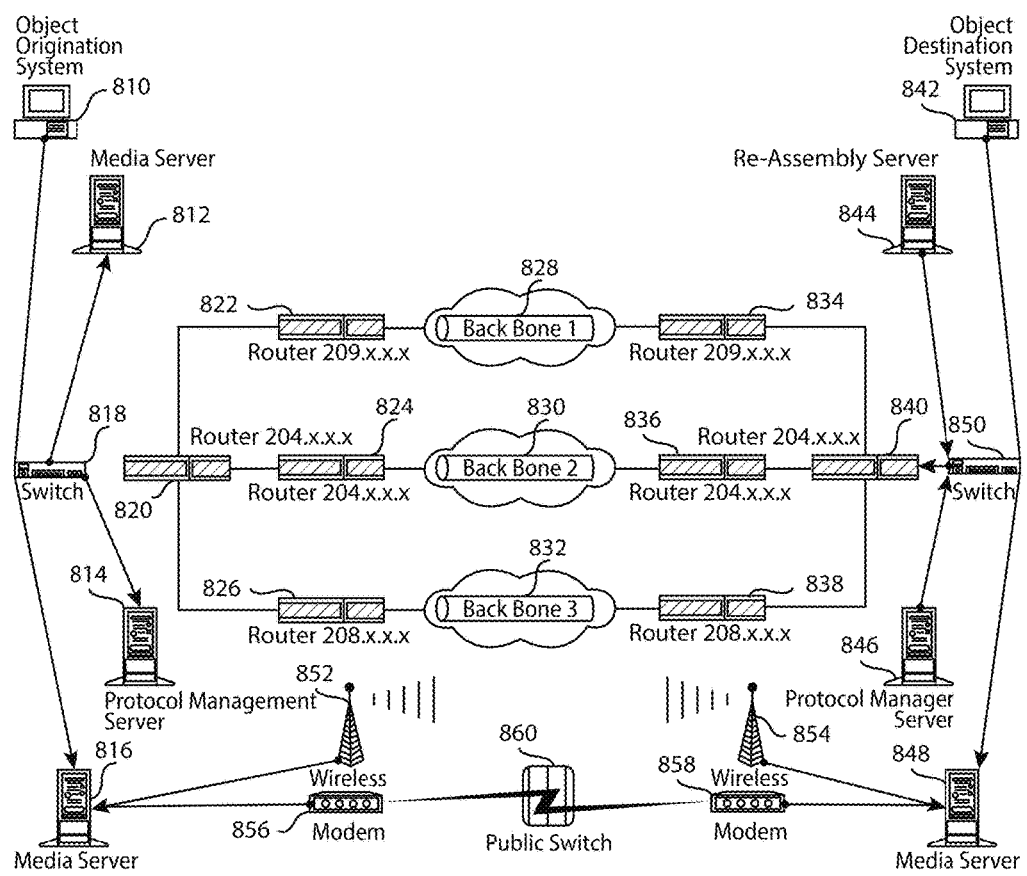
Figure 9:
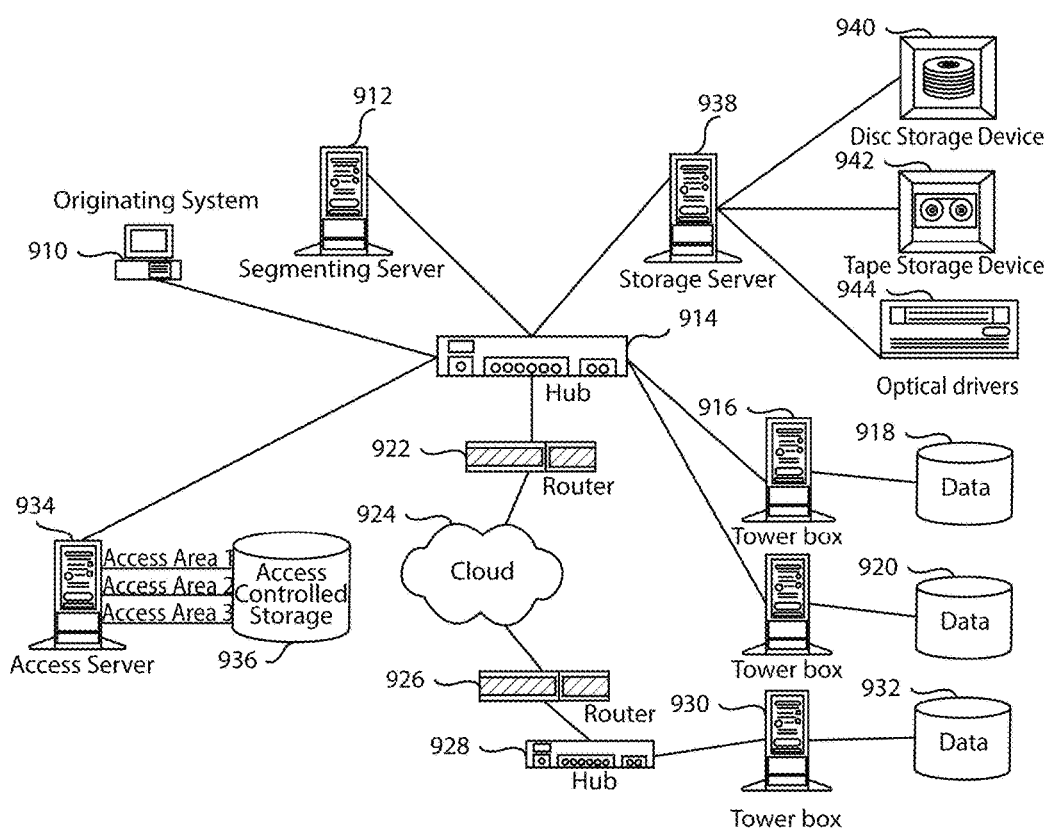

FIGS. 8 and 9 illustrate embodiments of the present invention. FIG. 8 illustrates that the diverse transmission media and Communications Networks may include computer backbone networks, 828-832, and may include wireless or landline switching networks 852, 962, 860. As can be envisioned, in light of the description of embodiments above, an ODO transmitted from an originating system, 810, may be segmented, and the segments may be transmitted over multiple transmission networks, and to separate storage areas on separate storage resources, and in separate secure access areas. Similarly, a receiving system, 842, may receive transmissions from multiple transmission networks, validate the data, and reassemble the data.

After the data have been transmitted over different carriers, a receiving RCST system receives the data object segments. In this embodiment of the present invention, a first receiving computer has access to more than one type of communications carriers or transmission media, then receives one segment, or group, of data object segments. A second RCST system, remote from the first RCST system, has access to one type of communications carrier, receives one of the data object segments, and stores it in a secure access area different from the secure access area where is located the first data object segment transmitted to the first RCST system. In this way, the first RCST system receives and stores one segment from the original data object, and the second RCST system receives and stores a different segment from the same original data object.

In one embodiment, in addition to transmitting segments over a packet routing network, the Transmission Pathway Processor dials out, on a connected analog modem, to the receiving system, exchanges authentication and encryption keys and protocols, then uploads groups of data object segments to the receiving system. Transmitting data in this manner forces unauthorized outsourcers to monitor both central office type phone calls, and the like, as well as multiple packet routing, and non-packet routing, simultaneously, greatly reducing the possibility that they will capture and analyze a complete set of data object segments.

In another embodiment, the originating system invokes a non packet routing media transmission process that dials out on a connected modem to the receiving system, exchanges authentication and encryption keys and protocols, then uploads a data object segment to a receiving system. Next, the originating system invokes a packet routing media transmission process that connects, over a network of packet routers, to a separate and distinct receiving system, exchanges authentication and encryption keys and protocols, then uploads a data object segment to that second, separate and distinct, receiving system.

The originating system then continues to invoke multiple types of transmission processes using diverse transmission media, networks, addressing, and protocols, to connect to a variety of diverse and separate receiving systems, exchange separate and distinct authentication and encryption keys and protocols with each of them, then upload separate and distinct segments from the same data object to each separate and distinct receiving system until there are no further data object segments to transmit. Transmitting data in this manner forces unauthorized outsourcers to monitor both central office type phone calls, and the like, as well as multiple packet routing and non-packet routing simultaneously, greatly reducing the possibility that they will capture and analyze a complete set of data object segments. It also forces unauthorized outsourcers to gain access to multiple diverse receiving systems to monitor multiple transmission media, thereby making the process of unauthorized access more difficult.

Figure 4:
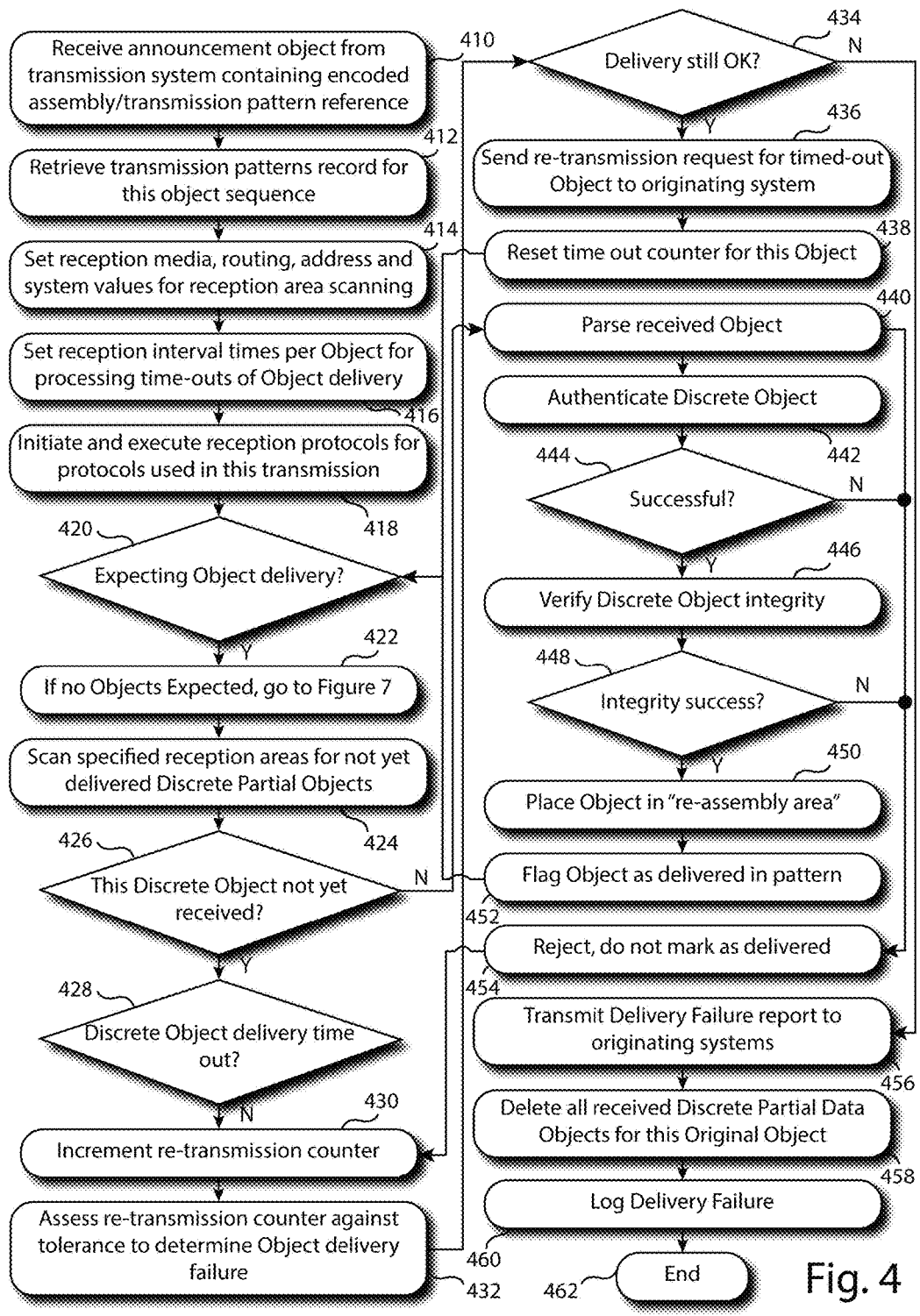

Receiving Transmitted Segments: FIG. 4 is a flow diagram illustrating an embodiment of the present invention. In particular, FIG. 4 illustrates the process of the receiving system when receiving the segments transmitted in the previously disclosed processes.

In one embodiment, if an "announcement", or negotiating object were used to transmit Metadata and exchange encryption keys for the segment, the receiving system receives the negotiating object, step 410. The Metadata typically include a digital signature from the transmitting system, and encrypted information describing the Metadata, such as the reserved storage location, the transmission ID of the segment, embedded instructions for the receiving RCST system, and the like. As described above, Metadata associated with the data object segments may also be transmitted with the data object segments. In response to the receipt, the receiving system decrypts the Metadata and determines the transmission instructions, step 412, which may include instructions to store the segment, transmit it to another RCST receiving system, or both. As disclosed above, the instructions are derived from the TPP, which specifies how segments, and groups of data object segments, are to be transmitted between, and stored on, the RCST systems.

The method then prepares the system to receive the data, step 414. In the present embodiment, the system initiates applications for receiving the segment in the various ways in which it could receive a data object segment according to the TPP. For example, the receiving system initiates reception servers and hardware for various transmission media, including putting a receiving modem into auto answer, or clearing a cellular channel for incoming data transfer calls, and the like.

In the present embodiment, the method, then, sets time parameters for reception according to the TPP instruction embodied in the instructions embedded in the transmitted segment's metadata, step 416. This is done so the receiving system can timeout the delivery of data and report possible error conditions. If various known protocol interfaces are specified in the TPP, these servers are also initiated, step 418. As previously discussed, such protocol interfaces may include, without limitation, FTP servers, SMTP servers, and HTTP servers, and the like, and other protocols, as may be devised, including proprietary protocols.

Next, the receiving RCST system enters into a program loop that checks for the presence of data, step 420. Delivery of objects can be terminated, either through delivery of a complete dataset of a segment package, through a timeout, and subsequent failure, of the delivery process for the current group of data object segments, or the like.

In the present embodiment, if an expected segment, or segments grouping, has not yet been received, step 426, the elapsed time is measured against a latency time expected for delivery of the group, step 428. This latency time may also be specified in the instructions embedded in the metadata of the transmitted segment.

In the present embodiment, if the delivery of a segment "times-out", a request for retransmission of the group is sent to the Transmission Pathway Processor, and a retransmission counter is incremented, step 430. In the present embodiment, the counter is maintained to enable a maximum allowed number of retransmission requests. The transmission counter is stored, and accessed, in a memory, step 432. If the maximum number of allowed retransmissions has been exceeded, the group of data object segments is considered invalid. In the present example, if the maximum has not been reached, step 434, a retransmission request for the timed-out data is sent to the originating system, step 436. The timeout counter is then reset, step 438.

When the expected segment is received, step 426, the segment package is parsed, step 440. The data object segment may then be authenticated against an expected segment verification record exchanged with the transmitting system, step 442. In the present embodiment, if that process is successful, step 444, the integrity of the data object segment is checked, step 446. This step typically includes checking a hash message digest of the data object segment containing the digital signature attached to the data object segment. If the integrity check is successful, step 448, the data object segment is placed into a memory area, step 450. In this embodiment, the delivery pattern record, for the group of data object segments, is then flagged as delivered, step 452.

The receiving, or RCST, system then executes the instructions parsed in step 440, which can include, without limitation, to store the segment to a specified storage location, to transmit the segment without storing it (relay the segment), reformat the segment package into a different protocol for transmission, decrypt the object with a shared key, re-encrypt the object with a different shared key, delete the segment and transmit an invalid data object segment with the same identifiers, re-obfuscate the segment and migrate it to another RCST system, and the like.

If the object authentication, or integrity check, does not succeed, the present embodiment rejects the delivered segment object, step 454, and a retransmission request is generated in step 436, described above, if appropriate, and so configured, in the system.

If the method determines that the delivery process is no longer valid, step 434, for example, the maximum number of retransmission attempts is exceeded, a transmission failure is reported to the originating system. In the present embodiment, the originating system, or another transmission system, such as an RCST system, subsequently determines whether or not to retry transmission of the data. If the system determines that it will not retry the transmission, any data received up to that point is deleted, step 458, and a delivery failure is, optionally, written to an application log file, step 460.

Segment Storage on Diverse, Different, and Separate Storage Locations or Secure Access Areas: FIG. 9 illustrates that storage locations for segments and segment groupings may include storage resources and media maintained at a variety of physical locations, for example, via the Internet, 932, a new local tangible media, 940-946, on a controlled access storage area 936, and the like. Storage and computing resources may be located across political boundaries and at different storage and computing vendors. As can be envisioned in light of the description of embodiments above, segments transmitted from an Originating System, 910, may be stored to multiple types, and locations, of different Storage Media. Similarly, when attempting to reassemble the data, the Originating System, 910, can act as a retrieval and receiving system, and may receive data from a variety of different Storage Media at different storage locations. Once validated, the segments can then be reassembled into the ODO.

In this embodiment, the transmitted data object segment are stored so that not enough segments from the same data object are stored in the same access area, or in the same storage location, so as to allow reassembly of the ODO from those segments stored in the same secure access area or storage location. This makes it more difficult for unauthorized accessors to access a collection of segments sufficient to reassemble the original data object, since they are required to "hack into", or access, multiple secure storage access areas. In another embodiment, no two segments from the same data object are stored in the same secure access area.

In another embodiment, the segments are stored so that two or more segments from the same data object may be stored in the same access area if the transmission pattern permutation has calculated that they will be sufficiently obfuscated, and made anonymous, through multiple stages of Transmission Pathway "anonymization" and obfuscation methods, so as to make it more difficult to determine that they are from the same original data object. This makes it so that, if an unauthorized accessors gains access to a secure storage access areas, it increases the difficulty of determining that these segments are required to reassemble the original data object.

FIG. 9 also illustrates an alternative embodiment of the present invention, wherein the segments are stored in diverse and separate secure access areas, elements 934 and 936, without transmitting them to remote storage resources. In this embodiment, the Transmission Pathway Processor is used to log into the secure access areas, and write or copy the segments into them. Generally, FIG. 9 can illustrate embodiments where, instead of transmission of segmented data across diverse transmission media, transmission paths, and the like, different segments from the same ODO are stored onto diverse, logically and physically, separate storage media at diverse media locations, and the like, elements 932 through 940. For example, the Storage Media may be at locations within a local disk drive, element 940, and within a controlled access storage area, element 936. The Storage Media may include tape drives, CD ROMs, printed media, hard drives, solid state drives, thumb drives, and the like. Further, the storage may occur at remote sites, for example, onto remote servers on a local area network, across a wide area network, such as the Internet, or a combination thereof, and the like. Storage Media for segments can also include paper and microfiche, if the segment content is rendered as a printable representation of the digital data of the segment.

In one embodiment, the pattern processor generates a Transmission and Storage Pattern Permutation (TPP) wherein the storage location of the various segments from the same ODO are structured so that only one segment from the same ODO is stored in a specific controlled access or secure access storage area, or that two or more segments are stored in the same secure access area, but not of a sufficient number, as determined by a system configuration, to reassemble the ODO. This separation of segment storage greatly increases the difficulty for unauthorized accessors collecting a sufficient amount of segments to reassemble the ODO.

In another embodiment, the segments are replicated, for disaster recovery purposes, across RCST's located in diverse electrical, communications, geopolitical, and commercial environments to provide failover in case of component or vendor failure, or system theft. In the unlikely event of theft of all RCSTs, and in the unlikely event of unauthorized access to all of the segments of the same ODO, knowledge of the encryption/obfuscation, transmission, validity, and storage patterns is still required to decipher the original data object. Additionally, the obfuscation, transmission, retrieval, and invalid data patterns change each time a new original data object is processed due to the pattern permutation processor, further increasing the use of pattern recognition across data object segments for cryptanalysis.

In another embodiment, the RCST systems, in the same manner as with valid segments, exchange encryption keys, transmit invalid segments, receive invalid segments, and store those invalid segments with other RCSTs with which it has exchanged keys to obfuscate the transmission of valid data object segments. Similarly, the originating system also sends and receives invalid segments during its use of the invention. In this embodiment, invalid segments may be stored with valid segments from the same ODO, and the same transmission pattern permutation instance, in order to further obfuscate, and increase the anonymity of, the segments, and their associations with each other and the ODO.

Transmission Specification: The invention also provides a TPP attribute, for each segment, which specifies which level of diversity of transmission medium, or which transmission protocol, will be used for that segment. This attribute can specify that some segments be sent over the TCP-IP socket if available, others over an HTTP port, an FTP port, over a separate device, such as a cellular phone connected to the originating system, if available, via a USB port or wireless Bluetooth connection, if available, and the like. By sending the various segments over different transmission media, it is more difficult for third parties to collect all the segments from the points of origin, since they would have to monitor and record all the transmission media data conveyance technologies available to the transmitting system. This distributed transmission media diversity can be utilized by all transmitting and receiving components of the invention, including, without limitation, the originating system, RCST systems, and retrieving systems.

In one embodiment, in response to an instruction to do so, or upon a pre-specified event, or upon the lapse of a specific time period, an RCST transmits the segment it receives to another RCST matching the retrieving system's retrieval pattern, then does, or does not, permanently delete the segment it transmitted. This allows the active and current retrieval pattern to change over time, and to be different from the transmission pattern, for all, or some, of the segments.

In another embodiment, an RCST system receives encrypted obfuscation pattern permutations and encrypted transmission, and storage pattern permutations, from the originating system, or another RCST system preceding it in the transmission pathway, so that the RCST systems may themselves use the invention to obfuscate, package, store, transmit, and receive segments with each other and, also, optionally, back to the originating system, or to other systems. In this embodiment, the RCST transmits the segment to another RCST according to a TPP calculated by the RCST system using the permutation calculations methods disclosed herein, then securely reports the storage locations and encryption keys back to a retrieval system, which may or may not be the originating system.

In one embodiment, the Transmission Pathway Processor transmits invalid data object segments that are not related to the patterns or content associated to a specific ODO. These unrelated, invalid data object segments can be transmitted with different time intervals between the transmission of the segments, including transmitting them before, during, or after the transmission of segments containing valid data, invalid data, or a combination thereof.

The Retrieval Processor:

In one embodiment, the invention generates, from a Pattern Processor, as illustrated in FIG. 11, or acquires from another system, or from a predetermined reference, a Retrieval Pattern Permutation ("RPP"). This Retrieval Pattern Permutation will specify from which storage locations the ODO's segments will be retrieved, and with which transmission attributes and metadata they will be retrieved, in order to reconstruct and reassemble the Original Data Object. The retrieval pattern can be the same as the transmission pattern, whereby the originating system will retrieve the segments from the same RCST storage locations and use the same transmission metadata with which they were transmitted. If the Retrieval pattern is different from the transmission pattern, the RCSTs that have received the segments from the originating system TPP will, in turn, execute instructions embedded in the segments to prepare and execute a multi layer transmission and encryption pattern key exchange with other RCST systems, as illustrated in FIG. 15, to transmit and store the segments into the RCST storage locations that coincide with a retrieval pattern that is different from a transmission pattern.

In one embodiment, the originating system employs a retrieval pattern that is different from the transmission pattern. In this embodiment, the originating system can transmit data object, and invalid segments, to a set of storage locations corresponding to a retrieval pattern known to another instance of the invention, which can then independently retrieve the segments in order to perform highly secure file synchronization. Storing transmitted segments for a retrieval pattern that is different from the transmission pattern can also prevent a third party from retrieving the segments if the third party discovers the transmission pattern. It can also allow the originating system to transmit copies of the same ODO and invalid segments to storage locations corresponding to multiple different retrieval patterns known to multiple, different, retrieval systems, so that an object can be securely transmitted to multiple retrieval systems, each with its own unique instance, retrieval pattern, retention period, encryption keys, content redaction, access credentials, transmission format, routing attributes, tracking and reporting, and the like. This allows the originating system to track and control multiple retrievals of the segments.

Figure 16:
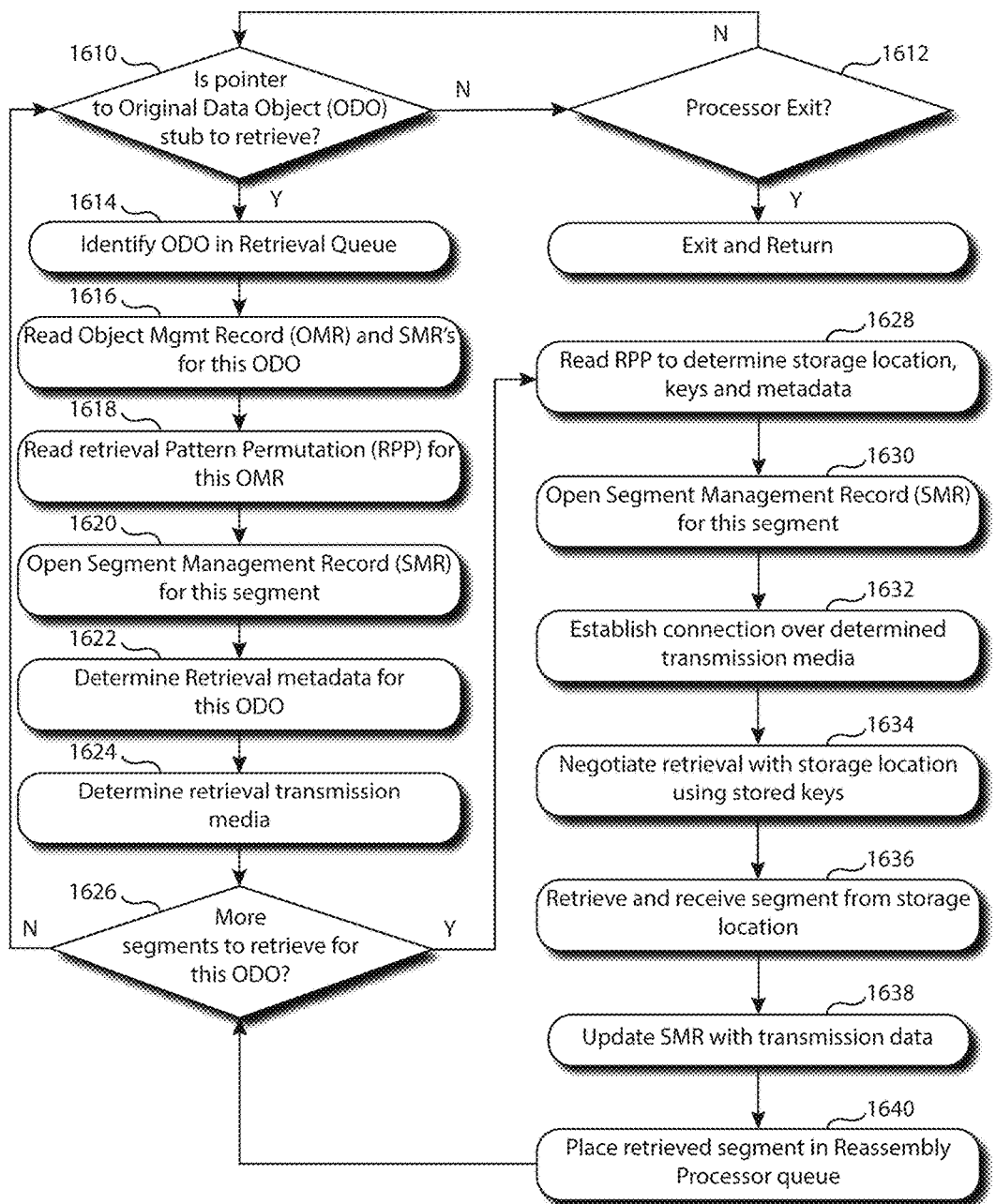
FIG. 16: A flowchart of the method in which a retrieval system retrieves valid and invalid Segments from diverse, separate, and secure storage, processing, and transmission systems.

FIG. 16 illustrates the invention's Retrieval Processor, as provided in the present embodiment. It is invoked by a manual or automatic process requesting the retrieval of a set of segments for a specific ODO. The requesting process places a pointer, and identifiers for that ODO, in the Retrieval Processor's queue, Step 1610. This requesting process can be invoked by a user clicking on a file pointer object, an automated system attempting to open a file object, a web browser user clicking on a web page link, a Smartphone communication application streaming a telephone voice call, an email client downloading an email rendered as ODO segments, a database retrieving information to populate a data base field, and the like.

The Retrieval Processor identifies the requested ODO, and gets the records and patterns needed to retrieve its segments, step 1614. It reads the Object Management Record (OMR) and Segment Management Records (SMR) associated with the specific data object, step 1616, then reads the associated Retrieval Pattern Permutation, if available, step 1618. This processor then determines, by comparing the information in these records, and resolving in case of a conflict in favor of the Retrieval Pattern, which may have changed by methods disclosed herein, the required information regarding the RCST system or systems, storage locations, access credentials, encryption keys, protocol packaging, and formatting requirements for retrieving the valid object segments and associated invalid segments from their storage locations, step 1622.

The Retrieval Processor then determines which diverse transmission media are available to the retrieving system and, also available, to the corresponding storage systems, and by which transmission media to retrieve the object segments. The Retrieval Processor then assigns an available and compatible transmission medium to each segment storage location system, Step 1624. The Retrieval processor then checks to make sure there remain segments to retrieve for this ODO, step 1626, then reads the RPP, step 1628, or SMR, step 1630, for this segment, to determine its location, protocol, and other attributes, as disclosed herein. The process resolves to the RPP in case of conflict in storage location data. The Retrieval Processor then establishes a connection to the RCST storing the segment, or group of segments, step 1632, then transmits a negotiation object to the RCST system, holding a stored segment to prepare the retrieval of that segment from that system over that medium, step 1634. If the retrieval proves viable, the retrieval processor exchanges, or verifies, a previously recorded encryption key with the RCST system, encrypts the retrieval request, then transmits the retrieval request to the RCST storage system specifying the identifiers, access credentials, location identifiers, encryption keys, retention instructions, protocol packaging, and transmission format for the transmission of the segment from the RCST storage system to the retrieving system. If the RCST storage system successfully resolves this metadata from the retrieving system, it transmits the segment to the retrieving system using the transmission metadata negotiated with the retrieving system, step 1636.

If the retrieval processor is not able to negotiate or resolve the retrieval of an object or invalid segment from an RCST storage system, it will refer to the SMR, then to the RPP, to use the retrieval metadata for another storage instance of the object segment or invalid segment that was executed in the transmission pathway. The retrieval processor will then negotiate retrieval of that alternative storage instance of the segment, or invalid data, using the retrieval metadata associated with that storage instance.

Retrieval of each of the data object segments in the SMRs is tracked by the retrieval processor, according to the TPP embodied in the SMR, to determine when all the data object segments have arrived. In this example, the receiving system references the SMR, then the RPP, to determine when, and by which transmission methods, remaining groups of data object segments are to arrive.

If the retrieval processor is not able to retrieve a segment from any storage instance, it examines the SMR to determine if the segment is entirely comprised of invalid data. If it is entirely comprised of invalid data, the retrieval process will insert into, the reassembly queue, an invalid segment of the length and format, of the irretrievable segment, with the in-process object and segment identifiers, i.e, it will insert a substitute segment that will be treated as an invalid segment by the reassembly processor. It will then flag that segment as substituted, and complete, to the retrieval tracking process.

As shown in FIG. 4, if the method determines that the delivery process is no longer valid, or that the maximum number of retransmission attempts has been exceeded, a transmission failure is reported to the originating system, step 456. In the present embodiment, the originating system, or another retrieving system, such as an RCST system, subsequently determines whether or not to retry retrieval of the data. If the system determines that it will not retry the retrieval, any data received up to that point is deleted, step 458, and a delivery failure is, optionally, written to an application log file, step 460.

When the retrieved segment is received in step 426, the segment is authenticated against the expected delivery pattern record in the Segment Management Records, by the retrieval processor, step 442. In the present embodiment, if that process is successful, step 444, the integrity of the data object segment is checked, step 446. This step typically includes checking a hash message digest according to the segment hash digest stored in the SMR in step 1346. If the object authentication, or integrity check, does not succeed, in steps 444 and 448, the present embodiment rejects the retrieved segment, step 454, and a retransmission request is generated in step 436, described above, if appropriate.

As shown in FIG. 16, when the retrieval processor is able to negotiate the retrieval of a segment stored on an RCST storage instance, it receives the transmission of the object segment from the negotiated storage instance RCST system, step 1636. It then updates the SMR with the reception information as configured, step 1638. In this embodiment, after transmitting the segment, the RCST storage system will examine the retention specification for this segment in its storage repository and determine whether or not to store or to delete the object segment. The retention specification can instruct the storage resource to perform various actions including, without limitation, destroying the retrieved segment upon successful reassembly of the ODO, after a certain time period has lapsed, or after another specified event has occurred. The object segment metadata can contain instructions on the disposition method to be used for the object segment disposition. The Retrieval Processor then inserts the retrieved object segment into the Reassembly Processor queue and sets a "segment ready to process" flag, step 1640.

Figure 6:
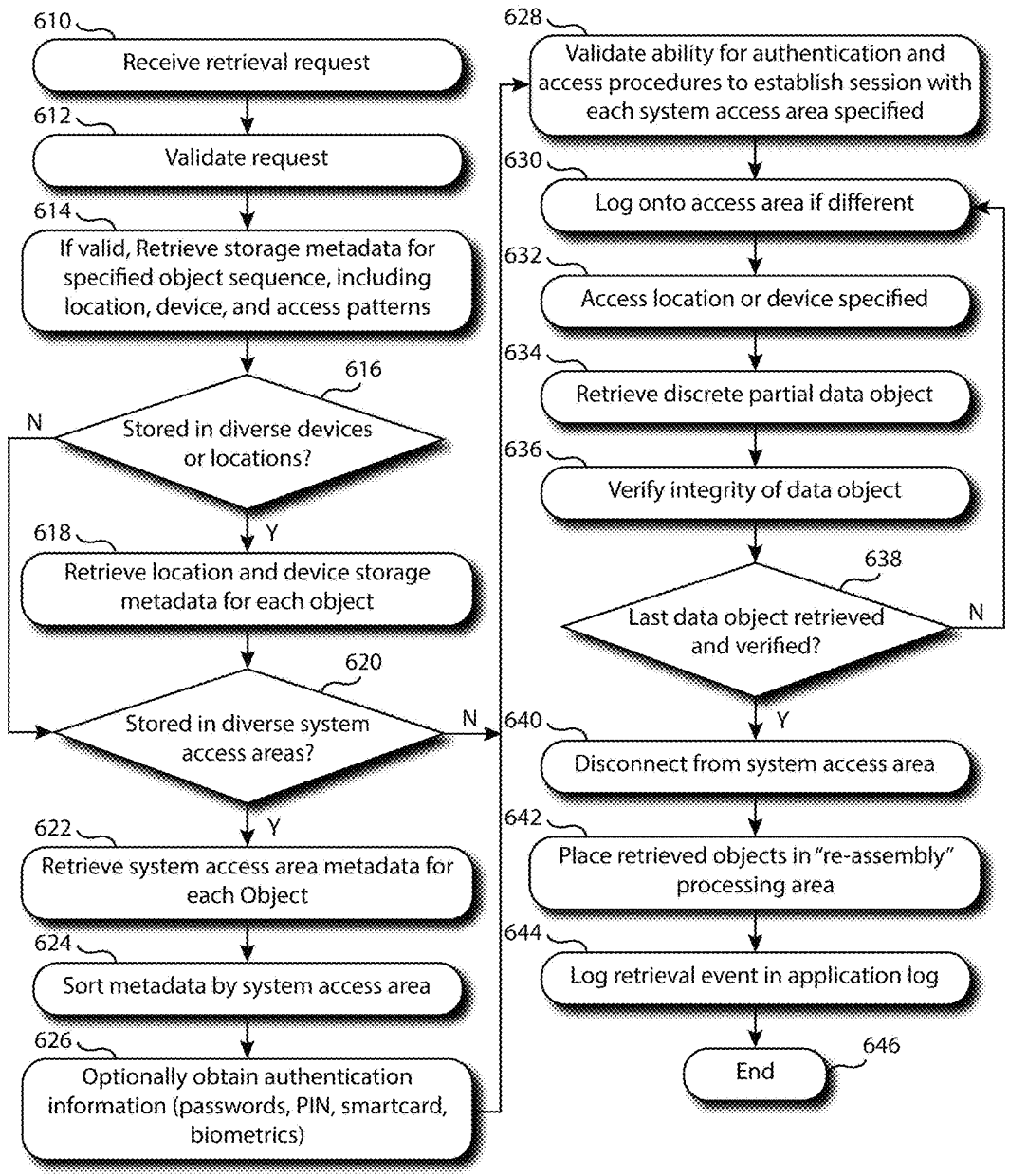

FIG. 6 shows the processes in another embodiment of the Retrieval Processor method to reliably retrieve segments that were stored according to the transmission and storage method disclosed herein. In this embodiment, the retrieval processor receives a retrieval request for a set of data object segments, step 610. The retrieval process of the method then validates the request, step 612, both for authenticity, and for feasibility of the retrieval of each object segment. Upon successful validation, the method retrieves stored data indexed for this object, and segment, typically stored in the OMR and SMR, step 614, containing specifications, without limitation, as to the location, device, protocol, encryption key, format, and access area in which the data object segments are stored. The method first determines whether the metadata specifies that the segments are stored in diverse devices or locations, step 616. If this is so specified, the method retrieves location and device storage metadata for each object segment, step 618, from the SMR. The method then determines whether the metadata specifies that the object segments are stored in diverse system access areas, step 620. This is typically the case, since the separation of logical and physical storage of segments, sufficient in number to reassemble the ODO, as disclosed herein, provides greater security and privacy for the ODO. If this is so specified, the method retrieves system access metadata for each object segment, step 622. The method then optionally obtains further authentication information, step passwords, PIN, smart card, biometrics, from operators or otherwise, step 626, if such an action conforms to the security model of the entity deploying the method. The method then performs authentication and access procedures to confirm its ability to establish a connection, and session, with each system access area specified in the storage metadata record, step 628.

The method then begins a program loop that retrieves data object segments according to the storage metadata records' contents. If the segment is stored in a secure access area, the method then logs onto the system access area specified in the first object's metadata, step 630. If the target access area for the object retrieval is different from the method's current login area, it logs into the new specified access area. The method then accesses the specified location, or a device, step 632. The method then retrieves the data object segment from that location or device to a retrieved object processing area. The method then verifies the integrity of the data object segment read, step 636. The method then determines if all the data object segments have been retrieved and verified, step 638. If they have not, the method retrieves data object segments, step 630, until all have been copied to the retrieved object processing area. When this occurs, the method logs off from its current system access area, step 640, places the retrieved object segment, or segments, into the "Reassembly Processor queue" in step 634, as also shown in step 1640 in FIG. 16, and, optionally, logs the retrieval into an application log, step 644.

In one embodiment of the invention, the retrieval processor executes multiple retrieval patterns simultaneously while interspersing the retrieval actions of the multiple patterns for purposes of retrieval action obfuscation, with only one of the retrieval patterns executed to retrieve the segments needed for collecting and reassembling the original data object.

In another embodiment, the retrieval processor negotiates and retrieves, from an RCST system, invalid data object segments that may or may not have been transmitted with the original transmission of data object segments for a particular data object. This is intended to obfuscate the retrieval of valid data object segments, and render the collection of valid data object segments during retrieval more difficult for unauthorized accessors.

Segment Migration: In another embodiment of the invention, the retrieval processor instructs an RCST system, storing a segment in a retrieval location, to relocate, or "migrate", one or more of the data object segments from their storage location to another storage location. The segments are relocated to other storage resources typically in response to an event, such as the lapsing of a period of time, a manual segment relocation command, an automated response to a security attack analysis, and the like.

FIG. 20 illustrates this segment migration method of the invention. In this embodiment, the Retrieval Processor generates a new retrieval pattern, either through a permutation algorithm, as disclosed herein, or through other methods, or acquires a new retrieval pattern in some other way, such as reading from a predetermined list of retrieval patterns, or receiving a retrieval pattern from another system, or manual entry of a retrieval pattern by an operator, and the like. The Retrieval Processor then sends a request to the Transmission Package Processor to package invalid segments to be transmitted to the RCST systems currently storing segments that correspond to the retrieval pattern locations from which they're migrating. The new invalid segments are packaged by the Transmission Packing Processor according to the methods disclosed herein, with the embedded instructions that instruct the RCST systems storing the segments to migrate and relocate those segments to different RCST systems. The current RCST systems storing the segments, according to the Retrieval Pattern that is being replaced, are instructed to transmit their segments to other RCST storage locations that correspond to a new retrieval pattern known to a retrieving system. For example, a first RCST system currently storing a segment can transmit the segment, either directly, or through a prepared transmission pathway that is predetermined, or is to be prepared autonomously by the receiving RCST system according to the transmission pathway preparation methods disclosed herein.

In the example embodiment shown in FIG. 20, the method has received a TPP for a segment migration specifying a 3 stage pathway, with the new corresponding retrieval pattern location at the third stage of the pathway on RCST03. Other combinations of pathways can occur, depending on the migration TPP.

In this embodiment, a first RCST system, RCST 01, which is storing a segment corresponding to a retrieval pattern from which it is migrating, exchanges encryption keys with the originating system, steps 2010 and 2012. The Transmission Package Processor packages, for transmission, an invalid segment with the embedded migration instructions for RCST01, and submits the packaged invalid segment to the Transmission Pathway Processor for transmission, which then transmits the invalid segment package to RCST01, step 2014. The embedded migration instructions specify that RCST01 will prepare an autonomous transmission pathway that will store the segment at the third stage on RCST03 with a specified encryption key.

RCST01 system receives, decrypts, and parses the received segment package, step 2016. It then reads and executes the embedded segment migration instructions. Depending on the embedded instructions, RCST01 may prepare an autonomous transmission pathway across other RCST systems, as shown in FIG. 15, or transmit the migrating segment directly to the newly specified RCST storage system corresponding to the new retrieval pattern. As specified in the embedded migration instructions in the example embodiment, the RCST01 prepares an autonomous transmission pathway across other RCST systems, starting with RCST 02, to increase the anonymity of the segment, step 2018 and step 2020. RCST01 then sends encrypted, embedded instructions to RCST02, step 2022, which decrypts and reads the instructions to prepare an autonomous transmission pathway to the destination RCST03 system using a specified encryption key, step 2024. RCST02 prepares the transmission pathway with RCST03 using the specified encryption key, steps 2026 and 2028.

RCST01 then decrypts the segment with the original key known to the originating system, then re-encrypts the segment with the key shared with RCST02 in step 2018. RCST01 then transmits the re-encrypted segment to RCST02, step 2034, and deletes, or retains, its copy of the segment according to the instructions or the retention specification, step 2040. RCST02 receives the segment from RCST01, decrypts it, then re-encrypts it with the originating system specified key exchanged with RCST03, as shown. RCST02 then transmits the re-encrypted segment to RCST03, step 2036, which receives and stores the segment for the specified retention period, step 2038, according to the instructions embedded with the transmitted segment metadata.

The segment is now stored with a specified encryption key known to the originating system on the RCST03 system corresponding to the new retrieval pattern. The originating system is now able to receive a request for the related ODO, step 2042, and then retrieve the ODO's segment from this, new, third RCST03 storage location that corresponds to the new retrieval pattern, steps 2046, 2048 and 2050.

This segment migration method in FIG. 20 allows the invention to execute migration patterns for data object segments that prevent, or make it more difficult for, an unauthorized accessor to access the data object segment in case they discover the first retrieval pattern. The method can migrate some segments of an ODO, and not others, and migrate different segments from the same ODO in different frequencies. In this way, the originating system can invalidate, and render obsolete and inoperable, a first retrieval pattern in response to an event which causes a migration of the segments stored on diverse storage resources, yet still be able to retrieve the segments with a new retrieval pattern after that migration.

The Reassembly Processor

The Reassembly Processor:

In one embodiment of the invention, when a retrieved data object segment, typically comprised of a binary bitstream, is identified, the system invokes the Reassembly Processor to restore the segment to its original state, so that it can be combined with other restored associated segments, to restore and recover the original data object. After retrieving a partial or a complete set of valid data object segments, the invention then reassembles the retrieved segments back into the original data object.

The Reassembly Processor reverses the actions of the Segment Processor to restore retrieved segments to the state they were in before being processed by the segment processor. In one embodiment, the Reassembly Processor reads the Obfuscation Pattern Permutation (OPP) from the Segment Management Record (SMR) to reverse the obfuscations of the reordered segments according to the OPP.

The reassembly processor processes the retrieved segment in the reverse manner of the obfuscation functions as performed by the Segment Processor according to the segment's or object's original OPP. In an embodiment previously disclosed in the description of the Pattern Permutation Processor above, the Reassembly Processor would reverse the obfuscation functions executed on the specified obfuscated segment when it decompresses the obfuscated segment with a TAR compression algorithm, decrypts the segment with a triple-DES multi-layer decryption using the encryption keys specified in the segment management record, rejects and deletes invalid bytes that have been inserted after every $10^{th}$ byte of the data object, and reverses a logical NOT performed on the entire data object by performing a complementary logical NOT on the entire data object.

In another embodiment, the OPP is so structured as to allow groups of segments originally processed into independently obfuscated "sections" to be restored and reassembled without the requirement for a sufficient amount of the segments to be retrieved, and their obfuscations reversed to enable reassembly of the entire ODO.

In one embodiment, the reassembly processor reads the segment ID of a retrieved segment and locates the Segment Management Record (SMR) associated with that segment ID. It then locates and reads the Object Management Record (OMR) associated with that SMR. The reassembly process uses the located SMR to determine how to reverse the obfuscation processes performed by the Segment Processor on the retrieved segment, as well as to determine the encryption keys, protocol formats, and other transmission attributes of the retrieved segments represented in the SMR's, as derived from the TPPs as disclosed herein. The reassembly processor executes algorithms to reverse obfuscations, restore the original order of reordered data object segments according to the functions and values specified by the OPP as recorded in the SMR and the OMR as disclosed herein. The reassembly processor invokes algorithms including, without limitation, those needed to decrypt, decompress, reverse logical operations, reorder segments back to their original order in the original data object, and reverse any other obfuscation processes as can be devised to be used in the object processor and segment processor for obfuscating segments and original data objects.

In another embodiment, the reassembly processor reads the object management record that contains, or otherwise acquires, the "seed values" and the "Pattern Function table" used to generate the pattern permutations used in the invention. The Reassembly Processor then invokes the Pattern Processor to recalculate the obfuscation, transmission, storage, and invalid data patterns used in the processing of the original data object. The Reassembly Processor then uses the results of the Pattern Processor to restore the retrieved segments, and the original data object, in lieu of the OMR and SMR's that contain specifications of the obfuscation, transmission, and invalid data performed on the original data object, and its segments, by the processors described herein.

Figure 7:
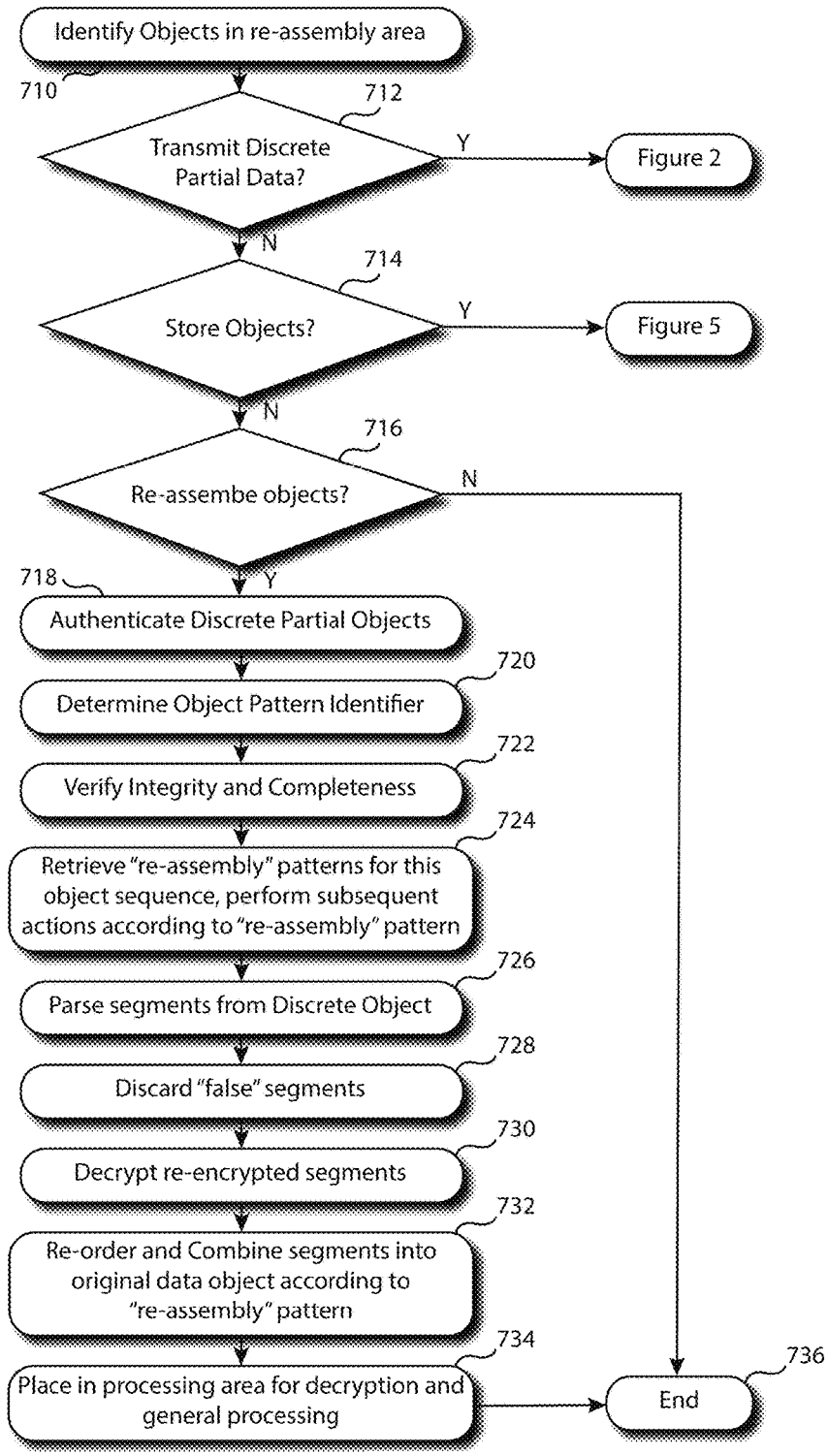

FIG. 7 summarizes the reassembly process according to another embodiment of the present invention. In step 710, the retrieving system identifies object segments in the reassembly area; in step 718. It authenticates the object segment in its queue, and in step 720, determines the object pattern identifier, which will allow it to retrieve the segment's OMR, SMR, OPP, and other pattern data that will be used by the Reassembly Processor to reassemble the ODO in step 724 and beyond. The process then verifies object segment integrity and completeness, in step 722, typically by using the hash digest stored in the SMR. It then retrieves the reassembly patterns for this object segment in step 724, as disclosed herein, in order to perform subsequent functions according to the reassembly pattern. In step 726, it parses segments, in step 728, discards invalid segments, in step 730, decrypts the re-encrypted segments, in step 732, reorders and combines segments into the original data order according to the reassembly patterns and SMR and OMR records. The STO, as disclosed herein, is used to ensure that the data object segments are assembled in the order corresponding to their original order in the original data object. In step 734, it places the reordered and decrypted segment in the processing area for object restoration and decryption and general processing.

Figure 17:
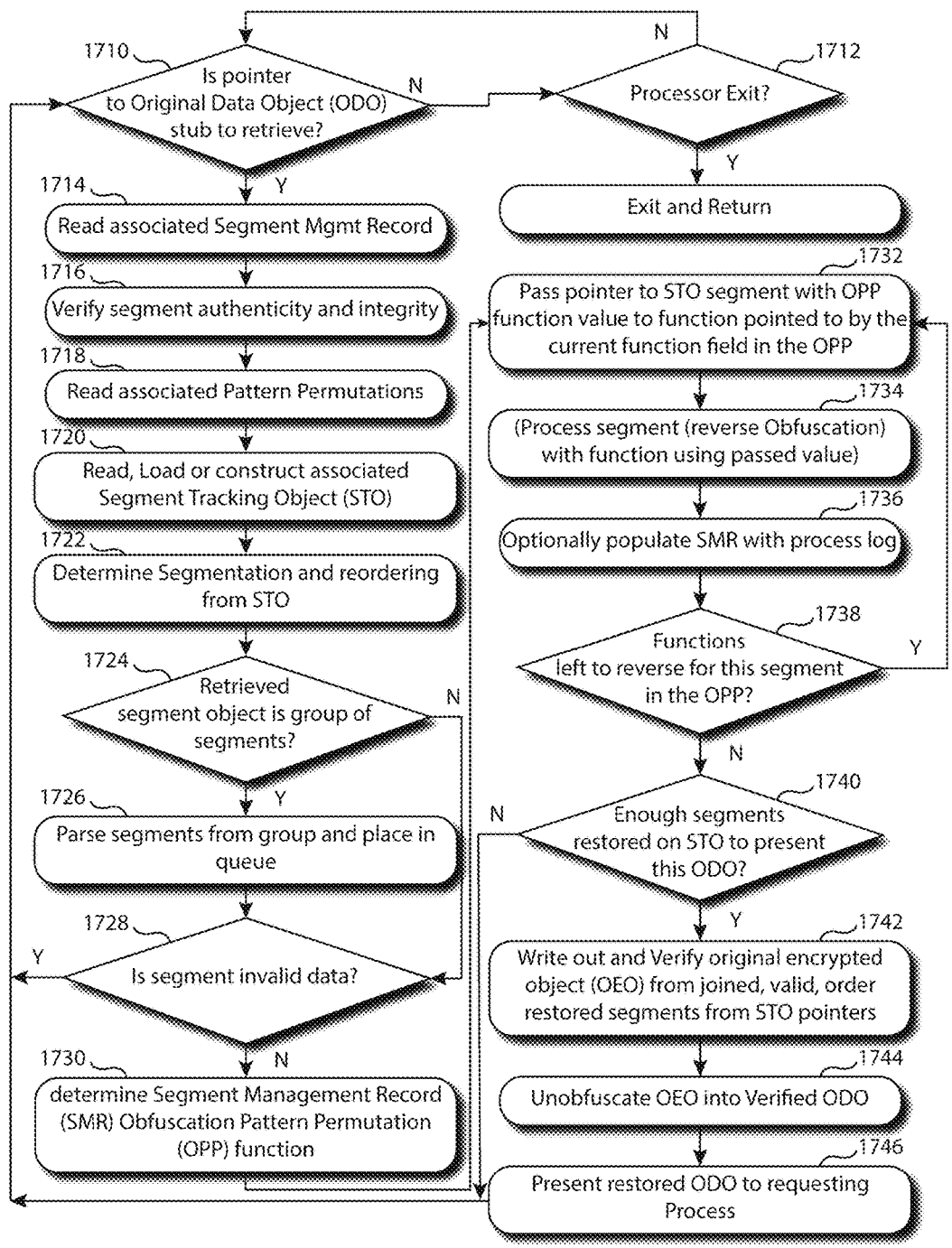
FIG. 17: A flowchart of the method in which a receiving system reassembles packaged and processed Segments and rejects Invalid Data to reassemble and restore an Original Data Object (ODO).

In another embodiment, as illustrated in FIG. 17, the Reassembly Processor senses a pointer to a retrieved segment in its processing queue, step 1710. It then accesses the Segment Management Record (SMR) for that object, step 1714. It then verifies the integrity and authenticity of the segment, step 1716, using the hash digest and other verification information in the SMR. It then locates and loads the associated pattern permutations that it will need to assemble the Original Data Object (ODO), step 1718, which is recorded from the segment and object Obfuscation Pattern Permutation (OPP).

In another embodiment, the segmenting pattern for the ODO may be determined during the reassembly process by recalculating the pattern permutation with original seed values in the pattern processor, read from the associated object management record in a different format than the STO, or may be located in a predetermined segmenting pattern from a library of segmenting patterns, or the like.

In this embodiment, the OMR contains the specification for the original ordination of the STO pointers before segment reordering, as well as the pointer ordination after reordering, including the position and lengths of the pointers to the invalid data of the Invalid Data Object (IDO). The Reassembly Processor then locates the Object Management Record (OMR) associated with the SMR and loads the Segment Tracking Object (STO) for this segment's object. It reads the Object Management Record (OMR) to restore the STO, step 1720, that contains the pointer ordination disclosing the reordering of the data object segments, and the location and lengths of inserted invalid data. The reassembly processor uses the STO to determine the original order of the data object segments, step 1722, by reading the original values of the pointer ordination in the STO prior to their re-ordering by the Segment Processor. It then determines if the retrieved segment is actually a combined group of segments from the ODO, step 1724. If the retrieved segment is a group of combined ODO segments, this processor parses the segment using the STO, marks the segment as parsed in the present copy of the STO, and reinserts the segment into the Reassembly Processor queue, step 1726, for further processing as individual segments. If the segment is not a group of segments, then this processor examines the STO to determine if the present segment is comprised of invalid data. If it is, the processor marks this segment as completed and invalid in the present copy of the STO, and returns it to the queue insertion sensing portion, step 1710, to get another, different, segment to process, in order to not process the present segment, and thereby reject it, step 1728. The Reassembly Processor uses the STO to track the position and length of the segments to reconstruct, reconstitute, and restore the original data object. The reassembly processor reads the segment ID of a retrieved segment, and refers to the pointers in the STO that state the first pre-reordered location in the original data object of the data of that retrieved segment.

For example, in the specific embodiment example used in disclosing the Segment Processor, if the STO specifies that the ODO is 1000 bytes long and was divided into 8 symmetric segments, then each segment in the original data object will be 125 bytes long, since 1000/8=125 bytes. The Reassembly Processor will use the odd numbered STO pointers, in their original numbering and ordination, to write out the original data object during the final stages of this process. In this example, according to the OMR, the STO pointer with the original ordination of #1 will point to the first 125 bytes of the original data object. Similarly, the STO segment pointer with original ordination of #3 will point to byte 126 of the original data object, the STO segment pointer with original ordination of #5 will point to original data object byte 251 (126+125) and so forth.

In this embodiment, the OPP had specified that the Segment Processor insert invalid data between every other segment of the original data object to further obfuscate the transmitted and stored segments. The Segment Processor invoked pointers in the STO structure to the IDO for the length specified in the OPP, which in this embodiment was 16 bytes of invalid data to be inserted from the IDO. The process numbered STO pointers to invalid data with even numbers in order to logically insert them between odd numbered STO pointers that point to valid contiguous segments in the original data object. In this embodiment, the reassembly process then ignores the locations and lengths of segment data pointed to by even numbered pointers in the STO structure, thereby ignoring the inserted invalid data with a "yes" decision in step 1728. The reassembly processor will output segment data pointed to by the odd numbered original ordination STO pointers in the ordination sequence, as presented by the STO, as representing the original data object prior to processing with the STO, to restore and reassemble the original data object in a manner that excludes inserted invalid data.

In the present embodiment, if the segment is not invalid data, the reassembly processor reads the Segment Management Record (SMR), step 1730, to establish the processing functions and the order in which the segments were obfuscated, reordered, had invalid data inserted, and the like, in order to reverse the actions performed on the segment in the reverse order in which they were performed by the Segment Processor in steps 1336 and 1338. The Reassembly Processor then passes the pointer, in the STO pointer structure pointing to the segment being processed, to the obfuscation function being pointed to by the reverse-ordered Obfuscation Pattern Permutation (OPP), step 1732, along with the function input value in the OPP that was generated from the original permutation calculation of the OPP by the Pattern Processor in step 1128. The segment pointed to by the STO pointer is then processed by the function pointed to by the OPP pointer field in a manner that reverses the original obfuscation by the function and restores the segment to its state prior to being processed by this function, step 1734. This processor then, optionally, writes out this obfuscation reversal event to a record in the SMR, step 1736, then determines if there remain, in the OPP for this segment, any more functions' obfuscations to reverse, step 1738. This loop in the Reassembly Processor continues to process this segment in this manner until all of the OPP's obfuscation processes recorded in the SMR are reversed for this segment. In this way, the segment obfuscation for each segment processed by the Reassembly Processor is reversed in the reverse order by which it was obfuscated, as specified in the OPP embodied in the SMR. The segment is then verified for integrity and left in place as pointed to by the STO.

The Reassembly Processor then determines if a sufficient amount of unobfuscated, valid data object segments have been restored to allow the reassembly of the ODO, step 1740. If not, the process returns to the insertion queue sensing portion, step 1710, to continue processing retrieved segments that are inserted into the queue. This processor repeats this obfuscation reversal on retrieved segments until there are a sufficient amount of restored segments to reassemble the ODO, as determined by the configuration for this instance of the invention. This amount can change depending on types of data restoration technologies used with the invention, such as the PAR system, that can restore missing elements of a data object. Without a data restoration technology configured into the invention instance, the Reassembly Processor will typically wait until all the segments associated to an ODO ID have been restored to their pre-obfuscation state, as entered into the Segment Processing queue in step 1310.

In the present embodiment, when the Reassembly Processor has completed unobfuscating and restoring segments of the data object according to a reversal of the Obfuscation Pattern Permutation (OPP), as represented in the OMR and SMR records, and when an amount of retrieved segments sufficient to reassemble the original data object have been restored, the Reassembly Processor then outputs the retrieved segments in the original order of the original data object as specified by the record of the pre-reordering ordination of the STO pointers that point only to the original data object valid segments and not to the IDO invalid segments, step 1742. The object output at this point should be the same as the Original Data Object (ODO) after it was processed by the Object Processor and prior to being processed by the Segment Processor.

It then determines if the output of combined and restored segments is the original data object that was output by the Object Processor to the Segment Processor. The ODO is verified in step 1742 against the post Object Processor obfuscation digest hash of the ODO, stored in the OMR in step 1224, prior to segmentation. If the output object is verified as the authentic original data object as processed by the Object processor, it is then passed to the decryption and compression algorithms specified in the OMR or OPP as those originally used to obfuscate the original data object, step 1744, so as to reverse the obfuscation actions performed on the original data object by the Object Processor. The Reassembly Processor then reverses the obfuscation of the ODO, step 1744, in a similar manner as to how it reversed the obfuscation of retrieved segments, namely by looping through the obfuscation functions and values in reverse order of the Object OPP, as recorded in the associated OMR. This unobfuscated ODO is then verified for integrity against the digest hash that was calculated against the ODO before obfuscation, and recorded in the OMR in step 1220.

In another embodiment, the Reassembly Processor reads the obfuscation pattern permutation (OPP) as recorded in the OMR. It then executes algorithms with, and on, the reordered original data object to reverse the functions and values in the reverse order as performed by the Object Processor, as specified by the OMR. If the OMR specifies that the original data object was compressed using a specific algorithm, the Reassembly Processor will decompress the restored original data object using the same algorithm. Various compression methods may be used, and are well known. If the OMR specifies that the original data object was encrypted using a certain algorithm, the Reassembly Processor will decrypt the original data object using that same algorithm, and using the encryption keys stored in the OMR. The data object may be decrypted one or more times according to the encryption layer specification of the OMR.

In this embodiment, the data object is decrypted using a private key of an asymmetric duel key system, as is commonly known to those skilled in the art of encrypting data. Other obfuscation methods and functions are reversed on the data object by the Reassembly Processor, as specified by the OPP in the OMR. These can include, without limitation, further decompression or decryption using the same or other compression and encryption algorithms, removing invalid data at various locations in the object, determined by the invalid data pattern as recorded in the OMR, reversing logical operations such as an XOR or NOT logical operation on the data object or a portion thereof, or reversing other obfuscation processing as may be devised. In one embodiment, previously disclosed, the OPP specifies that the object is to be decompressed with a TAR compression algorithm, decrypted with a triple-DES multi-layer encryption with the keys specified in the OMR, that invalid bytes will be removed from the original data object after every $10^{th}$ byte of the data object, and that a logical NOT will be performed on the entire restored original data object to reverse a prior logical NOT performed on the original data object.

The unobfuscated ODO is then verified against a hash of the unobfuscated ODO as stored in the OMR, step 1744, to determine if it is an accurate restoration of the ODO. It uses the hash and digital signature verification values from the OMR to verify the integrity of the output object and its authenticity as the original data object. If the verification is successful, the reassembled ODO is then presented as the ODO to the process that originally requested the ODO, step 1746. The reassembling system can then retain or delete the OMR, SMR, retrieved segments, diverse permutation patterns, transmission Pathway data, and the like, according to the data retention parameters in the system configuration. As long as this retrieval and reassembly metadata persists in storage, and the segments persist in storage on the RCST systems, the ODO and its segments can continue to be retrieved and reassembled by any system with access to the metadata.

Figure 19:
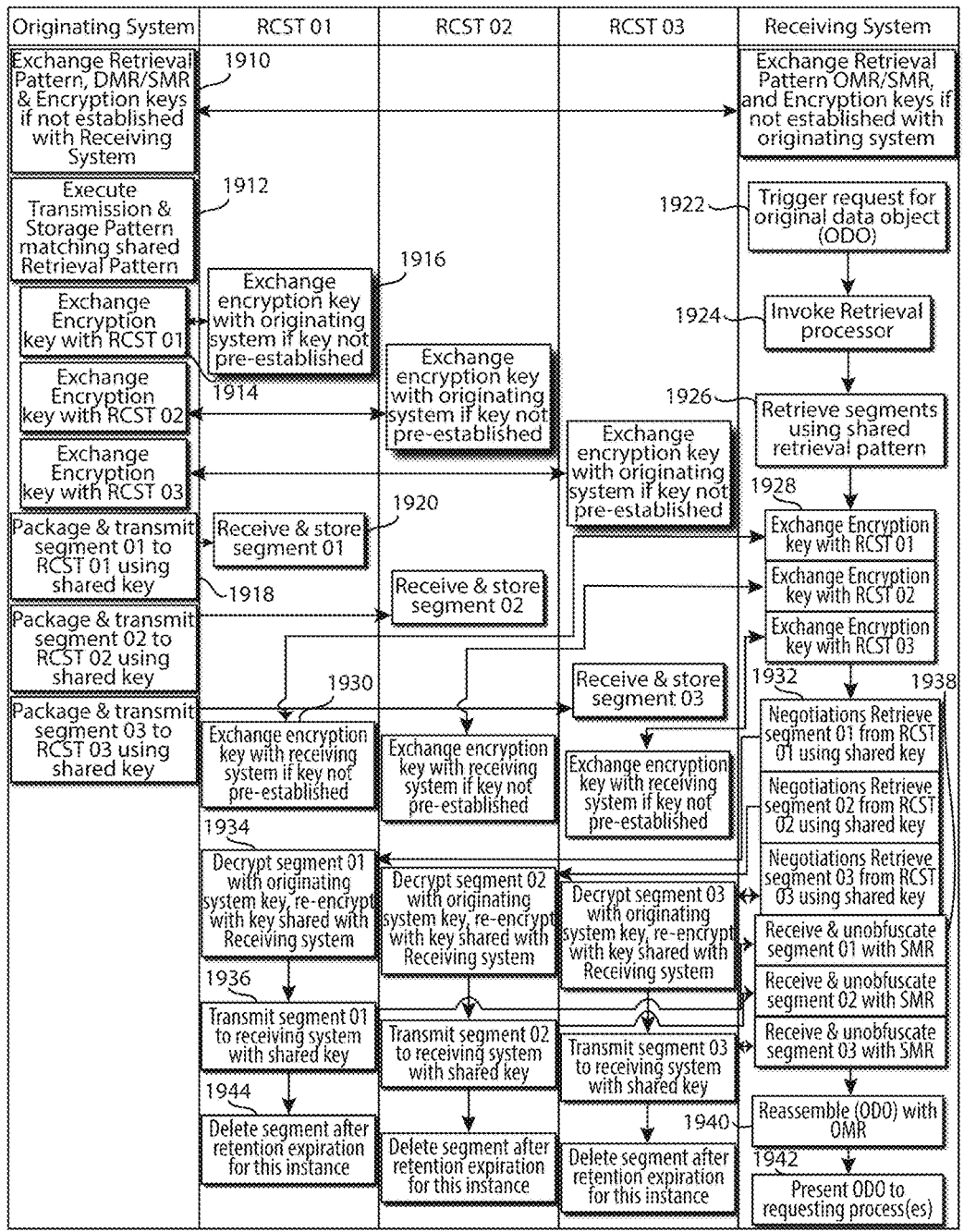
FIG. 19: A flowchart of the method by which an Originating System synchronizes and communicates an ODO with one or more receiving systems.

Original Data Object Synchronization and Communication Between Systems: In another embodiment, the invention is used as a system and method to communicate data from an originating system to one of more receiving systems or devices, as in a file synchronization system, or as in a data object publishing or communications system. In one embodiment, the originating system obfuscates the ODO, segments the ODO, reorders its segments, obfuscates its segments, packages its segments, performs other processes as disclosed herein, and transmits its segments to RCST systems as disclosed herein. The originating system, as illustrated in FIG. 19, uses a transmission and storage pattern permutation which transmits and stores the segments, as disclosed herein, to storage locations and secure access areas that correspond to the retrieval pattern on another receiving system which allows the receiving system to retrieve and reassemble the ODO.

In another embodiment, if an originating system, and one or more separate receiving systems, has not already shared a Retrieval Pattern and OMR and SMR records, the originating system communicates to one or more receiving systems the retrieval and reassembly metadata required to retrieve and reassemble the segments of the ODO being communicated or synchronized. This retrieval metadata consists of the OMR and SMR records, encryption keys, and the Retrieval Patterns for the transmitted and stored ODO segments. The originating system can exchange and share this retrieval metadata with the receiving system by using a secure communication method including, without limitation, encrypted email, a virtual private network, physical delivery on removable media, printed representation of the Records and Patterns, such as a QR code, stenographic representations, and the like, step 1910. The receiving system will later use the shared retrieval metadata to retrieve, restore, and reassemble the original data object, thereby gaining authorized access to the ODO on a device or system other than the originating system.

In this embodiment, the originating system executes a transmission and storage pattern that will transmit and store copies of the segments of a communicated ODO into storage locations that correspond to the retrieval pattern of the receiving system, step 1912. In the present embodiment, the originating system determines a transmission and storage pattern that corresponds to the receiving system's retrieval pattern, and builds a transmission pathway with 3 RCST systems, specified as RCST 01, RCST 02, and RCST 03 in the example embodiment in FIG. 19. If the originating system does not already have an encryption key for secure transmission, or other secure transmission method, established with one or more of the RCST systems in the transmission and storage pathway, it exchanges encryption keys with any such system, steps 1914 and 1916. The originating system then packages an encrypted segment, or segment grouping, from the ODO being communicated, and securely transmits it, step 1918, to the RCST storage system corresponding to that segment, which the RCST storage system receives and stores, step 1920. The segments from the same ODO are now stored separately in secure access areas and in separate storage locations, which greatly increases the effort necessary for an unauthorized accessor to collect enough segments to reassemble the ODO.

Next in this embodiment, the receiving system triggers, typically by one of the events suggested herein for initiating the retrieval of an ODO, a request for the ODO whose segments were transmitted and stored onto the RCST systems corresponding to the receiving system's retrieval pattern, step 1922.

The receiving system then invokes an instance of the Retrieval Processor, step 1924, for the purpose of retrieving the segments for the requested ODO. The Retrieval Processor on the receiving machine then reads and determines the retrieval metadata required to retrieve the ODO's segments as shown in steps 1614 through 1624. The retrieval Processor enters the retrieval portion of its process, step 1926, where it executes the retrieval process as disclosed in steps 1626 through 1640 in FIG. 16. When determining the Retrieval Pattern for the segments, the receiving system determines if it has already established secure transmission with any of the RCST systems from which it will retrieve ODO segments or segment groupings. If it has, it will use that secure transmission method to retrieve the segment until it expires. If it has not, it will establish secure transmissions with the identified RCST system, as disclosed herein. In this embodiment, the receiving system exchanges asymmetric encryption keys for secure transmission with the three RCST systems storing the identified ODO segments or segment groupings, steps 1928 and 1930.

After establishing secure transmission with the RCST system, including using diverse transmission media and protocols, as disclosed herein, the receiving system negotiates the retrieval of a segment, or segment grouping, from the corresponding RCST system, as specified in its Retrieval Pattern, step 1932. Upon successful retrieval negotiation, the RCST systems will decrypt the ODO segment, or segment grouping, with the key shared with the originating system from which it received the segment or segment grouping, or decrypt it with a key shared with another RCST system with which it autonomously prepared a transmission pathway, then re-encrypt the segment with the key shared with the receiving system requesting retrieval of the segment or segment grouping, step 1934. The RCST system then securely transmits the re-encrypted segment, or segment grouping, to the requesting receiving system, step 1936, as the receiving system executes step 1636, as shown also in step 1938. The receiving system then executes step 1640 to place the segment onto the reassembly queue for its instance of the Reassembly Processor. When an amount of segments and segment groupings sufficient to reassemble the ODO, as determined by the system configuration, have been retrieved by the receiving system, the receiving system reassembles the ODO, step 1940, per the Reassembly Processor method, as shown in FIG. 17. After successful reassembly, the receiving system presents the ODO to one or more other processes, step 1942, typically the process that triggered the request in step 1922.

In another embodiment, the originating system securely shares, as previously described, with one or more receiving systems, only the seed values for the pattern processor, the Pattern Functions Table, and any required encryption keys, so that the receiving system can use its instance of the Pattern Processor, as shown in FIG. 11, to independently generate the Obfuscation, Invalid Data, Transmission and Storage, and Retrieval Patterns required to retrieve and reassemble the ODO from the RCST systems. In this other embodiment, the receiving system, or systems, invokes the Pattern Processor to generate the patterns used for retrieval of segments and their groupings, and uses them to retrieve, restore, and reassemble the original data object, as disclosed herein. If the receiving systems have prior knowledge of the "Pattern Functions Table" and other pattern generating metadata used by the originating system to calculate the Pattern Permutations according to the methods disclosed herein, it is not necessary to securely share it with them. If the receiving systems do not have prior knowledge of the Pattern Functions Table and the other pattern generating metadata, the originating system can securely communicate it to them at the same time it securely communicates the permutation seed values, or at a different time, over different transmission media, in different protocol formats, or using a different method than the originating system uses to share the seed values with the receiving systems.

In another embodiment, the originating system has previously shared or learned an obfuscation pattern, a retrieval pattern, associated encryption keys, and other required retrieval and reassembly metadata already known to the receiving system before the transmission of segmented ODO data. In this embodiment, the originating system does not generate Obfuscation and Retrieval patterns at the time of processing an ODO, but uses those patterns as shared with the one or more receiving systems in those parts of the invention that use those patterns and other retrieval and reassembly metadata as disclosed herein, such as step 1214, step 1314, step 1316, step 1318, step 1418, and step 1420, for example. Pre-establishing, across two or more systems, the retrieval and reassembly metadata specific to the invention, increases the difficulty of access to Original Data Objects by unauthorized accessors since they are not able to capture that metadata during the exchange process.

In another embodiment of the invention, a receiving system can securely publish, to other systems, obfuscation, retrieval, and reassembly patterns, including SMR and OMR records, to which those other instances of the invention can transmit ODO segments as disclosed herein. The receiving system can poll the storage locations specified in the published retrieval pattern for segments transmitted by other systems intended to be retrieved by the receiving system. The receiving system can then retrieve those segments using the published patterns per the method disclosed in FIG. 19. This allows for secure "pushed" transmission of data objects between instances of the invention, thereby performing many functions of conventional email and file synchronization systems.

The methods disclosed herein, including, without limitation, the obfuscation, transmission, and retrieval and reassembly methods, can be used, in various embodiments of the invention, to synchronize information across diverse devices and systems, including, without limitation, computers, smart phones, tablets, data storage systems, network servers, remote sensors, video cameras, and the like. These communication methods can be used by different systems to securely communicate information between users, systems, applications, networks, devices, and the like. These transmission methods can be used by different systems to securely simulate the transmission processes of other communication applications, including, without limitation, email, texting, SMS, MMS, and audio or voice communications.

Security and authenticity is desirable when transmitting data over public networks such as the Internet. The embodiments disclosed below provide a system, method, device, and its software, for protecting the confidentiality and integrity of data transmitted on a public network, as well as preventing the "hacking" of network nodes and network connected devices that communicate over a public network through a network gateway.

A purpose and benefit of these embodiments of the invention is to prevent unauthorized entities from communicating with or hacking into a network node, to authenticate network communications between entities, and to obfuscate messaging content in transit on a network carrier. The invention controls the content and addressing of certain packets on a network carrier. It is implemented as a stand-alone dedicated packet transformation and routing device, and can also be implemented as software in a computing device.

Pattern-specified transformative packet switching between independent networks: In one embodiment, an RCST component of the invention transmits and receives packets between two separate and independent networks according to transmission and obfuscation pattern permutations herein disclosed.

In this embodiment, the RCST system will only accept packets on a first network that are transmitted or obfuscated in one or more specific patterns related to one or more nodes on a second network, process them to transform them into specific formats according to pattern permutations associated with the node on a second network, then transmit them to that node on the second network. In this embodiment of the invention, for the first network to communicate packets to a specific node on the second network, the packets must be transmitted on the first network in a specific pre-arranged transmission or obfuscation pattern. For example, the packets must be transmitted with a specific packet ordination and addressing pattern to the RCST system, which will confirm compliance with the pre-arranged pattern, or set of pattern permutations, confirm the destination node for the packets on the second network based on the patterns, transform the packets into a format that is expected by the node at the destination address on the second network, then transmit the re-formatted packets to the destination node on the second network.

This embodiment provides the benefit that the nodes on a private network do not have a one to one correspondence with a private and public network address and, so, cannot be communicated with from the public network, or another private network, unless the communicating node knows the pattern by which the address pattern gateway expects to receive the sequence of content spread over multiple differently and unpredictably addressed network packets.

In this embodiment, the RCST system acts as a filtering, obfuscating and de-obfuscating network switch and gateway that verifies, transforms, and transmits network packets according to the various pattern permutations herein disclosed between two or more network nodes on separate, independent networks.

In this embodiment, when the RCST receives packets from a second independent network, and transmits an obfuscated version of those packets onto a first independent network, it obfuscates, segments, and distributes the contents of each of the packets transmitted by the originating second network node into multiple diverse packets, and assigns to these diverse packets multiple network addresses that the RCST has registered on the first network. The processing of a second network node's single packet into multiple first network packets is executed according to a permutation of a pattern of functions that is intended to make the obfuscated packet very difficult to restore to its original form without knowledge of the pattern of functions. This varying pattern of obfuscation functions includes, without limitation, segmentation, encryption, bit transformation, invalid data insertion, segment reordering, segment grouping, and multivariate destination and source address assignment.

When the RCST receives and processes packets from a first network to be transmitted onto a second network according to pattern permutations, it receives packets from a first network, analyzes those packets according to their transmission and obfuscation patterns so as to transform their contents and change their addressing to a destination address that correlates to those patterns, and transmits them to that specific address on an independent second network.

Types of Patterns Used in this Embodiment:

The function patterns used by the invention to changeably segment, obfuscate, assign addresses, transmit, and receive the packets can be determined in various ways, including, without limitation, using pre-calculated patterns from a database of patterns, patterns embedded into the device at the time of manufacture, patterns shared from another instance of the invention, patterns input by a user or system, or patterns derived from offsets to tables of pattern permutations. This disclosure will generally refer to patterns derived from offsets to tables of pattern permutations, but other types of patterns could also be used.

The RCST uses, among others, as disclosed above, these types of patterns to execute the functions disclosed in this embodiment:

1. Packet Segmenting—This is the set of parameters specifying how a packet will be segmented into smaller sections including, without limitation, the number of segments, length of segments, how short segments will be padded, and how the segments will be ordered, re-ordered, and grouped into the multiple first private network packets.

2. Segment Obfuscation—This is the set of pointers to functions and their input values that specify how the packet segments will be obfuscated when packaged as first network packets. The obfuscation pattern permutation can include or exclude any identified function, and provide a specific input value from a range of values, as previously disclosed.

Obfuscation functions that can be included in an obfuscation pattern permutation table include without limitation a first encryption method, a first encryption key, a second encryption method, a second encryption key, a flag indicating a logical NOT is applied to the packet segment, a flag and mask value indicating that the mask value will be applied to the packet segment with a logical XOR, where invalid data will be inserted into the segments, and other methods of obfuscating data that are well know to those skilled in the art of obfuscating data.

3. Packet Transmission—This pattern includes, without limitation, the set of values that specify how many multiple first network packets will be used to transmit the segments from an original second network packet, which source addresses will be assigned to the multiple packets from a list of addresses registered by the invention on the first network, which destination addresses will be assigned to the multiple packets from a list of addresses associated to the receiving node's available addresses, what combination of source and destination addressing will be used on which first network packet, the order in which the first network packets will be transmitted, and what time delays will be used between transmission of first network packets.

4. Packet Reception—This pattern specifies the addressing, order, and timing patterns to which the packets received by the RCST must correspond. If the received packets do not correspond to this packet reception pattern within a configurable tolerance, they will be ignored by the RCST, and not transformed and transmitted onto the second network, thereby assuring that this instance of the invention is receiving authentic and valid first network packets instead of non-authentic packets from an unauthorized source, such as in a man-in-the-middle attack, for example. The packet reception pattern is generally the inverse of the packet transmission pattern used by the transmitting computer.

The packets are transmitted over the network using multiple network addresses. They can be transmitted in such a manner that the content is "out of order" from the original order of the packet segments. The receiving computer analyzes the packets as they are received to verify that they are being transmitted over multiple addresses, protocols, and time intervals so as to conform to the synchronized transmission pattern of the transmitting network node.

The receiving or requesting network node then parses the packets received over diverse network addresses and reassembles, reorders, decrypts, and removes false data from the packets so as to reconstitute the packet content from the original first transmitting network node. It then sends the reconstituted and reassembled packet to a second network node on a different network address.

An example would be if a first network node transmits a packet from its non-routable address of 10.10.10.99 to the RCST, which then transforms the content of the packet into multiple segments with various methods of obfuscation, disclosed above, applied to them, such as segmenting the original content in 15 segments, reordering the segments, encrypting the segments with different encryption keys and algorithms, inserting false data into the content, and the like. These 15 segments are then reordered, packaged in 12 packets which are transmitted using multiple addresses registered by the receiving or requesting node, and over varying time intervals, such as the 12th segment being transmitted first to the address 176.145.64.23:354, and the 5th packet being transmitted to address 176.145.64.23:608, followed in one half of a second by the 11th segment being transmitted to the address 176.145.64.45:455, and so forth.

The invention provides high levels of information security when a random number, or a pseudo random number, is used to specify the pattern calculated as an offset of a pattern permutation table. Because the pattern permutation using this method rarely, if ever, repeats, this allows the invention, and its corresponding instances, to communicate in a highly unpredictable manner that is not subject to simple pattern analysis.

Figure 32:
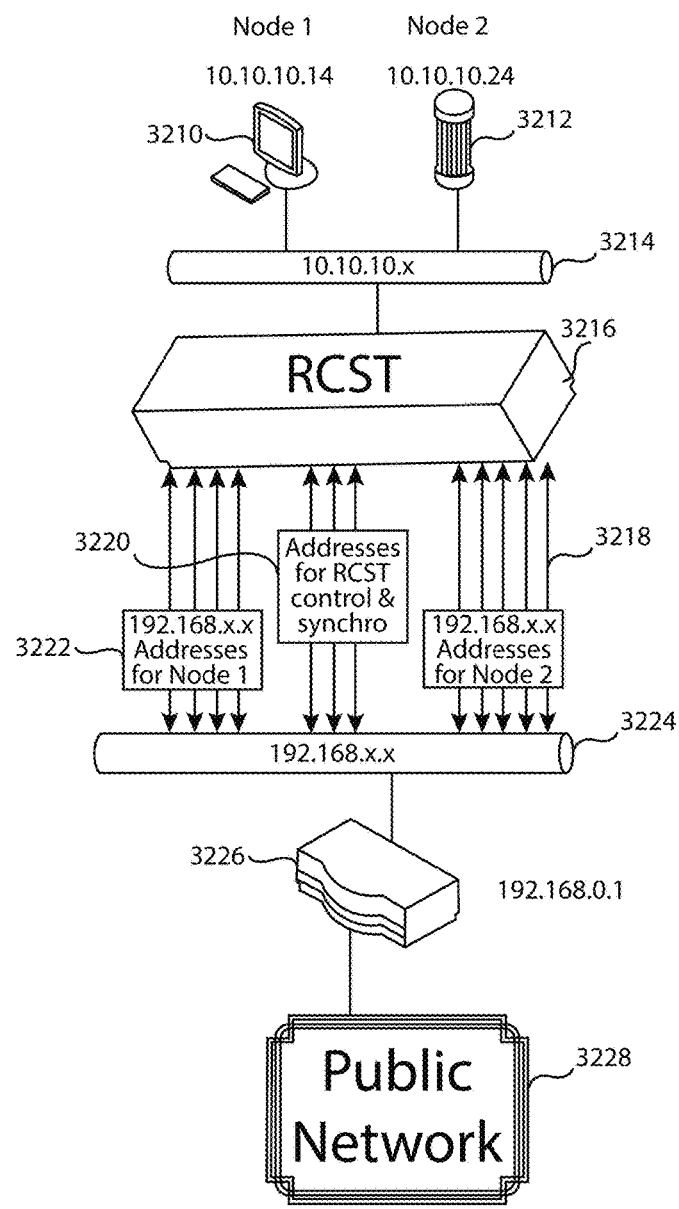
FIG. 32: An embodiment of an RCST connected to two separate LAN's where the RCST is connected to a public network routable first LAN with multiple node addresses that, according to an Address Synchronization Table, exemplified by the embodiment in FIG. 29, are allocated to distribute obfuscated packet content from a specified node on a separate LAN to which the RCST is also connected, and on which the RCST registers only one address.

An RCST as an obfuscating gateway between two networks: In this embodiment of the invention, as illustrated in FIG. 32, an RCST system (3216) is configured to have independent connections to two or more separate independent networks so that it is able to send and receive packets, separately, on these separate independent networks. The RCST independently registers an address on a first private, separate, independent network (3224) and a second private, separate, independent network (3214). In this embodiment, the RCST registers an address on the second network by obtaining a network address from that network's DHCP server, and providing a Media Access Control (MAC) address to any Address Resolution Protocol (ARP) requests. The RCST also registers multiple addresses (3218, 3220, and 3222) on a first separate and independent network through a separate network interface means, such as a separate physical Network Interface Card (NIC). The RCST registers a number of network addresses, for example 5 addresses (3218), on the first separate independent network, by composing and presenting that number, for example 5 MAC addresses to the first network's Dynamic Host Configuration Protocol (DHCP) server. The RCST thereby obtains a network address on the first network for each MAC address that it composes, and presents to the first network's DHCP server.

The RCST registers multiple addresses on a first network in order to associate a set of first network addresses to a specific second network node (3210 or 3212). The RCST distributes obfuscated segments of each packet from a second network node across multiple new packets it creates for that purpose, then addresses those new packets with the multiple addresses registered on the first private network that are associated with the second network node that originated the segmented packet. The RCST then transmits the new packets onto the first network for further processing by the nodes at the packets' destination addresses.

The RCST maintains a table, as illustrated in FIG. 29, that assigns a specific address of a second network node (3212), for example 10.10.10.24 (2916) to a set of multiple routing addresses on the first network (also 2916), which will be used to contain and transmit the obfuscated packet segments only from that specific second network node (3212). The invention's RCST system segments, obfuscates, reorders, and intersperses with false data, according to an Obfuscation Pattern Permutation (OPP), the packets from a specific second private network address (2916 and 2912), and inserts those obfuscated segments into the payloads of packets addressed with the multiple addresses registered on the first private network that are specifically assigned to a second network address (2916 and 2912), and transmits those addressed packets onto the first network. Those packets, with specifically assigned multiple first network addresses that contain destination addresses on a public network, will be processed by the NAT function on the first network router (3226) to have routable source addresses specific to each first network address. It will then route those translated packets onto the public network (3228), where they will be received by a second instance of the invention's RCST system on another network, or another system that can process pattern permutations, at the packets' destination addresses. Those routable addresses that are specifically assigned to multiple first network addresses will be recognized by the second RCST system on another network as the specific addresses associated with a synchronized transmission pattern specific to a transmitting first RCST device which is transmitting the obfuscated packet from a node at the specific second private network address.

The first RCST segments, reorders, obfuscates, and groups segments from a second network node's packet according to an OPP. It registers multiple addresses on the first network, in part, so that it will be able to transmit those obfuscated segments onto the first network distributed across multiple first network packets with the first network addresses associated to the originating second network node. The first RCST distributes and addresses the obfuscated segments, and segment groupings, from the second network node's packet across the multiple first network packets using a transmission pattern permutation derived from a Transmission Pattern Permutation table, as previously disclosed.

The RCST (3216) transforms the packet originally transmitted onto the second network into obfuscated multiple, differently addressed, packets containing obfuscated segments, and segment groupings, by treating the second network packet as a data object, and submitting it to the Object Processor, as shown in FIG. 12, and subsequently submitting the segments to the Data Object Segment Processor, as shown in FIG. 13. The resulting obfuscated segments are submitted to the Transmission Package Processor shown in FIG. 14, which returns first network packets that are transmitted onto the first network by the RCST.

In this embodiment, the first private network has a router node (3226) with a network address translation table that is capable of routing private network packets onto a public network such as the Internet (3228). The second private network (3214) does not have a router node that can route packets onto a public network, but this is not a requirement. The RCST transmits packets between nodes on the first and second networks, as well as onto the first network, for routing onto a public network. However, the RCST only transforms and transmits packets from the first private network to the second private networks when it verifies that the packets conform to changing, complex patterns of ordination, addressing, transmission patterns, and content segmentation or obfuscation, that have been assigned to a specific second network node. These patterns can be specified by a number of methods, but are typically specified by offsets of pattern permutation tables as disclosed above. This allows the RCST to enforce the isolation of the second private network from the first network since no packets from the first network will be transmitted by the RCST to a second network node if they do not conform to complex patterns assigned to that second network node.

In this embodiment, the second network (3214) is isolated from the first network (3224), but a second network packet's contents are routable on a public network (3228) after transformation by the RCST into multiple first network packets with first network addresses (3222 and 3218). The first network is not programmed, configured, or otherwise able to dispense, assign, route, access, read, transmit to, or from, or recognize the network addresses on the second network. This isolates the second network and prevents it from directly communicating with the public network through the first network's gateway router node (3226), even using Network Address Translation (NAT) functions. Since the first network does not recognize the second network, its router node cannot create network address translation entries in its NAT table for the second network nodes (3210 and 3212), which prevents a node on the public network, or the first network, from communicating with, or even recognizing, the existence of the second network and its nodes.

The only way for a node on the public or first networks to communicate with a node on the second network is by transmitting packets in a manner that conforms to the pattern permutation associated by the RCST acting as a gateway switch to that second network node. The only way for a second network node to communicate with a node on the first or public networks is to have the RCST transform its packets into a pattern permutation expected by a node on the public or first networks that is capable of processing the second network node's associated pattern permutations. In this way, nodes on the second network are protected from hacking or exploitation by any node on the first or public networks that is not synchronized to the pattern permutations associated with that second network node.

In this embodiment, the first and second network use non-routable addresses, so they are considered "private" networks. The RCST will transmit packets from the second private network after transforming their format, and addressing, according to pattern permutations. The RCST (3216), which is connected to, and registered on, both the first and second private networks (3224 and 3214, respectively), performs this function by segmenting and obfuscating packets from the second private network, and their content payloads, into multiple packets, addressing those multiple packets with addresses that the RCST has registered on the first private network (3222 and 3218), and transmitting those packets onto the first private network (3224). The first private network gateway router (3226) then receives these packets, determines if their destination addresses are on the public network (3228), and, if so, translates their first private network source addresses into public network routable source addresses, and transmits them onto the public network. In this way, the second private network remains isolated from the first private network, but is still able to transmit packets onto the public network that are transformed and obfuscated according to a set of pattern permutations and contain translated source addresses corresponding to the addresses that the RCST has registered on the first private network.

The RCST system in this embodiment is not transforming and transmitting packets from the second network to the first network as a simple NAT function, but transforming and obfuscating the content of the original second network packet in such a way as to obfuscate the segmented packet's content distribution across other packets, source and destination addressing, and origin of the packet contents, which will make them more secure and private on the first network, and on the public network. A NAT function typically just translates a packet's source address from a private network address to a public network address, which is a far simpler functionality than that performed by the RCST. In contrast, the RCST component of the invention segments, reorders, obfuscates, and groups the contents of each second network packet into multiple packets addressed with corresponding first network addresses associated with a second network node according to pattern permutations also associated with that second network node, before transmitting them onto the separate first private network.

Embodiment as an Obfuscating Filtering Gateway Between a LAN and a Private VLAN: In another embodiment, the RCST (3216) is separately connected to a first and second network as disclosed in the previous embodiment. In this embodiment, the second network (3214) is configured as an IEEE 802.1Q compliant Private Virtual Local Area Network (PVLAN). The RCST connection to the second network PVLAN is configured as a Promiscuous Port on the second network PVLAN, and the second network nodes (3210 and 3212) are configured as nodes connected to PVLAN Isolated Ports. The RCST system's Promiscuous Port is configured as the uplink for these Isolated Ports.

This embodiment allows the PVLAN nodes (3210 and 3212) to communicate with the first network (3224), and the public network (3228), through the RCST, as disclosed in the previous embodiment, and also guarantees that they will remain isolated from other nodes on the second network, as well as other network devices, such as switches and routers that are attached to the second network.

Figure 33:
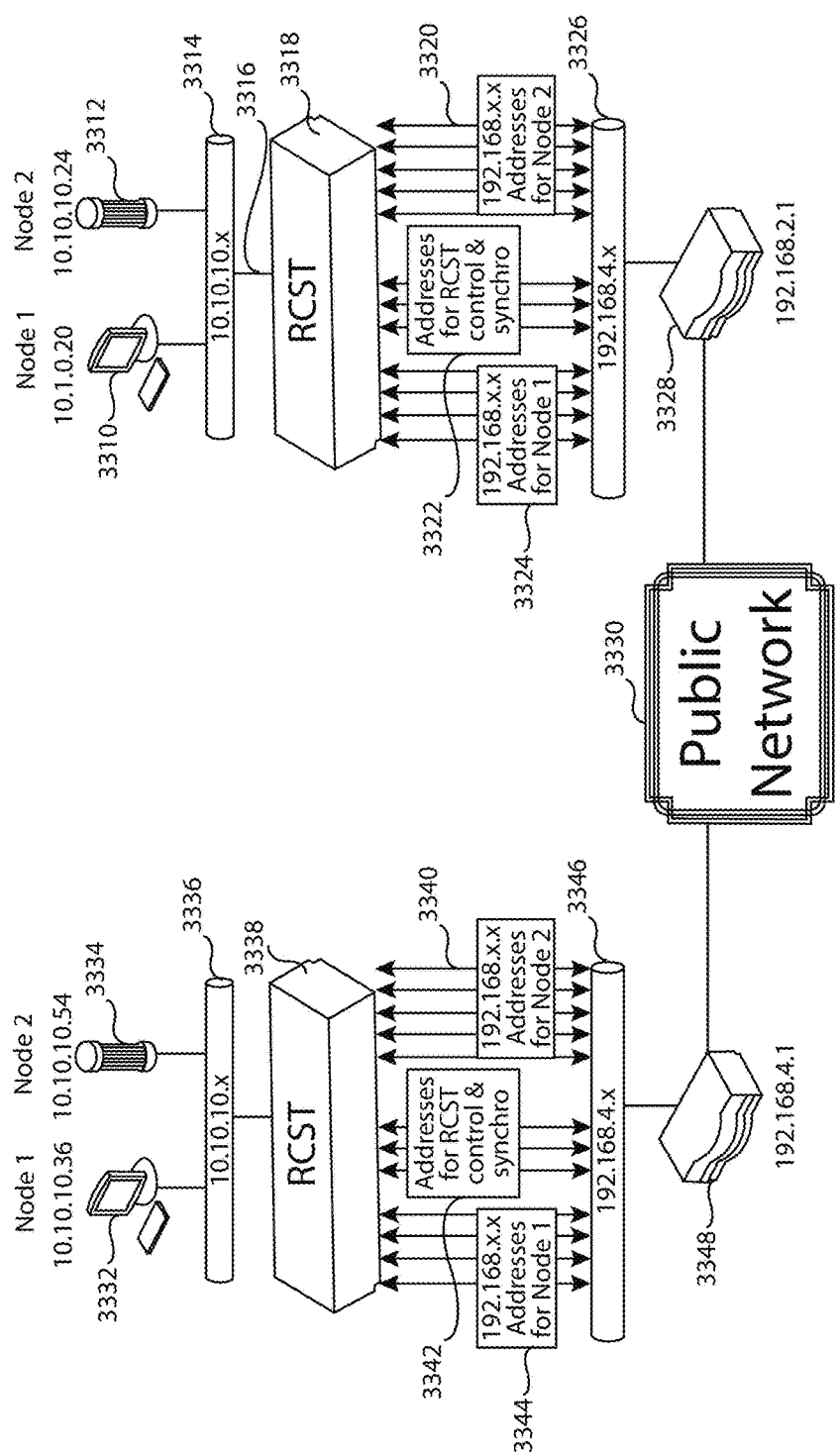
FIG. 33: An embodiment of two pairs of LANs that transmit and receive packets over a public network, each LAN with an RCST connected to a public network routable first LAN with multiple node addresses that, according to an Address Synchronization Table, exemplified by the embodiment in FIG. 29, are allocated to distribute obfuscated packet content from a specified node on a separate LAN to which the RCST is also connected, and on which the RCST registers only one address.

Synchronized RCST's Using Addressing Permutations Across a Public Network: In another embodiment, as illustrated in FIG. 33, a first RCST (3318) connects to a first separate and independent network (3326), and registers multiple addresses on the first network (3320,3322, and 3324), while also connecting to a second separate and independent network (3314), and registers a network address on the connection to that network (3316).

A second. RCST (3338) connects to a third separate and independent network (3346) by registering multiple addresses (3340, 3342, and 3344) on the third network in the same manner in which the first RCST connected to the first network, as disclosed above, while also connecting to a fourth separate and independent network (3336), and registering an address on the fourth network in the same manner in which the first RCST connected to the second network as disclosed above. In this embodiment, the first and third networks, on which the first and second RCST's have respectively registered multiple network addresses, are able to route packets onto a fifth network (3330), such as the Internet, using routers 3328 and 3348, respectively), thereby connecting their networks to the fifth network. The routers on the first and third networks route the packets from their respective networks onto the fifth network by translating the non-routable source addressing in the packets on their respective networks into a routable address that can be routed on the fifth network. This allows the first and second RCST's to transmit and receive packets with each other. The translation of non-routable to routable addressing is typically done using a Network Address Translation table function in the routers on the first and third networks, or other means that will be well known to those skilled in the art of routing packets on networks. The two instances of the RCST begin synchronizing their communications by sending each other a message on each of the multiple registered addresses on their respective networks that they will allocate to communications relating to a specific network node, thereby conveying the values and quantity of the routable addresses allocated to communicating obfuscated packets between specific network nodes in the source address fields of the multiple routable packets into which the obfuscated packets have been segmented and distributed.

In other embodiments, the RCST instances could connect separately to more than two separate networks, and perform the same functions disclosed in this embodiment on more than two separate networks.

In the present embodiment, the first RCST transmits and receives obfuscated packets with the second RCST using unpredictable patterns of source and destination addressing that each RCST device independently synchronizes by a means disclosed below. The second RCST synchronizes its addressing pattern permutations with the first RCST in order to verify the authenticity of the received packets through conformance to the synchronized addressing pattern permutations. If the received packets conform to the addressing patterns, the second RCST restores the verified packets to their original format by reversing a synchronized obfuscation pattern, and either transmits the resulting restored packets to a destination node on another network to which it is connected, or uses them for an internal process.

When the first RCST transmits packets to the synchronized second RCST, it does so in accordance with a changeable pattern of network address assignment functions disclosed below. The first RCST assigns some of its registered first network addresses to communications with the second RCST, as shown in FIG. 29, row set 2910 and 2912. These assigned addresses are the addresses used to populate the source and destination fields of the routable packets according to the transmission addressing pattern permutations that are sent between the RCST's.

When a node (3312) on the second network (3314) transmits a packet to a node (3332) on the fourth network (3336), the first RCST obfuscates the packet according to an Obfuscation Pattern permutation, and packages the obfuscated packet contents into multiple first network packets. The first RCST transmits these obfuscated multiple packets with first network source addresses (2912) onto the first network according to a pattern of transmission addressing pattern permutations that specify addressing, packet sequences, transmission timings, and packet ordination. Those packets that have public network destination addresses (2910) are consequently transmitted onto the public network by the first private network's router, typically using a NAT table, so that the original packets contents arrive at a public network address in an obfuscated, unpredictable, and secure manner.

The segmented and obfuscated packets are typically received by a corresponding second RCST that is implemented either at the destination public network address, or an address on another private network, or as a node on the first private network herein disclosed. This corresponding receiving RCST can be implemented as a dedicated network switch gateway device, or embedded into another device that performs other data processing functions. This corresponding receiving RCST has synchronized to the pattern of functions that the transmitting RCST used to obfuscate, address, and transmit the packets. The second RCST uses this synchronized knowledge of the transmitting RCST's patterns to analyze the transmission pattern, determine the authenticity and validity of the received packets by their conformance to the pattern, and subsequently reverse the packet obfuscation to return the packets' contents to their original form, as originally transmitted by the originating network node on the second network, including its original destination addressing. The second RCST then transmits the restored packet from the originating network node to its specified destination node (3332) on the fourth network.

The First and Second RCST Synchronize Addressing and Verify Pattern Permutation Synchronization: In the current embodiment, as illustrated in FIG. 33, the first RCST (3318) determines one or more routable addresses with which it can communicate with the second RCST (3338). This can be performed by a number of means, including, without limitation, the use of a Domain Name Server, on which the second RCST has published a pre-arranged Universal Resource Locator record, a world wide web server that allows the first RCST to securely download a routable address for the second RCST, or by a pre-arranged routable address that has been programmed into both RCST devices.

Using the second RCST's mutable address, the first RCST communicates with the second RCST to establish synchronization of transmission patterns based on synchronized Transmission Pattern Permutations.

The first RCST determines, from the transmission pattern permutation, how many first network addresses it will allocate to communications with the second RCST, and sends the second RCST a communication request from each of the allocated first network source addresses. The first network source addresses are translated into routable public network addresses by the first network's NAT function. The packets arrive at the second RCST with the translated first network addresses as mutable addresses in the packets' source address fields. The transmissions from this set of addresses inform the second RCST of the set of first network routable addresses allocated to communications with the second RCST.

The second RCST responds to the first RCST with an acceptance message from each of the routable addresses that it has allocated to communicate packets relating to the first RCST. The second RCST will send each of its routable addresses as a source address to each of the first RCST's routable addresses, as destination addresses, until it has exhausted its set of routable addresses. If it exhausts the set of first RCST routable addresses before its set is completely communicated, it restarts at the top of the first RCST's list of routable addresses, as a circular queue.

In this way, each RCST will be able to transmit packets to each other over the fifth network (3330), using unpredictable combinations and ordinations of the multiple addresses as varying patterns of source and destination addresses. This will allow, for example, the first and second RCST's to establish patterns of combinations of source and destination addressing in packet transmissions according to synchronized Transmission Pattern Permutations that can be used to verify the authenticity of the transmitted packets, and obfuscate them in transit. This reduces the viability of a man in the middle attack, since the attack will not be able to transmit packets in the same pattern permutation. Since the packets already contain encrypted content, and may be transmitted over an encrypted channel, such as Secure Socket Layer (SSL), the unpredictable addressing patterns provide additional security to the transmission, beyond the security provided by encryption alone.

As the first and second RCST systems share routable addressing information, they populate an address synchronization table with that information, as shown in FIG. 31. They each maintain a list of addresses relating to a synchronized communication. In these groupings is recorded the identifiers for the correspondent nodes, in this case, the first and second RCST systems. Subsequent fields in the record include the ordination of the routable addresses, with "L" standing for "Local" and "R" standing for "Remote", the multiple values of the routable addresses relating to this synchronized communication, and the MAC addresses, on their local network, corresponding to those routable addresses, if known.

Figure 34:
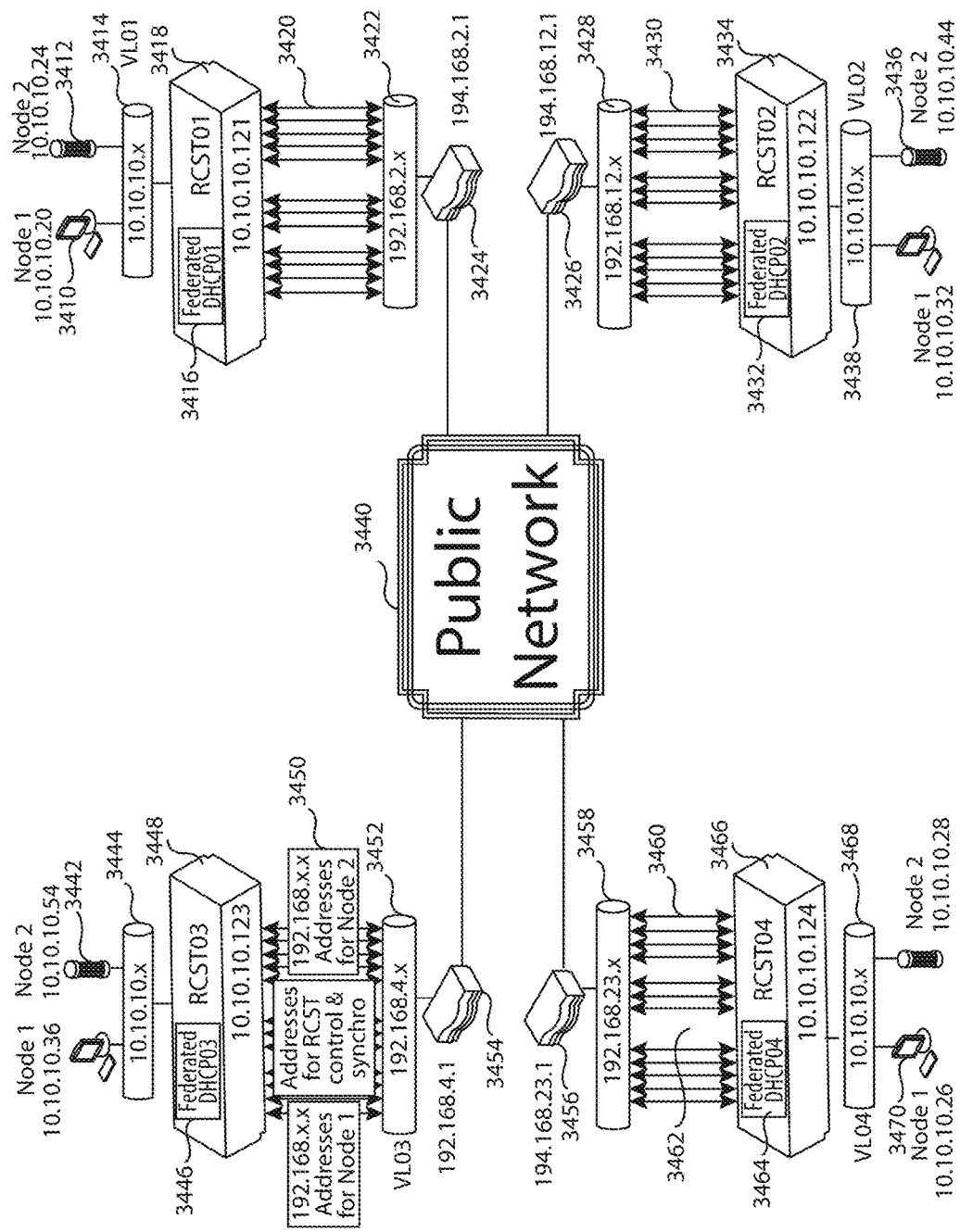
FIG. 34: An embodiment of four pairs of LANs that transmit and receive packets over a public network, each LAN with an RCST connected to a public network routable first LAN with multiple node addresses that, according to an Address Synchronization Table, exemplified by the embodiment in FIG. 29, are allocated to distribute obfuscated packet content from a specified node on a separate isolated LAN to which the RCST is also connected, and shares a federated address space with any other synchronized isolated LAN through the maintenance of a shared federated DHCP table.

Federation of Private Isolated LAN's:

The additional columns in the table in FIG. 31, including LAN ID and Mac address, allow multiple networks using the invention to communicate and synchronize their addressing at both OSI level 2 and level 3, so as to, with the use of the herein disclosed RCST gateway switch function, federate packet transmission into a single address space, and allow restored packets to behave on disparate, separate, and different networks as if they were on a single private Local Area Network. This method of DHCP table federation, across disparate networks, allows packets to behave as if they are on a single private LAN, even though they have been transmitted securely and authentically over a public network. In this embodiment, as illustrated in FIG. 34, four RCST's (3418, 3434, 3448, 3466) each, independently, connect to two separate and independent networks. Each RCST connects to a network (3422, 3428, 3452, and 3458) that connects, through a router (3424, 3426, 3454, and 3456 respectively), to a public network, such as the Internet (3440). Each RCST registers multiple addresses (3420, 3430, 3450, and 3460) on the network that is connected to the public network. Each RCST also connects, independently, with a separate interface, to another private network (3414, 3438, 3444, and 3468) that is not known to, or accessible by, the network connected to a public network. The four RCST's exchange routable address information, synchronize randomized offset numerical values, as disclosed herein, and share DHCP information for all of the nodes registered on their private isolated networks (3414, 3438, 3444, and 3468) to create a federated private isolated LAN out of multiple, separate, private LANs that is not recognized, or "visible", to any nodes on any of the public network connected private LANs (3422, 3428, 3452, and 3458), or on the public network. The four RCST's exchange routable address information, as herein disclosed, and each populates its own local copy of a Federated DHCP Table (3416, 3432, 3446, and 3464), as illustrated in FIG. 31. FIG. 31 illustrates the local Federated DHCP Table (3416) maintained by RCST01 (3418). This table maintains, for each node registered in a federated address space, the local LAN address for that node (Federated Address), the multiple addresses registered for that node on the public network, connected private network (Routing Address), and the MAC address associated to that node on its local LAN (MAC Address) (3110). The Federated DHCP Table also assigns a Routing Ordination value for use in aligning a table address entry to the ordination values in a Transmission Addressing Permutation table offset (FIG. 82), as disclosed herein. When LAN federation is enabled, the RCST's transmit the federated, routing, and MAC address attributes, and the Routing Ordination value, to all synchronized RCST's that they have registered in their local table (3112).

The nodes (3410 and 3412), on the isolated LANs not connected to the public network (3414), cannot be recognized by the public network (3440), or the private network connected to the public network (3422) that is simultaneously connected to the associated RCST (3418). This isolates and protects the LAN not connected to the public network from hackers, and intrusion by nodes on the public or private network. Since the nodes on the isolated private networks have federated their address space with the other networks registered into the Federated DHCP Table, it is guaranteed that their local network node address is unique to all of the isolated private networks registered in the Federated DHCP Table. This allows a node on an isolated network (3412) to send a local packet to a node on a separate, isolated, network (3470), as though it were located on its same physical network, and without any alteration to its network packet structure or transmission. When the transmitting node (3412) transmits its packet onto its local isolated network (3414) to the node on a separate isolated network (3470), the local connected RCST (3418) will analyze the destination address in the Federated DHCP Table (FIG. 31 at row set 3116), and determine that the destination node address of 10,10.10.26 has associated multiple routing addresses starting at 63.78.124.76:1336, and so forth, as listed in FIG. 31. The RCST will then segment and obfuscate the packet transmitted by the node (3412), distribute its segments into multiple packets it creates, determine a transmission addressing pattern from a Transmission Addressing Pattern Permutation table offset that has been generated, in a synchronized manner, with the destination RCST (3466), as disclosed herein, and populate the source and destination address fields in the multiple routable packets, using the routable addresses associated with the destination node (3116), and the source node (3114), according to the synchronized Transmission Addressing Pattern. The transmitting RCST (3418) then transmits the routable addressed multiple packets onto the network to which it is connected, that is also connected to the public network (3422), which, in turn, transmits the multiple packets onto the public network after translating its local source addresses into routable source addresses with its router's (3424) NAT function.

The multiple packets will then route, over the public network, and arrive at the destination router (3456), where the destination address values will be translated by the NAT function into local 192.168.23.x addresses that are registered to the connected RCST (3466). The RCST will verify conformance to the Transmission Addressing Pattern, de-obfuscate and reassemble the multiple packets into the original packet transmitted by the originating node (3412), and transmit it onto the local isolated network (3468). Since the restored packet will contain both the IP addressing and MAC addressing information retrieved from the Federated DHCP table at the 3116 row set, the packet transmitted by RCST04 (3466) onto the network (3468) can be received at both the OSI Level 2 and Level 3 layers by the destination node (3470). This allows the nodes (3412 and 3470), on the two isolated networks (3414 and 3468) that share the same federated address space, to behave as though they were connected on the same physical network, even though the transmitted packet was transmitted over the public network in a highly secure format. Because the four Federated DHCP Tables (3416, 3432, 3446, 3464) are maintained by four separate synchronized RCST's (3418, 3434, 3448, and 3466), any of the nodes (3410, 3412, 3436, 3442, and 3470), on any of the connected isolated networks (3414, 3438, 3444, and 3468), are able to transmit packets to each other, with full OSI Layer 2 and Layer 3 functionality, securely, over a public network using the methods herein disclosed.

In another embodiment, RCST's synchronize and federate DHCP tables across two or more private VLANS to create a federated Private VLAN which communicates over segmented and obfuscated payloads in packets using randomized addressing patterns, as herein disclosed, that are synchronized between RCST's at each separate PVLAN, while maintaining a federated IEEE 802.1Q port classification type for each node on the separate isolated PVLAN's. This allows the Federated. PVLAN to communicate over geographically, or logically, dispersed areas of a public network, but remain invisible to it while the restored packets behave as if they are transmitted onto a single PVLAN.

Assembly of Addressing Patterns:

When assembling obfuscated packets for transmission, the packet packaging process (the Transmission Package Processor in FIG. 14) will look up actual routing address values based on a sequence of the "routing ordination" field in the Address Synchronization Table in FIG. 29. This address ordination value will be used with the addressing pattern permutation tables' offsets, by the Transmission Package Processor, to point to the actual address values in this Address Synchronization Table that will be used in the transmitted packet.

For example, the Transmission Package Processor (TPP), shown in FIG. 14, that is packaging packets for transmission from an RCST, will use this table of synchronized addresses to populate source and destination addresses of packets based on the permutations of a Transmission Pattern Permutation table. The Transmission Package Processor will use an Addressing Pattern Permutation table, as illustrated in FIG. 82, and use table offsets to establish sequences of source and destination address pairings for four packets at a time, per the construction of this Addressing Pattern Permutation table embodiment. Since they are synchronized in how they generate permutation table offset values, by means described below, the first and second RCST's will use the same offsets into the same table to construct the same addressing patterns independently, and in synchronization, so that the receiving RCST will be able to verify that the source and addressing combinations in the received packets match the combinations specified by the Transmission Pattern Permutation. If they match, it verifies that they were sent from the first RCST that was constructing them from the same patterns. In this way, the packets are self-authenticating to the receiving second RCST system.

As an example of how the TPP constructs addressing patterns in the transmitted packets, let's assume that the first example row of the Transmission Addressing table in FIG. 82 were the designated offset for the addressing of four packets, as illustrated by the values in the first row, which is:

| L3 | R2 | L2 | R4 | L3 | R2 | L5 | R4 |
|----|----|----|----|----|----|----|----|

According to this offset addressing pattern, the first transmitted packet would be addressed so that the value of the L3 address, or 192.168.2.54, as specified in the 7th row of the Addressing Synchronization Table in FIG. 29, and in address set 2912, would be used as the source address, and the value of the R2 address, or 117.42.35.61:6253, as shown in the 2nd row, and in address set, 2910, would be used as the destination address for the first packet.

The Transmission Package Processor would then look up the source and destination address values, in a similar manner, for the subsequent three packets, using respectively L2-R4, L3-R2, and L5-R4 as specified in the Transmission Addressing table row in the current example. This next pattern of L2-R4 would specify that the transmission of the next packet from the first RCST to the second RCST be addressed so that the source address (P2Src in FIG. 82) of the second local registered address (L2, or 192.168.2.124 in FIG. 29), and the destination address (P2Dest in FIG. 82) contain the fourth address registered by the second RCST on the remote network (R4 or 117.42.35.61:350, in FIG. 29), and so forth, in a similar way, with the next two packets specified in the shown in the current example table row.

The first RCST then transmits packets to the second RCST using the source and destination addressing specified in the offsets to the Transmission Addressing Pattern Permutation Table (FIG. 82). Since the second RCST has synchronized patterns with the first RCST, per the method disclosed below, it will analyze the source and destination addressing in the packets it receives to verify that they conform to the patterns in the offsets to the Transmission Addressing Pattern Permutation Table. If the packet addressing so conforms, the second RCST flags the received packets as authentic, and passes them to a process (The Reassembly Processor) that will parse, de-obfuscate, and reassemble, according to other corresponding synchronized pattern permutations, the contents of the four transmitted packets back into the form contained in the original packet transmitted by the originating network node.

The second RCST system that receives the packets routed over the public network has synchronized its pattern permutations to the first RCST that transmitted the packets. The second RCST receives the packets, verifies that their addressing and transmission patterns conform to the synchronized transmission pattern permutation, reverses the packet segmentation and obfuscation according to the synchronized obfuscation pattern permutations, reassembles the segments into the original packet that was transmitted by the specific network node, and then transmits that reassembled packet to the node on another network at the destination address. If the transmitted packets were sent, specifically, to the second RCST system, it will not transmit the reassembled packet onto another network, but use the reassembled packet for its own internal processes, such as a federated DHCP table update, a routable address list update, or other internal processes.

The destination address in the reassembled original packet may designate a node on the third, public-network-connected private network or, it may designate a node on the fourth isolated network. The second RCST transmits the packet onto the network containing the node corresponding to the reassembled packet's destination address. In this manner, a node on an isolated network that is not visible to a node on the public network (the second network), can send an obfuscated, self-authenticating packet to a separate isolated network (the fourth network) that is also not visible to a node on the public network. This allows networks that are not visible to the internet to securely communicate their data over the internet.

How RCST's Synchronize Patterns:

In the current embodiment, a first and a second RCST system have been pre-programmed with an identical numeric value used as a "seed value" to simultaneously, and independently, calculate identical unpredictable numeric values. In this embodiment, this is accomplished using the Time-based One-time password algorithm (TOTP), as specified in IETF RFC 6238, or some other method of independent, synchronized, unpredictable, one-way number generation as will be known to those skilled in the art of two-factor authentication and random number generation.

TOTP is typically used as an authentication method, wherein a user is presented a numeric value that is calculated in synchronization with a server that verifies that the number matches its own calculation and allows access to a resource if it does.

The current embodiment uses the TOTP algorithm to generate, time-based, synchronized, mimetic values, not as an authentication credential, but as offsets into identical pattern permutation tables that will specify the identical pattern permutation simultaneously, and independently, on multiple systems without the need to communicate a secret "seed value" or pattern permutation between them.

Using TOTP to independently synchronize the generation of numerical values as permutation table offsets requires that the synchronizing systems know the secret seed number, execute the same algorithm, and share common pattern permutation table structures. These can be shared securely, or pre-programmed into the system. With these, different, and separate, computers can independently calculate the same unpredictable number at regular time-based intervals.

In one embodiment of the invention, multiple different seed numbers are used to synchronize different number generation algorithms that are allocated to distinct purposes or communication sessions. These purposes and sessions include, without limitation, synchronizing, in a unique manner, with multiple other RCST systems, or other network nodes. For example, an automobile can synchronize separate and distinct communication patterns, based on unique permutation table offsets, to transmit operational data, differently, and separately, with the manufacturer of the automobile, the owner's insurance company, and the owner's home computer, while keeping the automobile's network transmissions, and its network node existence, invisible to a public network.

In another embodiment of the invention, a TOTP algorithm is improved to have a configurable pattern of changing the seed values, methods, and inputs for calculating unpredictable numbers. These unpredictable numbers can be used as pattern permutations and random seed number table offsets. In this embodiment, RCST's pre-install, or securely communicate, a list of secret random seed numbers, and use a certain frequency of TOTP generated numerical values, as offsets into the list of seed numbers, to jump to an offset, and use the specified value as the new master seed. In this embodiment, two or more RCST's, running the same algorithm with the same list of secret random seed numbers, and using the same frequency of TOTP generated numerical values, simultaneously change their master seed value in time synchronization without communicating, and possibly exposing, the seed value to $3^{rd}$ parties. The algorithm includes, without limitation, methods that change the following, where alphanumeric variables such as x, y, and z are configurable values:

For every X tokens generated, use the Xth token as an offset into a table of randomized seeds, and change the master system random seed for a TOTP algorithm to the value at the offset For every Y tokens generated, use the Yth token as an offset into a table of different functions that alter the current time value in a TOTP algorithm to be a number of the correct size to be used in the token calculation, and allow the method to change how the time value calculation input to the token is altered For every Z tokens generated, use the Zth token as an offset into a table of functions that alter the raw token result from a TOTP calculation into the value that is used as the offset into the Pattern Permutation Tables For every A tokens generated, use the Ath token as an offset into a table of permutations of permutation tables, and use the permutation tables structures, specified at the offset, as the set of base permutation tables Algorithms that change other aspects of the specification of pattern permutations can be devised and added to the randomization algorithm.

Alternative Pattern Synchronization: In another embodiment, the synchronization of pattern permutations is shared among three or more RCST's to create a community of correspondent RCST's using the same pattern permutations. For example, the same automobile shares a seed to synchronize unpredictable permutation table offset values to create common and shared communication patterns with the manufacturer of the automobile, the owner's smart phone, and the owner's home computer, while synchronizing separate and distinct communication patterns to transmit operational data differently with the owner's insurance company and workplace. This allows different types of data to be securely transmitted and received between different classes of correspondent RCST's.

Synchronizing the Set of Base Permutation Tables: In the pattern permutation table offset calculation method, each type of pattern disclosed herein will be specified from a pattern permutation table specific to that type of pattern, examples of which are shown in FIGS. 23, 24, and 25. The group of various pattern permutation tables, specifying all of the types of patterns for the functioning of the invention, is herein referred to as a "set of base permutation tables". In order to synchronize patterns across two or more RCST's, the structure and content of the set of base permutation tables must be identical across the corresponding synchronized RCST's. If they are not, the independent calculation of communication, or other patterns using pattern permutation table offset values, will produce different results in those RCST's where the set of base permutation tables differ. The result, in those RCST's, will be that the invention will not be able to communicate using the methods of the invention herein disclosed.

When two or more corresponding RCST's share an identical set of base pattern permutation tables from which to calculate the permutations of the permutation patterns disclosed herein, by sharing only the offset values to the set of base pattern permutation tables, they are able to independently calculate, and thereby synchronize, a wide variety of pattern permutations that are specified in the records at the tables' offsets. Secure sharing of permutation table offsets can be used as an alternative to synchronized TOTP one-way number generation.

This provides additional security to the sharing of randomly, or otherwise generated, pattern permutation offset values. This is because, when the structures of the base set of pattern permutation tables that the offsets will be applied to are not known, the offset values are useless in determining the patterns used for communication due to the large number of sets of base pattern permutation tables that are available in the total population of permutations of sets of base pattern permutation tables. In order for two or more RCST's to synchronize pattern permutations used for processes disclosed herein, they must have the same pattern permutation table structures, as well as the same pattern permutation table offset values.

To perform an initial synchronization, RCST's of the invention can first securely share a value for determining a permutation of the set of base pattern permutation tables, or know the same value through TOTP number generation, or by other means, such as having the value pre-installed when the RCST is implemented. This value can be used to derive the base set of pattern permutation tables from which the communication and obfuscation patterns will be calculated. RCST's can, thereby, synchronize their pattern permutation tables by securely sharing only one offset value. In this manner, RCST's can synchronize the patterned communications, disclosed herein, without any prior secret sharing, by securely sharing a limited number of values: one for the permutation of the base set of pattern permutation tables, and other values for the permutation offsets for each type of pattern permutation table herein disclosed.

For example, a first RCST can securely share, with two or more RCST's, a randomly, or otherwise generated, offset number within the range of the population of permutations of sets of base permutation tables. Each, so shared with RCST, can then use this offset to determine the base set of permutation tables that will be used in communications with the sharing RCST. This will establish a common set of pattern permutation tables across all RCST's sharing this value. Any RCST can, then, repeatedly share only offsets for the various types of pattern permutation tables, to synchronize obfuscation, and communication patterns. Unauthorized acquisition of the pattern permutation offset values will be of little value if the permutation of the base set of pattern permutation tables is not known. If it is suspected that an unauthorized entity has knowledge of the set of base pattern permutation tables, the sharing RCST's can simply, securely, share a superseding offset into the permutations of sets of base permutation tables to reset the transmission parameters to a secure state.

In another embodiment of the invention, the tables in the set of base permutation tables are altered slightly, whereby the columns of parameters are placed in different orders, and the value ranges, within the table parameters, are reduced, which forces the same random numbers to generate different pattern permutations. This allows two devices synchronized to this structure to have unique communications permutation parameters, even if the TOTP random seed numbers were to be the same as on another system. It also makes the invention less vulnerable to hacking, as an eavesdropper using a man in the middle attack who observes the random seed numbers will not be able to generate the same synchronized communication patterns without knowledge of the set of permutation parameter tables shared by the two devices.

Use of the Invention by Applications: In another embodiment, the invention is used by a computer application to securely transmit, receive, and store the data it uses to perform its functions. This includes, without limitation, databases, file, video, picture and text sharing and storage applications, Voice over IP applications, Web Browsers, Computer Games, remote system access applications, web meeting and collaboration applications, "cloud" storage and retrieval applications, system and file backup applications, and the like.

Similarly, in other embodiments, other applications can use the invention to increase the security and privacy of the data and information used in those applications. This can be accomplished by embedding the invention into the executable code of the application, or by providing, to the application, an Application Programming Interface (API) that embodies the functionality of the invention for use by an authorized application "calling" the API functions.

In another embodiment, a database application uses the invention to securely store and transmit the data in its database. The database application has been configured, either with embedded code embodying methods of the invention, or by use of an Application Programming Interface (API), to utilize, "write", "insert", or "store" commands, or the like, that invoke methods of the invention, so that the data to be written, inserted, or stored in a database field would be processed and stored in a secure manner, as obfuscated segments on diverse, separate storage locations using different transmission media and protocols according to the invention. The database application similarly utilizes the invention for "get", "retrieve", or "read" commands, or the like, that would invoke the retrieval and reassembly methods of the invention to reassemble the data that is securely stored, according to the invention, into the database for use by the database application.

Pre-Calculating Pattern Permutations:

In another embodiment, use of the invention by an application, such as a database, web browser, file sharing, or other type of application, can be configured to pre-calculate, and present, a series of Pattern Permutations, encryption keys, and other metadata required by the invention, as well as transmission pathways and associated encryption keys, as well as other components of the invention required for operation of the invention, so that they are queued for use, and immediately available to the application, or the API using the invention for secure data obfuscation, transmission, storage, retrieval, and reassembly. This reduces the overhead and time requirements to process an original data object at the time of its identification. An embodiment of invoking this pre-calculation and presentation is disclosed in FIG. 10, steps 1020 through 1030. The Pattern Permutations and metadata produced by this pre-calculation and presentation can be configured to persist between instances of the invention on one system, or across two or more systems.

ODO Streaming:

In a variation of the embodiment disclosed in FIG. 19, the invention can be used for streaming data for applications and data objects including, without limitation, video, SMS text, MMS text, voice mail, and voice telephony, and other types of streamed data objects, as can be devised. The system can delete the segments of the obfuscated, transmitted, stored, and retrieved data stream as the data is streamed, or retain the segments, and thereby record the data stream, for later retrieval. If the streamed segments are recorded, the system can then re-obfuscate and migrate the segments with different obfuscation, invalid data, transmission and storage, and/or retrieval patterns, according to the Segment Migration method, as illustrated in FIG. 20, to further obfuscate and control access to the retained segments of the streamed data recording. In this embodiment intended to efficiently stream ODO segments from one device to another, the originating and receiving systems can share transmission and retrieval metadata and patterns that use few or no intermediary RCST systems to transmit the segments, but instead transmit the segments over a small number of RCST relays, say one or two, or directly between the originating and receiving systems, or a combination thereof. In this embodiment of the invention, as in all communication embodiments of the invention, the originating system's TPP can specify transmission of both valid, and invalid segments, directly to the receiving device, or directly to the RCST's specified in the receiving system's retrieval pattern.

In another embodiment, the invention can be used in an application for backing up or replicating entire originating systems, or portions thereof, for purposes that include, without limitation, disaster recovery, archiving, version control, system migration, system synchronization, system replication, and the like. In this embodiment, the originating system designates a portion of its system data, intended for backing up, as the ODO to be obfuscated, segmented, reordered, packaged, transmitted, and stored, and then retrieved and reassembled by a receiving system, as disclosed herein. The receiving system may be the same system as, or a different system than, the originating system. The invention will then execute its methods on the system storage area designated as the ODO as though it is a single data object, and securely transmit and store the system storage area data as disclosed herein. In another embodiment, the invention allows for a user, or system, to designate different portions of system data to be backed up or replicated as different original data objects, so that that the invention will transmit and store the backup data area as two or more original data objects, typically in separate secure access areas or storage.

| GLOSSARY | |
|---|---|
| Term | Definition |
| FTP | File Transfer Protocol is a protocol used to transmit data objects between systems. |
| HTTP | Hyper Text Transfer Protocol is a protocol used to transmit data to and from world wide web servers. |
| IDO | Invalid Data Object is digital data not from an Original Data Object used to obfuscate "valid" data that comes from an Original Data Object. |
| IPP | Invalid Data Pattern Permutation is a permutation variation of functions and values that produce an Invalid Data Object (IDO). |
| MMS | Multimedia Messaging Service is a standard way to send messages to and from mobile phones and computers. |
| NNTP | Network News Transfer Protocol is a standard Internet communications protocol. |
| Nybble | Half of a byte; four bits. |
| ODO | Original Data Object is digital data that is securely obfuscated, segmented, reordered, transmitted, stored, retrieved, and reassembled by the invention. |
| OMR | Object Management Record is the collection of data and metadata about the identity, encryption, segmenting, and processing of an ODO. |
| OPP | Obfuscation Pattern Permutation is the variation of obfuscating functions and their input values used to obfuscate an ODO and its segments. |
| RCST | Receive, Compute, Store, Transmit is a computing, communications, and storage system that receives, processes, stores, and transmits both Invalid Data and ODO segments and segment groupings. |
| RPP | Retrieval Pattern Permutation specifies the location and retrieval metadata for retrieving ODO segments and invalid data. |
| Segment | A portion of an ODO that is processed by the invention to provide secure transmission and storage of the ODO. |
| Segment Grouping | A collection of ODO Segments that may be reordered and may contain Invalid Data. |
| SMR | Segment Management Record is the collection of data about the identity, processing, encryption, packaging, and transmission of a Segment of an ODO |
| SMS | Short Message Service is a text messaging component of a mobile communications system. |
| SMTP | Simple Mail Transfer Protocol is a well known email transmission and handling system. |
| STO | Segment Tracking Object is the data structure that tracks and records the segmenting, reordering, and invalid data insertion of an ODO and its segments |
| TCP | Transmission Control Protocol is one of the communication protocols of the Internet. |

| GLOSSARY | |
|---|---|
| Term | Definition |
| TPP | Transmission Pattern Permutation is the permutation variation of the configurations, functions, and values that are used in the packaging and transmission of Segments. |
| Transmission Pathway | A series of RCST systems along which a segment is transmitted, processed, and stored for retrieval. |
| UDP | User Datagram Protocol is one of the communications protocols of the Internet. |

What is claimed is:

1. A method of secure communication, the method comprising:
   determining, at a sending system, a permutation of obfuscation functions, the permutation of obfuscation functions being based on an offset to a range of permutations of obfuscation functions;
   segmenting, according to a permutation of segmenting functions from a range of segmenting function permutations, an original communication into a plurality of segments to yield a segmented communication, the original communication to be transmitted to a receiving system;
   processing one of the plurality of segments of the segmented communication according to the permutation of obfuscation functions to yield an obfuscated segment; and
   transmitting the obfuscated segment to a receiving system, the receiving system being synchronized with the sending system such that the receiving system can reverse the obfuscation of the obfuscated segment based on a synchronization of the offset to the range of permutations of obfuscation functions.

2. The method of claim 1, further comprising:
   determining, at the sending system, another permutation of obfuscation functions, the another permutation of obfuscation functions being based on another offset to the range of permutations of obfuscation functions, the another offset to the range of permutations of obfuscation functions being different from the offset to the range of permutation functions;
   processing another of the plurality of segments of the segmented communication according to the another permutation of obfuscation functions; and
   transmitting the another obfuscated segment to the receiving system, the receiving system being synchronized with the sending system such that the receiving system can reverse the obfuscation of the another obfuscated segment based on a synchronization of the another offset to the range of permutations of obfuscation functions.

3. The method of claim 1, further comprising:
   installing, at the receiving function, the range of permutations of obfuscation functions; and
   installing an input value for determining the offset to the range of permutations of obfuscation functions needed to reverse the obfuscation of the obfuscated segment, the range of permutations of obfuscation functions and the input value being synchronized with the sending system.

4. The method of claim 1, wherein the range of permutations of obfuscation functions includes a permutation of segment transmission obfuscation functions used to transmit the obfuscated segment of the segmented communication, the segment transmission obfuscation functions providing for transmission of segments of the segmented communication over different combinations of transmission protocols.

5. The method of claim 1, further comprising:
   determining, at the sending system, an input value permutation from a range of input value permutations, the input value permutation providing input values to the functions of the permutation of obfuscation functions, the input value permutation being based on a second offset to a range of input value permutations.

6. The method of claim 1, wherein the offset is based on a numerical seed value, the numerical seed value being synchronized with the receiving system.

7. The method of claim 5, wherein the second offset is based on a second numerical seed value, the second numerical seed value being synchronized with the receiving system.

8. The method of claim 1, wherein the offset to the range of obfuscation function permutations changes to another valid offset of obfuscation function permutations over varying periods of time and in synchronization with the receiving system.

9. The method of claim 1, further comprising: changing the offset to the range of obfuscation function permutations for each segment in the plurality of segments of the segmented communication to yield a different permutation of obfuscation functions for each segment;
   processing each segment in the plurality of segments according to the different permutation of obfuscation functions for each segment to yield a set of obfuscated segments; and
   transmitting each obfuscated segment in the plurality of obfuscated segments to the receiving system, the receiving system being synchronized with each changed offset to the range of obfuscation function permutations.

10. The method of claim 1, wherein the sending system is synchronized with the receiving system based on at least one of: output values of a Time-based One Time Password (TOTP) algorithm used as the synchronized offset to a shared range of obfuscation function permutations, a shared range of obfuscation function input value permutations, a shared range of invalid data insertion function permutations, a shared range of invalid data insertion function input value permutations, a shared range of transmission obfuscation function permutations, a shared range of transmission obfuscation function input value permutations, and a shared range of segment retrieval function permutations, and a shared range of segment retrieval function input value permutations.

11. The method of claim 1, wherein the sending system and the receiving system are synchronized based on the output value of a Time-based One Time Password (TOTP) algorithm.

12. The method of claim 1, wherein the transmitting operation transmits the obfuscated segment to an intermediate Receive/Computer/Store/Transmit (RCST) system, the intermediate RCST system being synchronized with the sending system and synchronized with the receiving system such that the intermediate RCST system can obfuscate the obfuscated segment to yield an additionally obfuscated segment, the receiving system being synchronized with the intermediate RCST system such that the receiving system can reverse the additional obfuscation performed by the RCST and reverse the obfuscation performed by the sending system of the additionally obfuscated segment to yield the one of the plurality of segments of the original communication.

13. A network gateway system, the system comprising:
a first set of network adapters, each network adapter in the first set of network adapters having a different MAC address and a different network IP address on a first network;
a second single network adapter having a second single MAC address and a second single network IP address on a second network;
a pattern permutation processor to determine, based on obfuscation seed values and input seed values, obfuscation function patterns from ranges of obfuscation function permutations and obfuscation function pattern input values from ranges of obfuscation input value permutations;
an object processor to apply the obfuscation function patterns to yield an obfuscated original communication, the object processor receiving the original communication from a node on the second network;
a segment processor to segment the obfuscated original communication to yield a plurality of obfuscated segments; and
a transmission package processor to insert the obfuscated segments into a plurality of data packets on the first set of network adaptors and to route the plurality of data packets from the first set of network adapters across the first network to a receiving network gateway containing a third set of network adapters having different MAC addresses and different IP addresses, the receiving network gateway having the ranges of obfuscation function permutations and being synchronized with the obfuscation function permutation offset seed values and obfuscation function input value permutation seed values to reverse obfuscation and segmentation of the obfuscated segmented communication to yield the original communication.

14. The network gateway system of claim 13, wherein the obfuscation function patterns include transmission obfuscation patterns and the network gateway processor further embeds transmission obfuscation parameters into the plurality of data packets.

15. The network gateway system of claim 13, wherein the obfuscation function patterns include network transmission addressing obfuscation function permutation patterns assigned to the node on the second network, the obfuscation function patterns including permutations of combinations of source addresses of one or more different IP addresses of the first set of network adapters with destination IP addresses of one or more of the third set of network adapters.

16. The network gateway system of claim 13, wherein the obfuscation function permutation offset seed values and the function input value permutation offset seed values change over varying periods of time according to a permutation of a range of seed value change timing permutations and a permutation of a range of seed value permutations, and in synchronization with permutation patterns in a second gateway containing the third set of network adapters, such that the second gateway reverses obfuscation and segmentation of the obfuscated segmented communication based on the changed sets of obfuscation functions and the seed values.

17. The network gateway system of claim 13, wherein the receiving network gateway reassembles the obfuscated segmented communication to yield the original communication based at least in part on addressing of data packets of the obfuscated segmented communication according to permutations of combinations of source addresses of one or more of the different IP addresses on the first network, the permutations of combinations being synchronized with the receiving network gateway.

18. The network gateway system of claim 17, further including a fourth single network adapter having a fourth single MAC address and a fourth single network IP address on a fourth data network, the fourth single network IP address being associated with transmission of communications from the node on the second network based at least in part on addressing of data packets of the obfuscated segmented communication.

19. A federated addressing system for separate data networks sharing the same Local Area Network (LAN) address space, the system comprising:
a first data network including one or more first network devices having a range of LAN network addresses;
a second data network including one or more second network devices having another range of LAN network addresses, the first data network and the second data network sharing a common LAN address space;
a federated Dynamic Host Configuration Protocol (DHCP) table, the federated DHCP table being accessible to the one or more first network devices and accessible to the one or more second network devices;
a federated address space DHCP server being accessible to the first network devices and accessible to the second network devices, the federated address space DHCP server performing a DHCP network address allocation function between the first network devices and the second network devices based on the federated DHCP table; and
a first network gateway on the first data network and a second network gateway on the second data network to transmit DHCP network address assignment negotiation protocols and values among the federated network address DHCP server, the first network devices, and the second network devices, the first network gateway and the second network gateway including:
a pattern permutation processor to determine, based on obfuscation function permutation offset seed values and function input value permutation offset seed values, obfuscation function patterns from ranges of obfuscation function permutations and obfuscation function pattern input values from ranges of obfuscation input value permutations;
an object processor to apply the obfuscation function patterns to yield an obfuscated original communication, the object processor receiving the original communication from a node on the second data network;
a segment processor to segment the obfuscated original communication to yield a plurality of obfuscated segments;
a sending transmission package processor to insert the obfuscated segments into a plurality of data packets according to a transmission package obfuscation function permutation pattern and to establish the routing of the plurality of data packets between the first data network and the second data network; and a receiving reassembly processor being synchronized with the sets of obfuscation function permutations, obfuscation function input value permutations, obfuscation function permutation offset seed values and function input value permutation offset seed values to reverse obfuscation and segmentation of the obfuscated segmented communication to yield the original communication.

20. The federated addressing system of claim 19, wherein the receiving reassembly processor determines a destination federated network IP address of the original communication based at least in part on permutations of combinations of source addresses of data packets of the obfuscated segmented communication.

* * * * *